US007430340B2

(12) United States Patent
Glass et al.

(10) Patent No.: US 7,430,340 B2
(45) Date of Patent: Sep. 30, 2008

(54) GEOGRAPHIC INFORMATION DATA BASE ENGINE

(75) Inventors: Paul M. Glass, Sugarland, TX (US); Vernon C. Dotson, Houston, TX (US); Du Chen, Katy, TX (US); Susan M. Kight, Cypress, TX (US); Jeffrey M. Buske, Castle Rock, CO (US)

(73) Assignee: Advanced Tracking Technologies, Inc., Houston, TX (US)

( * ) Notice: Subject to any disclaimer, the term of this patent is extended or adjusted under 35 U.S.C. 154(b) by 709 days.

(21) Appl. No.: 11/081,347

(22) Filed: Mar. 16, 2005

(65) Prior Publication Data

US 2005/0288836 A1 Dec. 29, 2005

Related U.S. Application Data

(60) Provisional application No. 60/553,498, filed on Mar. 16, 2004.

(51) Int. Cl.
*G06K 9/32* (2006.01)

(52) U.S. Cl. ...................................... 382/293; 382/232

(58) Field of Classification Search ................. 382/232, 382/293; 345/672, 440, 441; 340/438, 439, 340/995.1; 701/29, 35, 207; 707/1, 2, 3
See application file for complete search history.

(56) References Cited

U.S. PATENT DOCUMENTS

| | | | | |
|---|---|---|---|---|
| 5,557,524 | A | 9/1996 | Maki | 701/35 |
| 5,694,322 | A | 12/1997 | Westerlage et al. | 705/417 |
| 6,134,541 | A * | 10/2000 | Castelli et al. | 707/2 |
| 6,138,072 | A | 10/2000 | Nagai | 701/207 |
| 6,141,609 | A | 10/2000 | Herdeg et al. | 701/35 |
| 6,253,129 | B1 | 6/2001 | Jenkins et al. | 701/29 |
| 6,292,743 | B1 | 9/2001 | Pu et al. | 701/202 |
| 6,297,748 | B1 | 10/2001 | Lappenbusch | 340/905 |
| 6,603,486 | B1 * | 8/2003 | Baran et al. | 345/672 |
| 6,661,452 | B1 | 12/2003 | Nishikawa | 348/222.1 |
| 6,661,845 | B1 | 12/2003 | Herath | 375/240.23 |

(Continued)

OTHER PUBLICATIONS

Devillers et al., "Geometric Compression for Interactive Transmission", IEEE, Oct. 2000, pp. 319-326.*

(Continued)

*Primary Examiner*—Anh Hong Do
(74) *Attorney, Agent, or Firm*—Rick Martin; Patent Law Offices of Rick Martin, PC

(57) ABSTRACT

A method to compress a very large original geographic database down to a manageable and economical size while preserving accuracy is herein described. Similarly, a method to quickly retrieve, decompress, and display data is herein described. An original geographic database is prepared for compression by dividing it into discrete regions called bounding boxes. The bounding boxes may be variable sized to improve accuracy and compression. Absolute map coordinate data is compressed by converting it to relative map coordinate data. Map files are named in a descriptive manner to allow determination of map file characteristics merely by inspecting the file name. Relative map coordinate data can be displayed without being converted to absolute map coordinate data. Alternately, relative map coordinate data may be quickly decompressed into absolute coordinate data. Retrieving compressed data is facilitated by forming view windows having adjacent load regions pre-decompressed and ready for user display.

32 Claims, 40 Drawing Sheets

U.S. PATENT DOCUMENTS

| | | | | |
|---|---|---|---|---|
| 6,664,903 | B2 | 12/2003 | Kugai | 341/51 |
| 6,667,699 | B2 | 12/2003 | Jones et al. | 341/51 |
| 6,668,093 | B2 | 12/2003 | Zeck | 382/244 |
| 6,670,897 | B1 | 12/2003 | Lin | 341/65 |
| 6,718,263 | B1 | 4/2004 | Glass et al. | 701/213 |
| 6,741,933 | B1 | 5/2004 | Glass | 701/213 |
| 2004/0205517 | A1 | 10/2004 | Lampert et al. | 707/502 |

OTHER PUBLICATIONS

Ediz Saykol, Department of Computer Engineering, Bilkent University, 06533 Bilkent, Ankara, Turkey; "KiMPA: A Kinematics-Based Method for Polygon Approximation", unknown date.

Written Opinion of International Search Report—mailed Mar. 19, 2007 Application No. PCT/US05/08791 Dated: Mar. 16, 2005 Applicant: Advanced Tracking Technologies, Inc. Corresponding PCT Application.

Written Opinion of International Search Report--mailed Mar. 19, 2007, Application No.: PCT/US05/08791, Dated: Mar. 16, 2005, Applicant: Advanced Tracking Technologies, Inc. Corresponding PCT Application.

* cited by examiner

| SIZE | SCALE FACTOR | ERROR M (f) |
|---|---|---|
| 4Deg. | 2^14 = 16536 | 6.79M (22.0') |
| 2 Deg. | 2^15 = 32768 | 3.39M (11.0') |
| 1 Deg. | 2^16 = 65536 | 1.7M (5.5') |
| 1/2 Deg. | 2^17 = 131072 | 0.85M (2.75') |
| 1/4 Deg. | 2^18= 262144 | 0.42 M (1.38) |

```
                              400
                  ┌────────────┴────────────┐
             1401 1402 1403 1404 1405
             ┌┴┐ ┌┴┐ ┌┴┐ ┌┴┐ ┌┴┐
Parse File: WW150000000000000.ATT  ⎫ 1407
           1422 ╱  ╲                ⎭
           1423 ╱ 1424

Type: 5 ─── 690
             ┌─ 139
Version: 100 ╱
                ┌─ 410   ┌─ 412   ┌─ 411   ┌─ 413
                ╱        ╱        ╱        ╱
Extend: (-180.000000, 13.000000) - (180.000000, -13.000000)

              ╱ 1411
Entities: 239
===============================

Polygon: Aruba

Index: (-69.882353, 12.413367), (-69.882353, 12.413367) ⎫
(-69.552353, 12.513367), (-69.88553, 12.513367) ....    ⎬ 476
                                                         ⎭
                         ┌─ 495
Polygon Part Qty: 1 ╱
----------------       ┌─ 494
              Part 0000 ╱          ┌─ 414
                  Point Qty: 11 ╱
                  Point 0: (-69.882353, 12.413367)
                  Point 1: (-69.948272, 12.435340)
                  Point 2: (-70.058137, 12.539712)
                  Point 3: (-70.058137, 12.627604)
                  Point 4: (-70.030671, 12.619364)
         450  ⎰  Point 5: (-69.931792, 12.528725)
              ⎱  Point 6: (-69.898833, 12.482033)
                  Point 7: (-69.893339, 12.473793)
                  Point 8: (-69.887846, 12.457313)
                  Point 9: (-69.876860, 12.416114)
                  Point 10: (-69.882353, 12.413367)
```

| SIZE | SCALE FACTOR | ERROR M (f) |
|---|---|---|
| 4Deg. | 2^14 = 16536 | 6.79M (22.0') |
| 2 Deg. | 2^15 = 32768 | 3.39M (11.0') |
| 1 Deg. | 2^16 = 65536 | 1.7M (5.5') |
| 1/2 Deg. | 2^17 = 131072 | 0.85M (2.75') |
| 1/4 Deg. | 2^18= 262144 | 0.42 M (1.38) |

1800

2801 2802 2803 2804 2805

Parse File: WW150000000000000.ATT 2807

2822
2823 2824

Type: 5 2090

1539
Version: 100

1810 1812 1811 1813
Extend: (-180.000000, 13.000000) - (180.000000, -13.000000)

Entities: 239 2811

===========================

Polygon: Aruba

Index: (-69.882353, 12.413367), (-69.882353, 12.413367)
(-69.552353, 12.513367), (-69.88553, 12.513367) .... 1876

Polygon Part Qty: 1 1895

----------------

Part 0000 1894

Point Qty: 11 1814

1850

Point 0: (-69.882353, 12.413367)
Point 1: (-69.948272, 12.435340)
Point 2: (-70.058137, 12.539712)
Point 3: (-70.058137, 12.627604)
Point 4: (-70.030671, 12.619364)
Point 5: (-69.931792, 12.528725)
Point 6: (-69.898833, 12.482033)
Point 7: (-69.893339, 12.473793)
Point 8: (-69.887846, 12.457313)
Point 9: (-69.876860, 12.416114)
Point 10: (-69.882353, 12.413367)

FIG. 27

GEOGRAPHIC INFORMATION DATA BASE ENGINE

CROSS REFERENCE APPLICATIONS

This application is a non-provisional application claiming the benefits of provisional application No. 60/553,498 filed Mar. 16, 2004.

FIELD OF INVENTION

The present invent-ion relates to a method and an apparatus for compressing and expanding digital map data. Specifically, it relates to image compression, reducing the number of bytes of original map data, rapid transmission, and display of an image.

BACKGROUND OF THE INVENTION

Public and commercial map databases are frequently very large and awkward to use, particularly in portable applications. Not only do such databases frequently require excessively large and expensive storage, access to data within such databases is frequently very slow. When data is transferred and/or stored to, for example, a computer hard drive with a large amount of available memory capacity, data compression may not be critical because the computer's hard drive can accommodate data files that are quite large. However, when data files are transmitted over low speed systems, or systems that operate with a low bandwidth, data compression becomes important. Similarly, when data is recorded, transferred, and/or stored to a device in which storage space is highly restricted or expensive, such as a personal digital assistant, a pager, or a cellular telephone, data compression is a primary factor. For these applications and others, a more efficient data compression method is particularly critical. Therefore, a method to reduce or compress a very large database down to a manageable and economical size while preserving accuracy is required. Similarly, a method to quickly retrieve, decompress, and display data is required. The methods taught herein address fast and virtually loss-less data compression. A file system taught herein speeds location and display of map information. Data is quickly decompressed and presented to an user via a CRT or other type of display. Efficient panning and zooming taught herein speed screen refreshing for smooth display. Novel memory management reduces system resource requirements while providing crisp display updates.

SUMMARY OF THE INVENTION

One aspect of the present invention is to provide a method and an apparatus for compressing, decompressing, displaying, and managing digital map data.

Another aspect of the present invention is to filter digital map data such that map entities that are not required are removed.

Another aspect of the present invention is to prepare digital map data for compression by partitioning the map data into geographic sections of a predetermined size.

Another aspect of the present invention is to prepare digital map data for compression by partitioning the map data into variable sized geographic sections.

Another aspect of the present invention is to compress digital map data by converting absolute (complete) map coordinates to relative map coordinates.

Another aspect of the present invention is that map data may be compressed in a virtually loss-less manner.

Another aspect of the present invention is to display map data comprised of relative map coordinates without converting the map data to absolute (complete) map coordinates.

Another aspect of the present invention is to simultaneously display multiple view windows from a common compressed map database.

Another aspect of the present invention is to store compressed map data in a data structure from which the data structure's length and scaling factor may easily be determined.

Another aspect of the present invention is to compress map label data by replacing words contained within the map label data with a token.

Another aspect of the present invention is to store map label data separately from other map data.

Another aspect of the present invention is to preload into memory map entities located within a predetermined proximity to a view window.

Another aspect of the present invention is to preload into memory map entities located in a direction of view window movement, panning, or zooming.

Another aspect of the present invention is to preload into memory map entities located within a next lower zoom level.

Another aspect of the present invention is to unload from memory map entities located beyond a predetermined proximity to a view window.

Another aspect of the present invention is to unload from memory entities located in an opposite direction of view window movement, panning, or zooming.

Another aspect of the present invention is to name a map data file such that the characteristics of the data contained within the map data file may be determined merely by inspecting map data file name.

Another aspect of the present invention is that map data compression may be quickly performed using multiply accumulate operations common to digital signal processors.

Another aspect of the present invention is that map data decompression may be quickly performed using multiply accumulate operations common to digital signal processors.

Another aspect of the present invention is that map data may be compressed with a symmetric compression algorithm.

Other aspects of this invention will appear from the following description and appended claims, reference being made to the accompanying drawings forming a part of this specification wherein like reference characters designate corresponding parts in the several views.

BRIEF DESCRIPTION OF THE DRAWINGS

FIG. 27 is a sample ASCII polygon map file fragment.

Before explaining the disclosed embodiment of the present invention in detail, it is to be understood that the invention is not limited in its application to the details of the particular arrangement(s) shown, since the invention is capable of other embodiments. Also, the terminology used herein is for the purpose of description and not of limitation.

DETAILED DESCRIPTION OF THE DRAWINGS

Certain terms used herein are defined below:

ADC: analog to digital converter.

ASCII: American standard codes of information interchange.

BAUD: serial communication data rate in bits per second.

Byte: digital data word 8 bits in length.

Character: a symbol from the ASCII set.

Checksum: a numerical sum of the hexadecimal representation of the characters in a list.

CPU: central processing unit.

DSP: digital signal processor.

EEPROM: electronically erasable programmable read only memory.

FLASH memory: electrically alterable read only memory. See EEPROM.

GPS: global positioning system, network of satellites providing precise time and location information.

GUI: Graphical user interface.

Hexadecimal: base 16 representation of integer numbers.

Interrupt: signal to the computer to perform another task.

ISO 9660 International Standards Organization Level 1 specification: requirement that file names be in the <term>8.3</term> format and that directory names can not exceed eight characters. Level 2 and Level 3 specifications allow file names of up to 32 characters in length.

LZW: Lempel Zev Welch compression technology. Unisys Corporation's loss-less compression and decompression technology. U.S. Pat. No. 4,558,302.

Nautical mile: $1/60^{th}$ of a degree of latitude; 1,853 M (6,040 feet) at the equator.

PC: personal computer.

PDA: personal digital assistant.

RLE: run length encoding.

RMS: room mean square.

ROM: read only memory.

USGS: United States Geographic Service.

Word: digital data word 16 bits in length.

Figure 1:
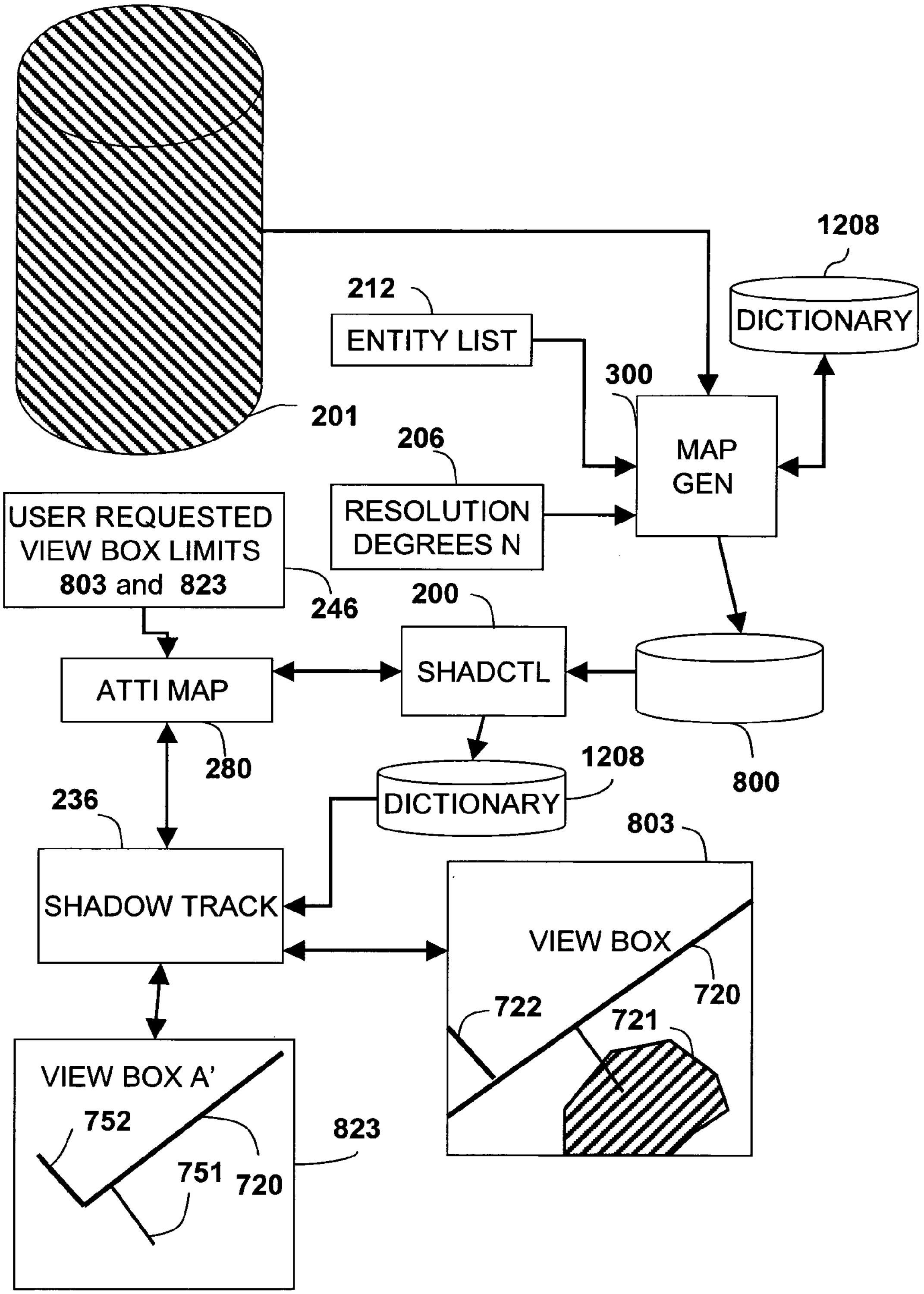
FIG. 1 is a data flow diagram of map file building and display processes.

FIG. 1 is a data flow diagram of the map generation and display process. Input map data file 201 is received by map generator algorithm 300. As an example and not as a limitation, input map data file 201 may consist of TIGER/Line® map census files generated by the U.S. Census Bureau. TIGER/Line® files contain a wealth of information comprising landmarks, political boundaries, ZIP code areas, power lines, roads, schools, churches, etc. Approximately sixty percent of an input map data file contains information not required by typical mapping or navigation applications. For example the TIGER/Line® database is some 38-Gigabytes in size and thus is far too large to store on a single CDROM or to store economically in solid-state memory.

Specific entities are assigned codes defining the entity type. For instance, entities such as political boundaries, roads, towns, cities, landmarks, schools, etc. have unique codes. Specific codes used by TIGER/Line® files are defined in TIGER/Line® documentation. An user specified list of desired entity types is used to created entity list 212.

Figure 3A:
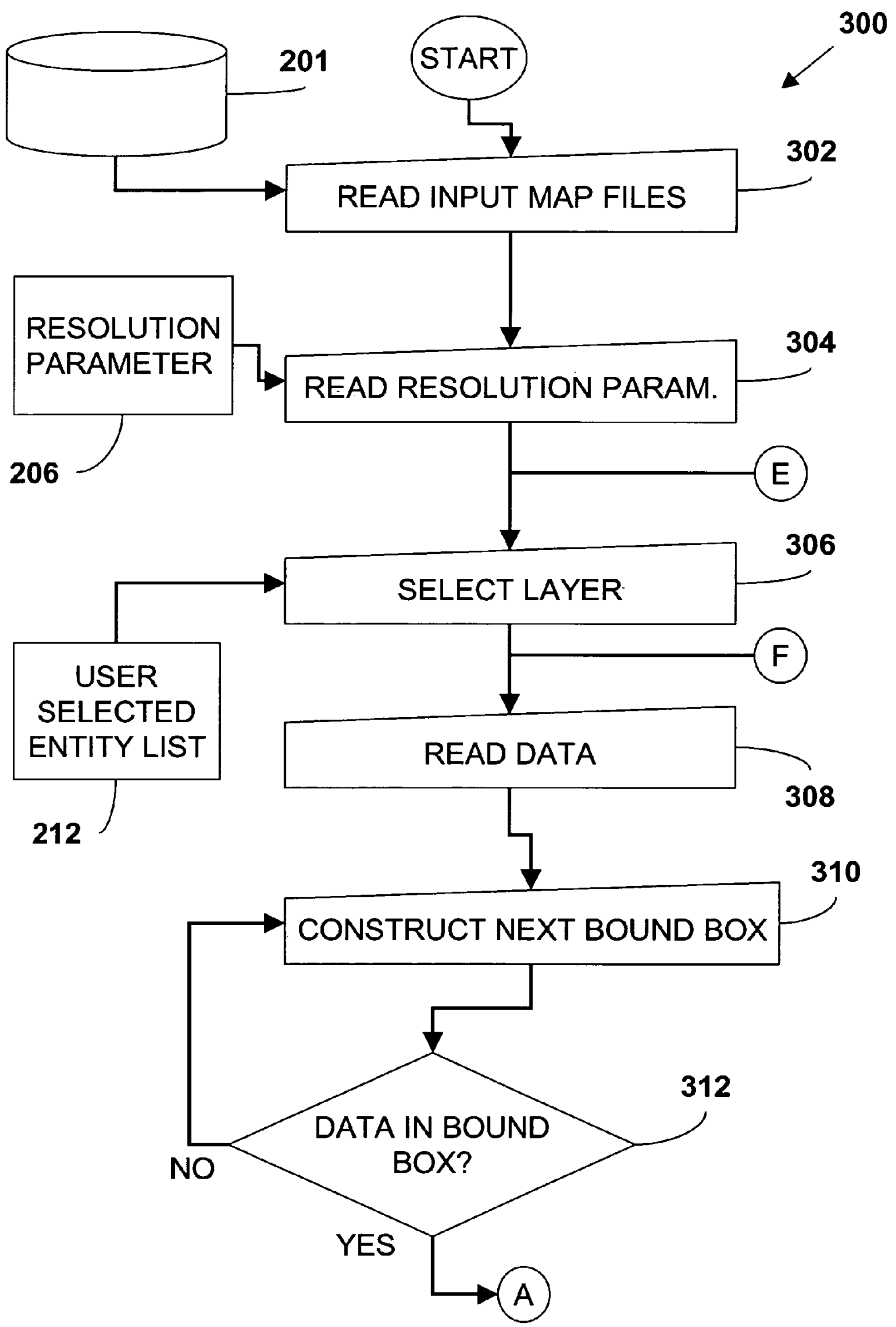
FIGS. 3A, 3B, 3C are a flow chart of a map data generator process.
Figure 3B:
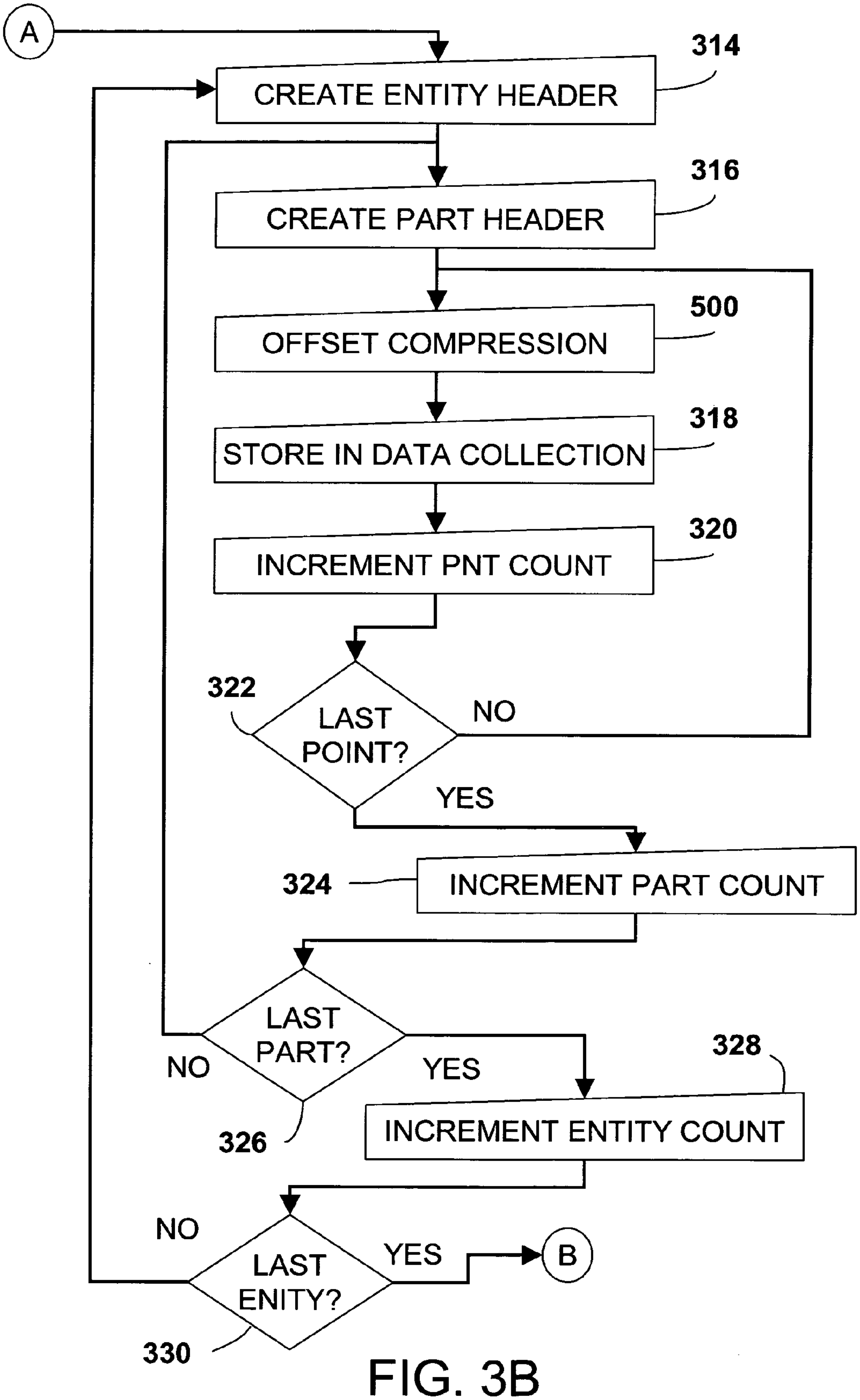
Figure 3C:
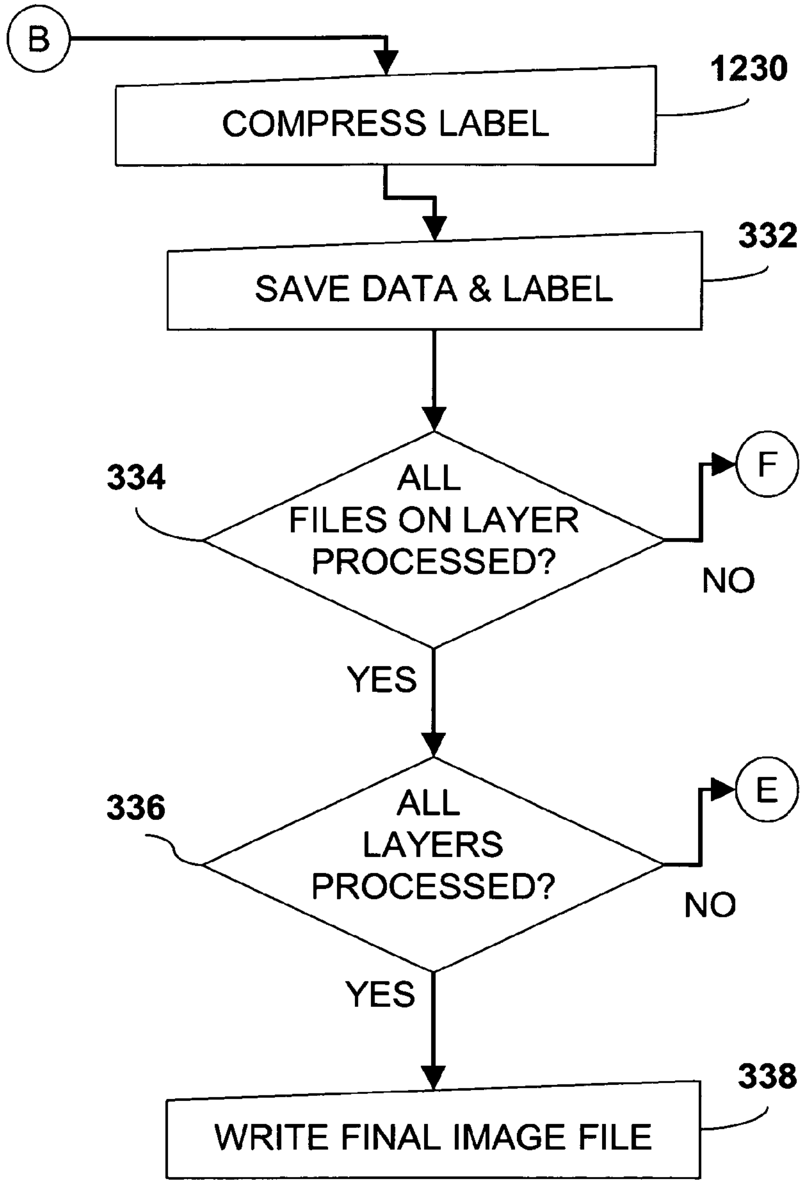

Map generator algorithm 300 as taught in FIG. 3 compresses input map data file 201. Map generator algorithm 300 compresses element labels by replacing a label string with an appropriate token from dictionary file 1208 contained within the map drawing engine. Map generator algorithm 300 also compresses absolute (complete) coordinate data by use of novel adaptive absolute to relative coordinate compression algorithm 500 taught in FIG. 5 and FIG. 7. Adaptive absolute to relative coordinate compression algorithm 500 yields virtually loss-less compression with very high compression rates. As map generator algorithm 300 is linear, major operations may be performed in any order with identical results.

Operation 338 (FIG. 3C) merges compressed coordinate and label data into final image file 800. Final image file 800, by way of example and not limitation, is typically saved for distribution on media such as CDROM, DVD-ROM, or solid-state memory.

User defined resolution parameter 206 defines a minimum bounding box size. The bounding box is an important aspect of the compression method taught herein. Bounding box size defines map granularity and maximum accuracy as taught in FIG. 5. The smaller the bounding box, the more accurate the compressed data will be. As an example and not as a limitation, resolution parameter 206 is typically one to four degrees in latitude and longitude.

The novel and efficient compression, decompression, and display methods taught herein permit typically large input map data file 201 to be compressed to final image file 800 for use in small handheld devices such as PDA's, cell phones, and laptop computers. The highly compressed nature of final image file 800 permits its transmission over limited speed data links. In typical applications, a 92% compression rate is achieved.

The architecture of the methods taught in FIG. 1 permits sharing of final image file 800 in a distributed system. Potential benefits include cost savings, simplicity, and ease of maintenance associated with maintaining, storing, and updating only a single copy of a map database.

Figure 2A:
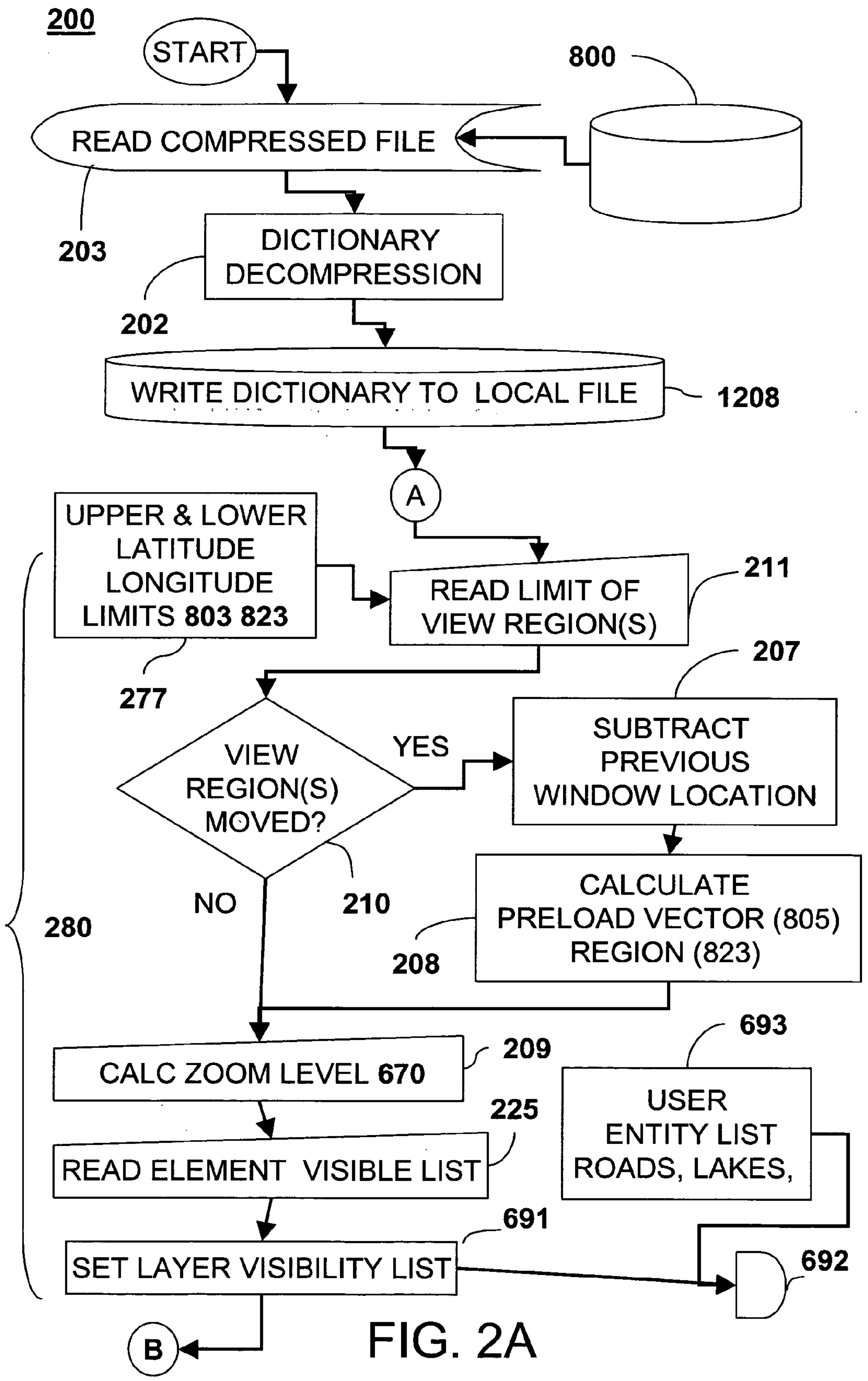
FIGS. 2A, 2B, 2C, 2D are a flow chart of map data decompression, display management, and memory management processes.
Figure 2B:
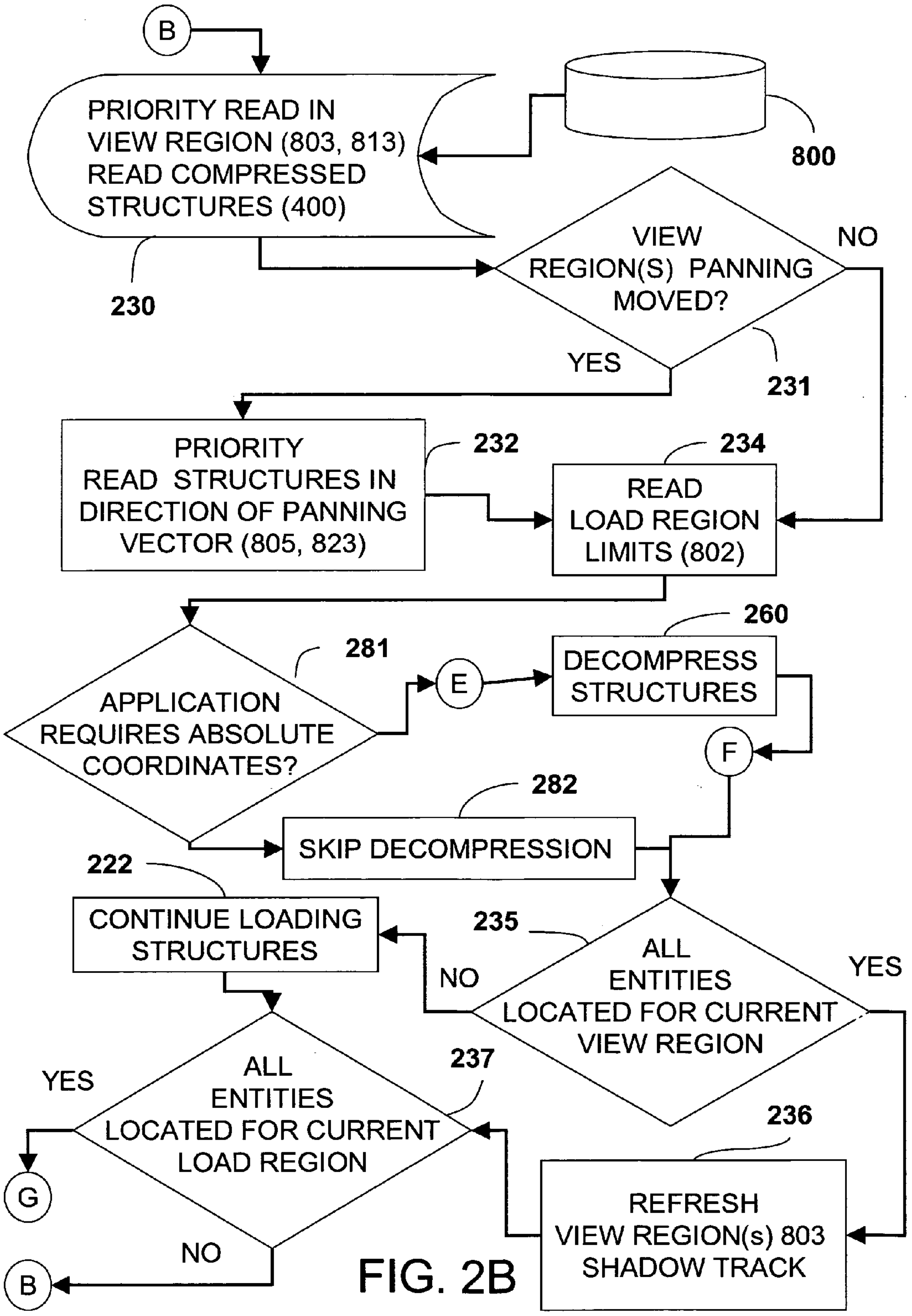
Figure 2C:
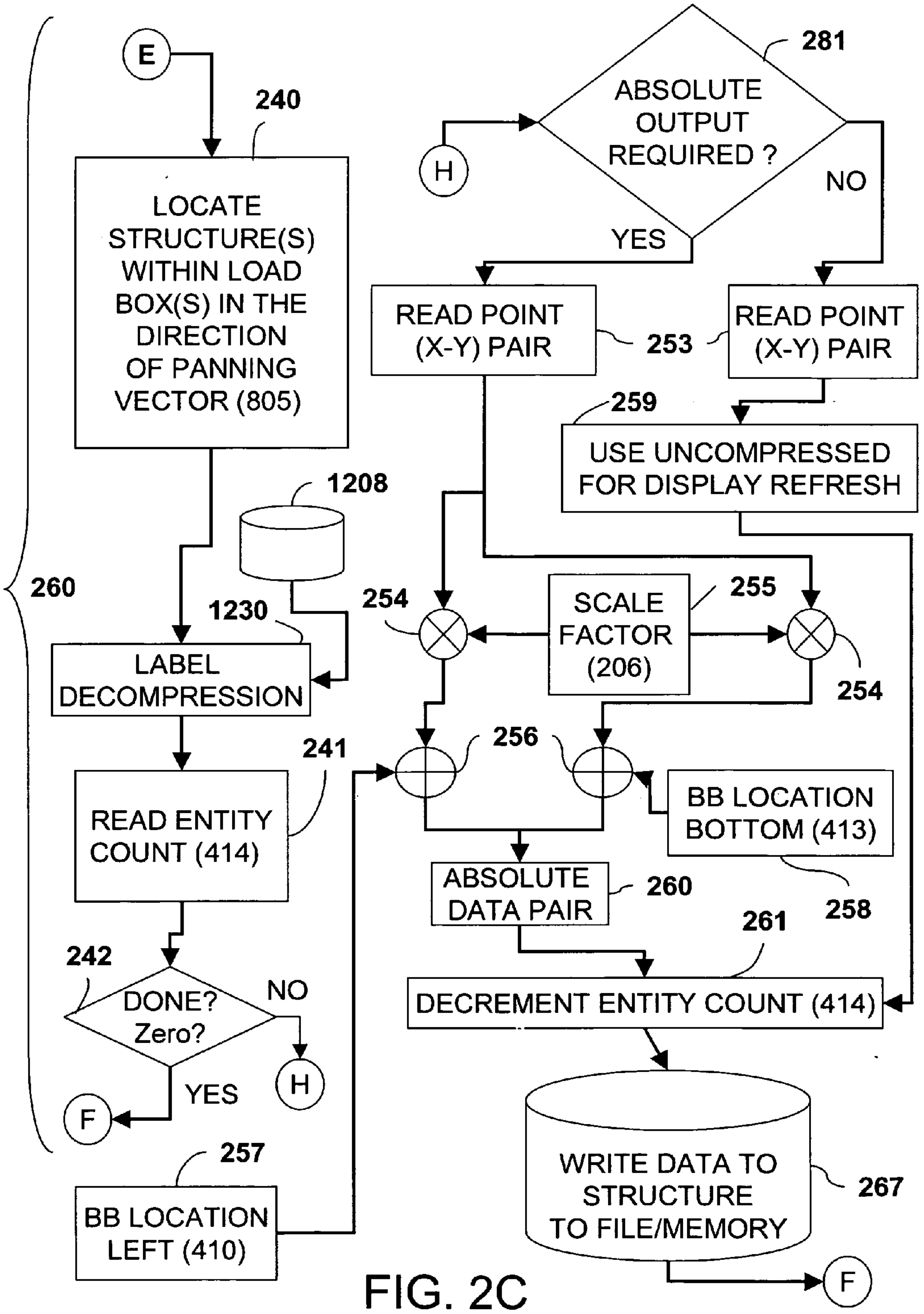
Figure 2D:
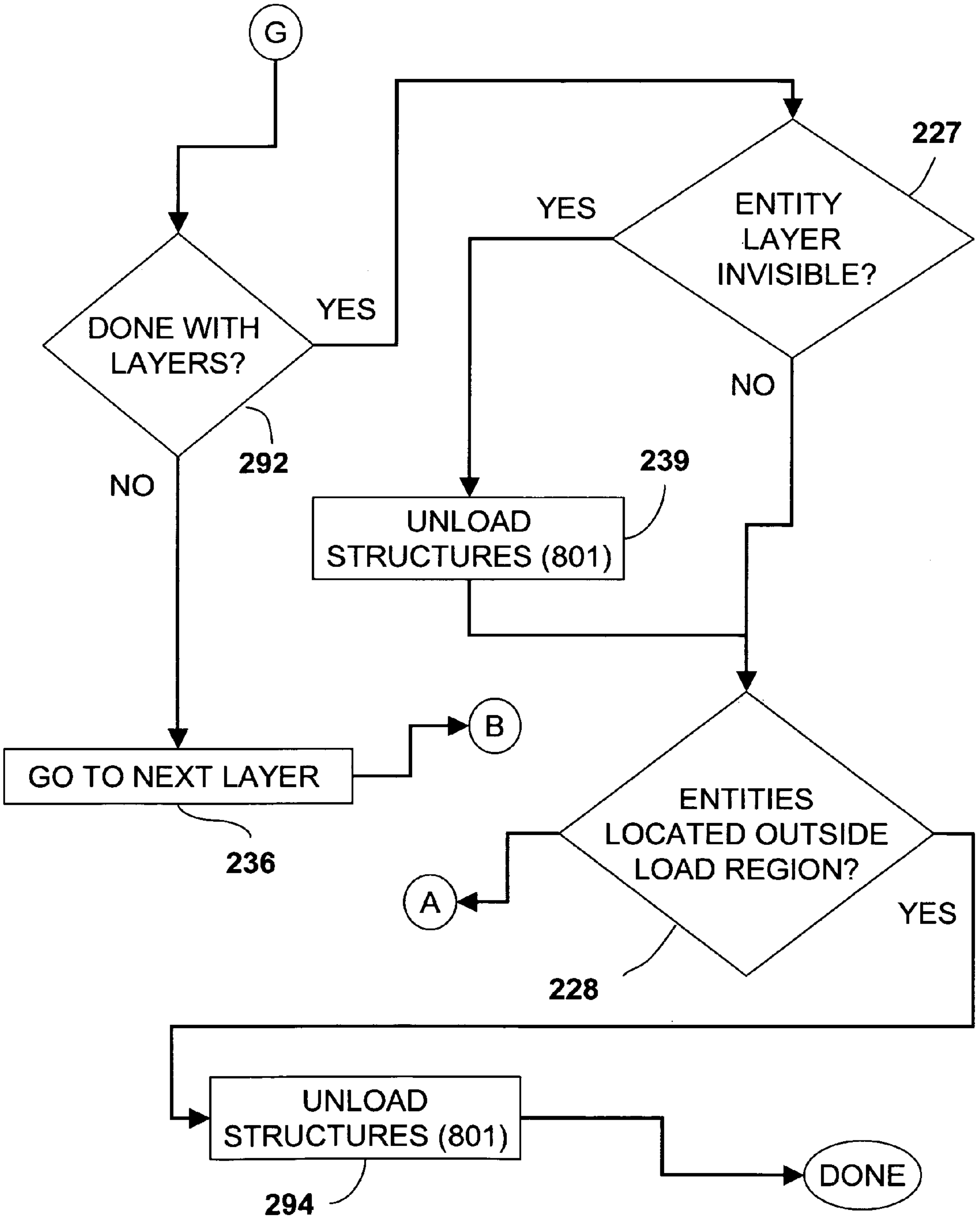

Operation 200 performs entity decompression, and the loading and unloading of map entities and label data to local memory. Operation 236 coordinates predictive preloading of entities located outside current view windows 803 and 823 to local memory for rapid display. Operation 236 also performs rapid display refreshing and zooming as taught in FIG. 2B and FIG. 8. Details of operation 200 are taught in FIG. 2.

Figure 6:
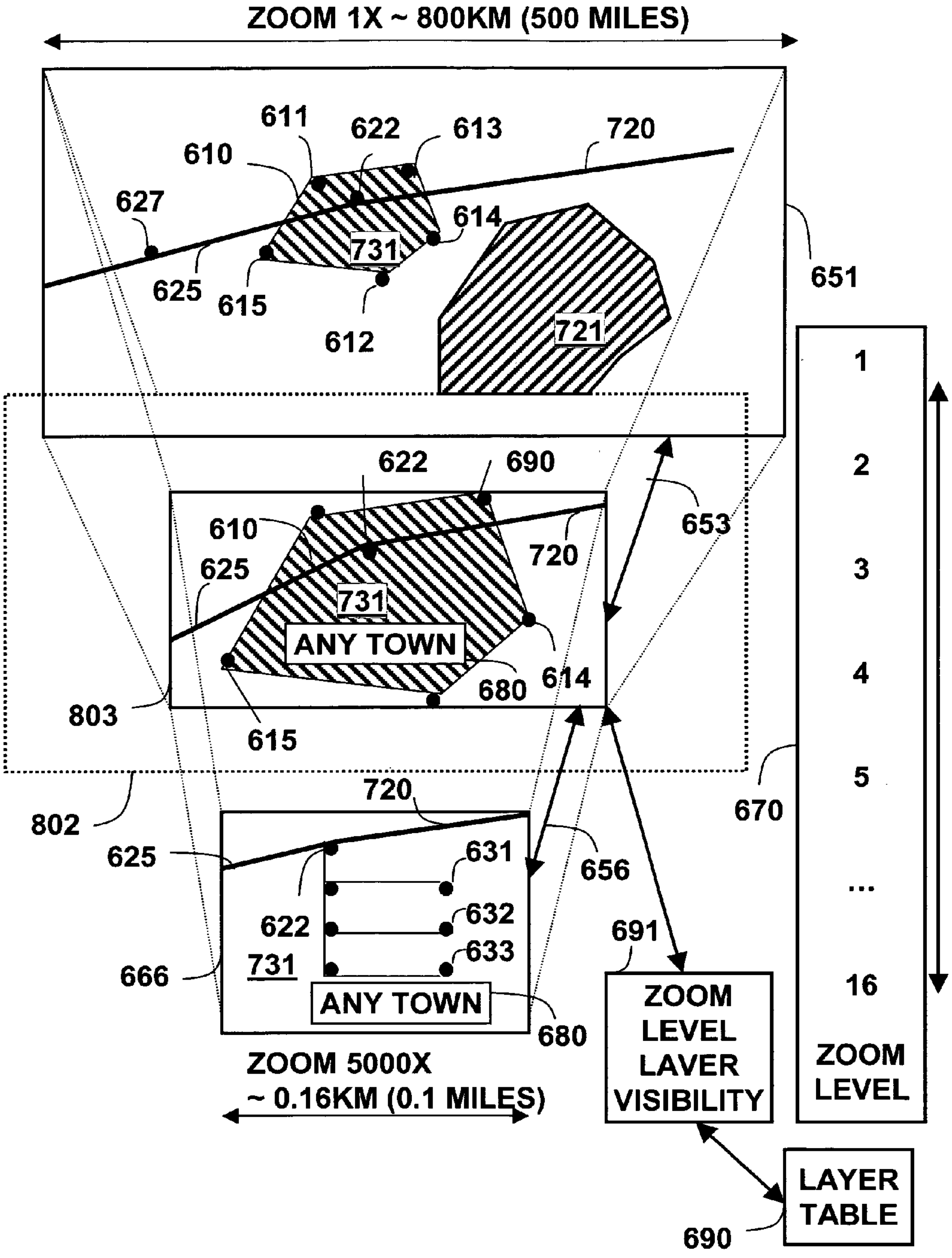
FIG. 6 is an illustration of a zoom filter operation.

Operation 280 (FIG. 2A) performs multiple functions. Operation 246 reads the user requested window view limits 277 from the GUI. Additionally, operation 209 calculates current zoom level 670 and operation 691 determines current layer visibility. FIG. 6 teaches detail display control.

An example of an application of the methods taught in herein is a truck dispatch/call center application. View window 803 displays a current truck location while view window 823 simultaneously displays a pickup/delivery location in a second view window 823. Both view windows 803 and 823 are derived from common final image file 800.

Another example of an application of the methods taught herein is an emergency call center application where the location of an emergency is displayed in view window 803 and locations of emergency equipment are displayed in additional view windows. All view windows are derived from common final image file 800.

FIG. 2 is a flow chart which teaches final image file 800 decompression, memory management, screen drawing, and display refresh. Operation 203 reads final image file 800 generated by map generator algorithm 300 (FIG. 3A). Final image file 800 contains compressed entity labels and a linked list of compressed entity structures 400 (FIG. 4.) organized in layers.

Operation 202 performs decompression of labels. Label decompression is taught in FIG. 12B. Dictionary file 1208, which contains a lookup table for use in label decompression, must be accessible by label decompression algorithm 1230. Alternately, if labels are compressed using an alternative compression method such as LZW (Lempel, Ziv, and Welch), labels would be decompressed using techniques appropriate to such method. Operation 211 reads limits of active user viewing window(s) 277. Decision 210 tests view window 803 for movement, panning, or zooming. If movement, panning, or zooming is detected, operations 207 and 208 calculate preload vector 805 and new load region 812 as taught in FIG. 8. Otherwise, operation continues to operation 209.

Figure 10:
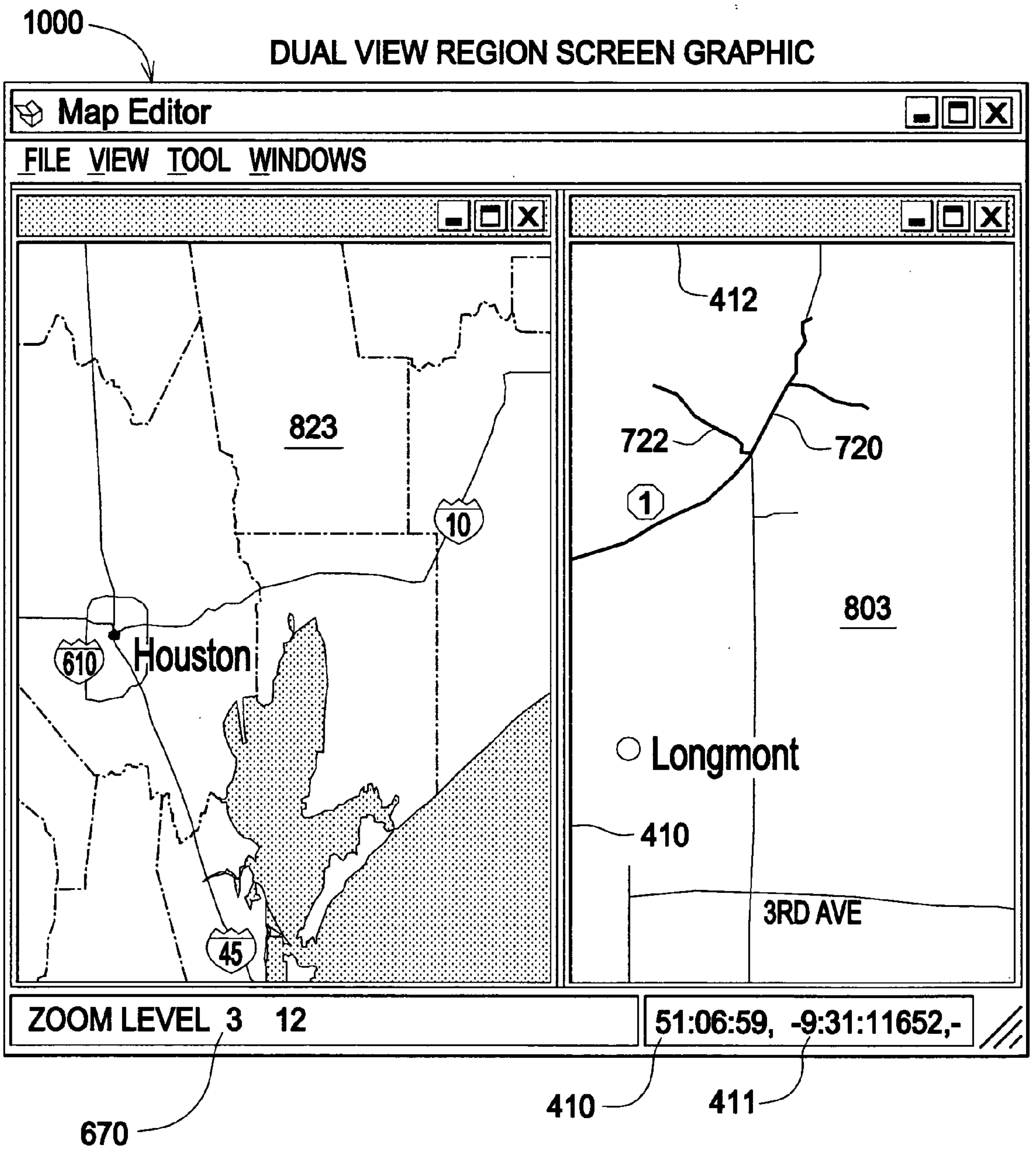
FIG. 10 is a sample map application GUI screen shot demonstrating multiple view windows.

Operation 209 determines current zoom level 670. Operation 225 reads user defined layers from GUI (FIG. 10). Operation 691 calculates visible layer items such as labels and residential streets from table 690 as taught in FIG. 6. Masking function 692 logically ANDs user selected layers 693 with the calculated list from operation 691. Active (visible) layers control the drawing engine when painting view window(s) 803 resulting in automatic control of the level of screen detail and minimization of clutter within requested current zoom level 670.

Figure 8:
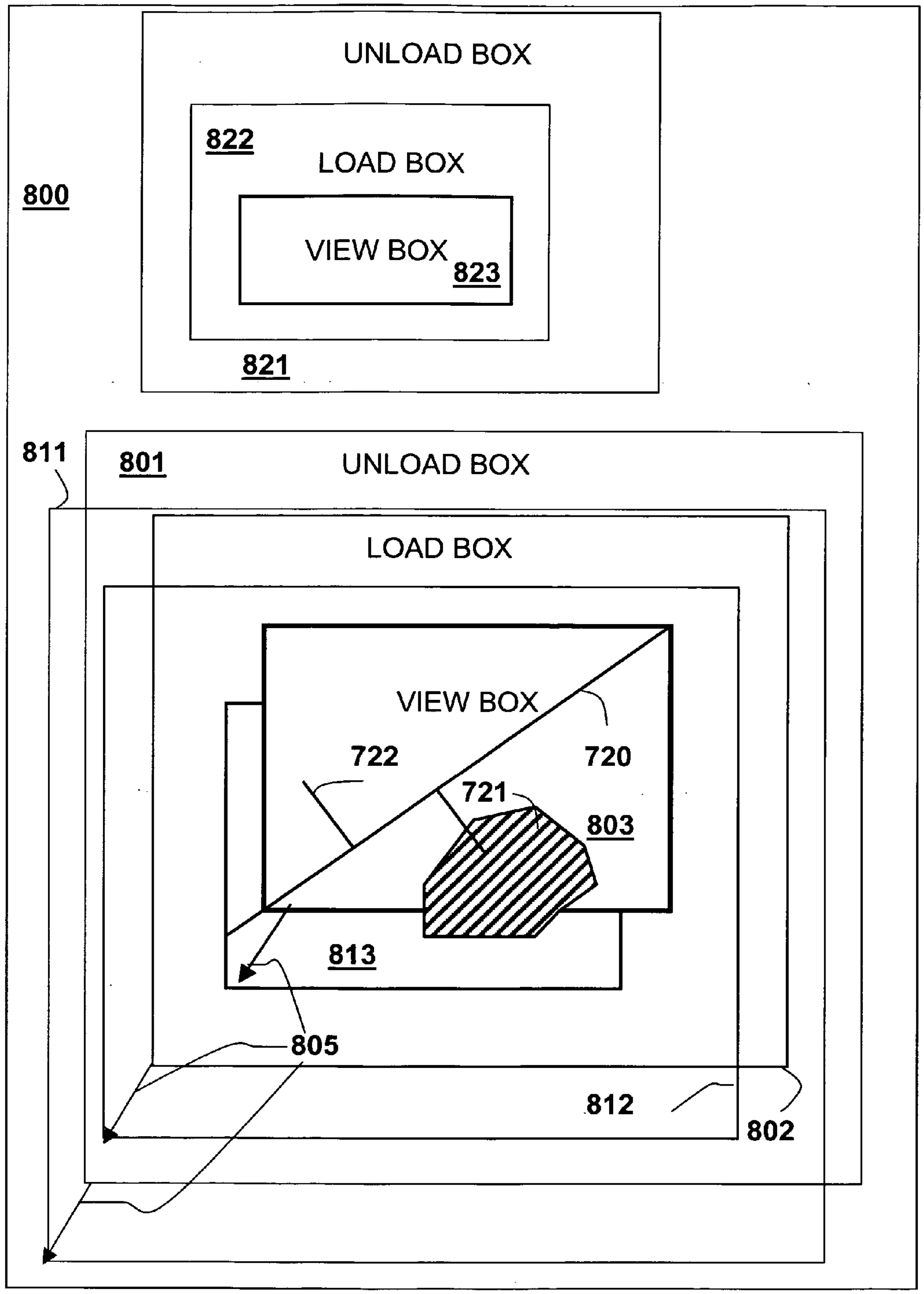
FIG. 8 is a schematic diagram of the memory management and display management processes.

Operation 230 reads compressed structures 400 (FIG. 4) within active view region(s) 803 and 823 from final image file 800. Decision 231 tests for view window movement, panning, or zooming. If panning is detected, operation 232 preloads compressed structures found in area 813 of the direction of preload vector 805 (FIG. 8). Thus, elements in region 813 are already resident in local memory and available for immediate display. Preloading of data into memory may be performed at a lower priority than other tasks thereby not interfering with refreshing or drawing of current visible regions 803, 823. This novel memory management method results in a net panning speed improvement over prior art and smoother map viewing compared to prior art.

Operation 234 continues preloading into memory entities located within load region 802. Preloading of data into memory may be performed at a lower priority than other tasks thereby not interfering with refreshing or drawing of current visible regions 803, 823. By way of example and not limitation, load region 802 may be the same size as the next larger zoom window 651. This results in zooming out that is substantially faster than in prior art because entities located in the next larger zoom window are already loaded into memory.

Operation 281 tests if the application requires absolute coordinate data. Absolute coordinate data may not be required because a screen can be drawn or refreshed using relative coordinate data. Because relative coordinate data is relative to a corner of the current bounding box, the screen can be drawn or refreshed by mapping relative coordinate data points in relation to the appropriate corner of the current bounding box.

If absolute coordinate data is required, decompression operation 260 is executed. Decompression operation 260 is taught in FIG. 2C. Otherwise, decompression operation 260 is skipped under operation 282.

Decision 235 tests if all entities in the current view window 803 are loaded. If false, loading of entities within the current view window continues under operation 222. If true, operation 236 reads current view windows 803, 823 and test for movement, panning, zooming, or changing of the window boundaries, thereby requiring updating of the data in the new visible regions.

Decision 237 tests if all entities are loaded within the current load region 802. If true, operation continues to operation 292. If false, operation returns to operation 230 until all visible entities have been loaded into memory.

Figure 4:
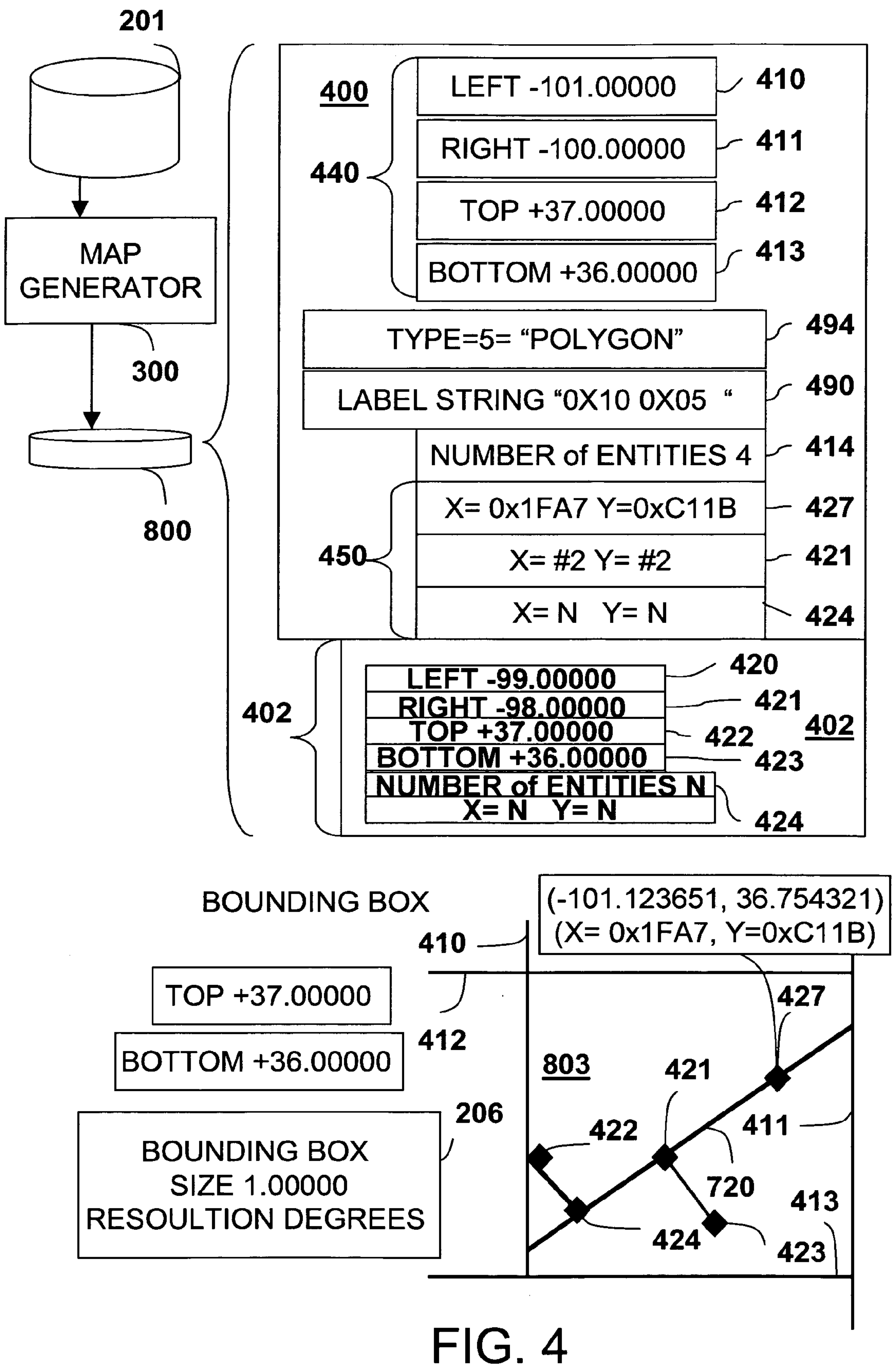
FIG. 4 is a schematic diagram of a compressed database structure.

Decompression 260 consists of two distinct parts—a label decompression algorithm as taught in 1230 (FIG. 12B), and optional relative to absolute coordinate conversion. Operation 240 reads compressed entity structure 400 (FIG. 4) from final image file 800. Operation 1230 (FIG. 12B) performs label decompression. Operation 241 reads entity count parameter 414 (FIG. 4). Decision 242 tests if the entity count is zero (or done). If true, operation continues to decision 235. If false, operation continues to decision 281.

Decision 281 tests if absolute coordinate data is required. Due to the unique properties of relative coordinate data as taught in FIG. 5, applications may not require absolute coordinate data because relative coordinate data may be used directly by screen drawing or refresh operation 259. Display-only applications realize substantial processor resource savings by using relative coordinate data to directly draw or refresh a screen in operation 259.

Horizontal delta is the difference between boundary box right side 411 and boundary box left side 410. Vertical delta is the difference between boundary box bottom side 413 and boundary box top side 412. Operation 253 reads relative coordinate data 450. Operations 254 multiply relative coordinate data by either horizontal delta or vertical delta and divide the product by resolution parameter 206. By way of example and not limitation, resolution parameter 206 is a power of two permitting multiplication to be implemented as a shift operation. Bounding box reference points 257, 258 are added to the output of multiplier operations 254 in operation 256. The output of adders 256 consists of absolute coordinate data with maximum error 550 (FIG. 5) associated with resolution parameter 206 as found in column 510 of the scale factor table contained within the description of FIG. 5. Decompression is efficiently performed as a multiply accumulate (MAC) operation which is frequently implemented in modern processors and common to all digital signal processors (DSP). Operation 261 decrements entity count 414; operation continues until all relative coordinate data points 450 are processed. Operation 267 writes absolute coordinate data to memory for display and/or to output for other applications.

Decision 292 tests if all layers set in 691 were processed. If true, operation 236 indexes to the next visible layer. Changes in current zoom level 670 may change which layers are visible. Entities on other visible layers are processed in the same manner.

If decision 292 is false, decision 227 tests if loaded layers are now invisible due to changes in current zoom level 670 or are disabled by an user via user entity list 693. If layers are no longer visible, they may be unloaded from memory under operation 239. Decision 228 tests if entities are located outside unload region 801. If true, they may be unloaded from memory under operation 294. Thus, memory resources may be automatically freed for loading new map data.

FIG. 3 is a flow chart of the data compression process. The purpose of map generator algorithm 300 is to create final image file 800. Each final image file 800 represents map regions according to specific application requirements such as consumer navigation or delivery business needs. As an example and not as a limitation, input map data file 201 may consist of Tiger/Line files. The US Census Bureau provides Tiger/Line files in ASCII character format where different layers or features are grouped in terms of geopolitical entities. The information contained within the files represents different map features grouped in a convenient way to be displayed easily and quickly.

As an example and not as a limitation, during operation of map generator algorithm 300, the following basic parameters may be visible to and/or selected by the user: (a) a hierarchical list of primary features, having 2 or 3 levels of details; (b) feature names matching the US Census Bureau terminology; (c) coverage area (or area size); (d) required accuracy; (e) location of input map files; (f) shape types; (g) additional chains of point, line, and area combinations for landmark or water areas; (h) specific parameters for lower and higher CFCC range; and (i) a file prefix used to identify created map files.

Map generator algorithm 300 operates as follows. Operation 302 reads user specified input map data file(s) 201. Operation 304 then reads resolution parameter 206. Operation 306 then determines which layer of entity list 212 is being processed.

A line of input data is next read in operation 308. Operation 310 then constructs a bounding box of a size determined from resolution parameter 206. Decision 312 next tests if the line of input data read in operation 308 is within the bounding box constructed in operation 310. If not, operations 310 and 312 are repeated until a bounding box that contains the line of input data read in operation 308 is created. Thus, once operations 310 and 312 are completed, all data read in operation 308 is associated with a bounding box.

The algorithm continues to operation 314 where an entity header is created. Operation 316 then creates a part header, where a part is a subset of an entity. The algorithm proceeds to adaptive absolute to relative coordinate compression algorithm 500, where a point, which is a subset of a part, is compressed. If desired, additional data compression can be performed using other compression methods such as the Douglas-Peucker algorithm taught in FIG. 11. The resulting compressed point is then stored in data collection in operation 318. Operation 320 then increments the point count. Decision 322 tests if the point just processed was the last point in the current part. If not, operations 500, 318, and 320 are repeated until each point within the current part is processed.

Operation 324 then increments the part count. Decision 326 next checks if the part just processed was the last part in the current entity. If not, operations 316, 500, 318, 320, 322, and 324 are repeated until all parts in the current entity have been processed.

Operation 328 then increments the entity count. Decision 330 tests if all entities within the current bounding box have been processed. If not, operations 314, 316, 500, 318, 320, 322, 324, 326, and 328 are repeated until all entities within the current bounding box have been processed.

The algorithm proceeds to operation 1230 which compresses the entity labels. The compressed entity labels and compressed data points are then saved to data structure 400 in operation 332.

Decision 334 next tests if all input data corresponding to the current layer has been processed. If not, the algorithm returns to operation 308 which reads the next line of data. Otherwise, the algorithm continues to decision 336 which tests if all layers selected in entity list 212 have been processed. If not, the algorithm returns to operation 306 which selects the next layer. Otherwise, the algorithm proceeds to operation 338.

Operation 338 writes all data structures 400 to final image file 800. By way of example and not limitation, the file name associated with final image file 800 may be constructed in a manner such the file name describes final image file's 800 content. By way of example and not limitation, the file name of final image file 800 conforms to a specific format suggesting the geographic area it represents, the type of entities it contains, and the accuracy of the data it contains. The file name structure is prefixed with a two character prefix parameter provided by the user. The next three characters of the file name are three digits equal to the initial latitude plus 90 degrees. The next three characters of the file name are three digits equal to the initial longitude plus 180 degrees. Thus, the base file name is eight characters long. A three character extension is added to the end of the file name.

FIG. 4 is a schematic diagram of the compressed database structure. Map generator algorithm 300 parses, filters, and compresses input map data file 201 into final image file 800.

At time of database generation, an user defines resolution parameter 206. Map generator algorithm 300 (FIG. 3A) reads input map data file 201 and groups entities into variable length structures 400 containing entities located within the limits of current bounding box 440. By way of example and not limitation, left longitude limit 410, right longitude limit 411, top latitude limit 412, and bottom latitude limit 413 define the limits of the data structure. Parameter 494 defines the data structure or layer type.

Figure 5:
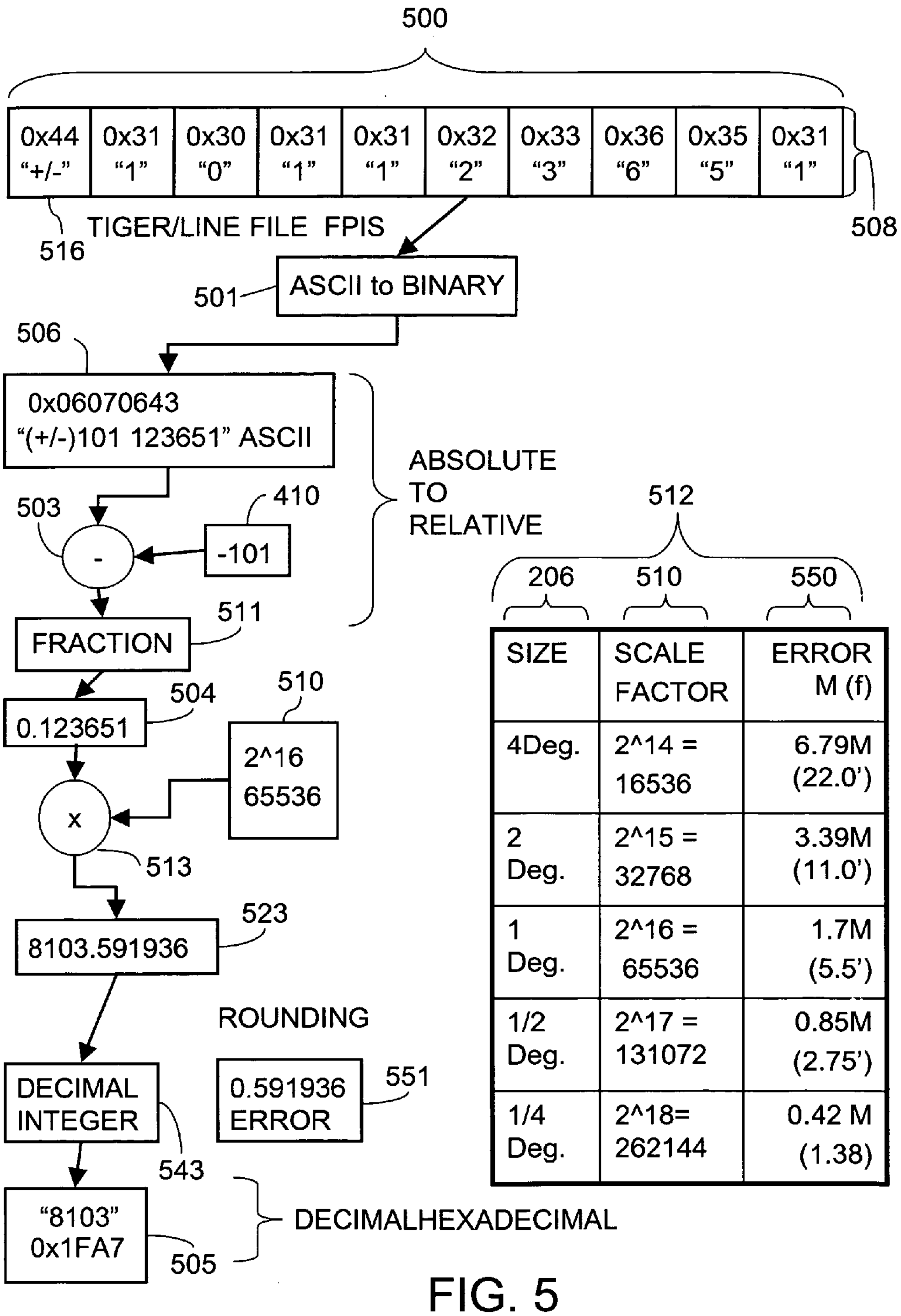
FIG. 5 is a data flow diagram of a coordinate compression process.

Absolute coordinate data points are compressed by adaptive absolute to relative coordinate compression algorithm 500 as taught in FIG. 5. Resulting n-dimensional coordinate points 427, 421 are written to structure list 450 containing number of entities 414. Relative coordinate data points are relative to the absolute coordinates of the bounding box reference point.

Each entity typically has an ASCII string label associated with it. Label compression algorithm 1220 (FIG. 12A) compresses each label by assigning it a binary token for each word found in dictionary file 1208. The resulting tokenized string is written to structure 400 as compressed label 490.

FIG. 5 is a data flow diagram of the adaptive absolute to relative coordinate compression algorithm. Map generator algorithm 300 (FIG. 3A) parses, filters poly-points and poly-elements (polyline and polygons) from input map data file 201 into final image file 800 (FIG. 1). Resolution parameter 206 (FIG. 1), set by user at map file generation time, sets maximum error parameter 550. Absolute coordinate data is compressed by converting it to relative coordinate data.

By way of example and not limitation, the bottom left corner of a two dimensional bounding box is set as the bounding box reference point. The methods taught herein would also apply to n-dimensional input map data files 201.

Width is the difference between boundary box right side 411 and boundary box left side 410. Height is the difference between boundary box top side 412 and boundary box bottom side 413.

Operation 501 converts an ASCII (string) number to an interim decimal float or an unsigned integer with an implied decimal point 506. An x-axis absolute coordinate is converted to a relative coordinate by subtracting from it the absolute coordinate left boundary box side 410 in operation 503, dividing the difference by Width, and multiplying the resulting quantity by a scaling factor 510 in operation 513. By way of example and not limitation, scaling factor 510 is 65,535.

A y-axis absolute coordinate is converted to a relative coordinate by subtracting from it the absolute coordinate bottom boundary box side 413 in operation 503, dividing the difference by Height, and multiplying the resulting quantity by scaling factor 510 in operation 513. By way of example and not limitation, scaling factor 513 is 65,535.

Operation 543 rounds scaled result of operation 523. Rounding may be accomplished by rounding up or down to the nearest integer. Alternately, rounding may be accomplished by faster but less accurate integer truncation. Rounding error 551 is often smaller than or the same size as the error or uncertainly associated with current public and private GPS databases. Thus, adaptive absolute to relative coordinate compression algorithm 500 may be virtually loss-less. Operation 505 converts final decimal integer 543 to a binary integer for storage.

The following are sample calculations of a conversion from an absolute coordinate point to a relative coordinate point. The calculations were performed on a personal computer comprised of a 3.0 GHz, Intel Pentium microprocessor; 1 GB of RAM; and Microsoft Windows 2000 operating system. By way of example and not limitation, the input map data file 201 is two dimensional. The absolute coordinates of the point to be converted to relative coordinates are −95.692623, 29.096733. These coordinates are of four bytes length. The bounding box left side 410 has a value of −96.004631; the bounding box right side 411 has a value of −94.994980; the bounding box top side 412 has a value of 30.020126; and the bounding box bottom side 413 has a value of 28.993847.

Width=right side−left side=−94.994980−(−96.004631)=1.009651. Height=top side−bottom side=30.020126−28.993847=1.026279.

The relative horizontal coordinate=[(x-coordinate−left side)/width](scaling factor)=[(−95.692623−(−96.004631))/(1.009651)](65535)=20252.

The relative vertical coordinate=[(y-coordinate−bottom side)/height](scaling factor)=[(29.096733−28.993847)/(1.026279)](65535)=6570.

The resulting relative coordinates are of only two bytes length. Thus, the four byte absolute coordinate pair −95.692623, 29.096733 is converted to two byte relative coordinate pair 20252,6570.

Relative coordinate data is converted to absolute coordinate data by essentially reversing adaptive absolute to relative coordinate compression algorithm 500 as taught in FIG. 5. Binary relative coordinate data is converted to decimal float or unsigned integer with an implied decimal point data in operation 505. An x-axis relative coordinate is converted to an absolute coordinate by multiplying the relative coordinate by Width, dividing the product by scaling factor 510, and adding the left boundary box side 410 to the quotient.

A y-axis relative coordinate is converted to an absolute coordinate by multiplying the relative coordinate by Height, dividing the product by scaling factor 510, and adding the bottom boundary box side 413 to the quotient.

Novel adaptive absolute to relative coordinate compression algorithm 500 is easily adapted to custom dedicated hardware engines due to its simple data flow and use of binary arithmetic. Data is loaded and unloaded to memory via extremely fast direct memory access (DMA) with little or no processor intervention. This feature is particularly useful when processing multi-dimensional, terabyte size map files. By way of example and not limitation, the table below shows the relationship between resolution parameter 206, associated scale factor 510, and associated maximum error 550. By way of example and not limitation, 2^16 (65,536) is used for a one-degree bounding box.

Scale Factor Table

| BB Size 206 (Deg.) | SCALE FACTOR 510 | *Error (Feet) 550 (FIG. 5) | *Error(Meter) 550 (FIG. 5) |
|---|---|---|---|
| ¼ Deg | 2^18 = 262144 | 1.38 | 0.42 |
| ½ Deg. | 2^17 = 131072 | 2.75 | 0.85 |
| 1 Deg. | 2^16 = 65536 | 5.50 | 1.70 |
| 2 Deg. | 2^15 = 32768 | 11.00 | 3.39 |
| 4 Deg. | 2^14 = 16384 | 22.01 | 6.79 |

*550 maximum error at equator.

FIG. 6 is an illustration of a zoom filter operation. Because final image file 800 (FIGS. 2, 3, and 8) typically covers hundreds of square KM, multiple zoom levels may be provided to facilitate viewing. In the disclosed embodiment, sixteen current zoom levels 670 are offered by way of example and not limitation.

Entity types such as highways 720 (FIGS. 7 and 10), police or fire stations 622, parks, and small cities 631 are stored on individual layers. A sample listing of entity layers offered by way of example and not limitation is shown in table 690 below:

Layer Table 690

| LAYER Entity |
|---|
| 1. Basemap |
| 2. USBasemap |
| 3. WorldLakes |

-continued

| LAYER Entity |
| --- |
| 4. USLakes |
| 5. WorldRivers |
| 6. States |
| 7. US States, Shoreline & Counties |
| 8. Perennial Shoreline |
| 9. US Basic Inter |
| 10. Perennial stream |
| 11. Intermittent stream |
| 12. Braided stream |
| 13. Lake Excavation |
| 14. Lake Inland |
| 15. Lake Inland Perennial |
| 16. Lake Man Made Reservoir |
| 17. Lake Man Made Perennial |
| 18. Lake Man Made Intermittent |
| 19. RailRoad Tram |
| 20. RailRoad Main |
| 21. RailRoad Other |
| 22. RailRoad Tunnel |
| 23. RailRoad Yard |
| 24. RailRoad Spur |
| 25. RailRoad Under |
| 26. Alleys |
| 27. Driveways |
| 28. Preliminary Streets |
| 29. Provisional 0.125 × 0.125 14 M |
| 30. Trail 0.125 × 0.125 14 M |
| 31. Other Streets 0.125 × 0.125 14 M |
| 32. Streets Unsep 0.125 × 01.25 14 M |
| 33. Road Sep 0.125 × 0.125 14 M |
| 34. USHighways 0.25 × 0.25 7 M |
| 35. State Hwy 0.125 × 0.125 14 M |
| 36. Interstates 0.25 × 0.25 7 M |
| 37. Interstates 4 × 4 7 M |
| 38. Major Cities |
| 39. Medium Cities |
| 40. Small Cities |
| 41. Gov Police/Fire |
| 42. Landmark Parks |
| 43. Gov Office |
| 44. Health |

By way of example and not limitation, three current zoom levels are shown. Current zoom level 1, shown in view window 651, covers approximately 640,000 Square Km (25,0000 miles). Entities such as major highways 720, lakes 721 and cities 731 are shown. Entities such as police or fire stations 622 and residential streets 631-633 may be hidden from view or not loaded at this current zoom level.

As current zoom level 670 increases, additional entities are added as shown in view windows 803 and 666. Additionally, entity labels 680 are made visible.

At the highest current zoom level, all layers in table 690 are visible as shown in view window 666. An user can modify user entity list 693 via a GUI in order to mask unwanted layers. Masking function 692, shown as an "AND" gate, is taught in FIG. 2A.

The following is a summary of the table layer states:

1. The data of the layer one is loaded at the 21000 KM level per table 691.

2. The data of the layer one is unloaded at the 0 KM level. (0 means always in memory at runtime. For other layers, it can non-zero values. For example, USBaseMap is unloaded at 8000 KM Level)

3. The layer is visible in the range 8001 KMs to 500 KMs.

4. The labels (the names of the states) are visible in the range 8001 KMs to 500 KMs. (For other layers, it could be a smaller range compared to the range in #4. E.g. Streets.)

| VISIBILITY TABLE 691 |
| --- |
| 8001 KMs zoom level-1 |
| Visible Items: BaseMap. |
| Loaded at 21000 KM |
| Not Unloaded. |
| Displayed from 21000 KM to 0 KM |
| Label: invisible |
| 2 KMs zoom level-5 |
| Visible Items: USBaseMap, USHighways, State Hwy. Interstates, |
| Loaded at 21000 KM |
| Unloaded at 8000 KM |
| Displayed from 21000 KM to 8000 KM |
| Label Displayed from 21000 KM to 8000 KM |
| 0.1 KMs zoom level-16 |
| Visible Items: All items |
| Loaded at 21000 KM |
| Unloaded at 8000 KM |
| Displayed from 21000 KM to 8000 KM |
| Label Displayed from 21000 KM to 8000 KM |

The pseudo-Code fragment below teaches label/text visibility control 691 verses current zoom level 670. In most cases, labels are enabled (made visible) at zoom level four and above with the exception of states and streets.

1. States: At current zoom levels one to four, only label abbreviations are shown. At higher current zoom levels, full labels are displayed.

2. Streets:

If zoom in to the level (scale)<2-KM then show all the labels.

```
    Else
    {
    Show label only when number of the road parts >
(Current Scale / 2)
    }
```

Screen view preload feature as taught in FIG. 8 speeds screen refreshing when zooming out by automatically loading the next lower zoom area to memory. Thus, when zooming out, entities are already loaded to memory and are thereby available for immediate display. Operation of the current layer visibility 691 filter further speeds screen refreshing by reducing the number of entities displayed on the screen. Additionally, the automatic zoom level detail filter process described above enhances user perception by reducing screen clutter. When zooming in, entities now located outside unload region 801 (FIG. 8) may be removed from memory.

Figure 7:
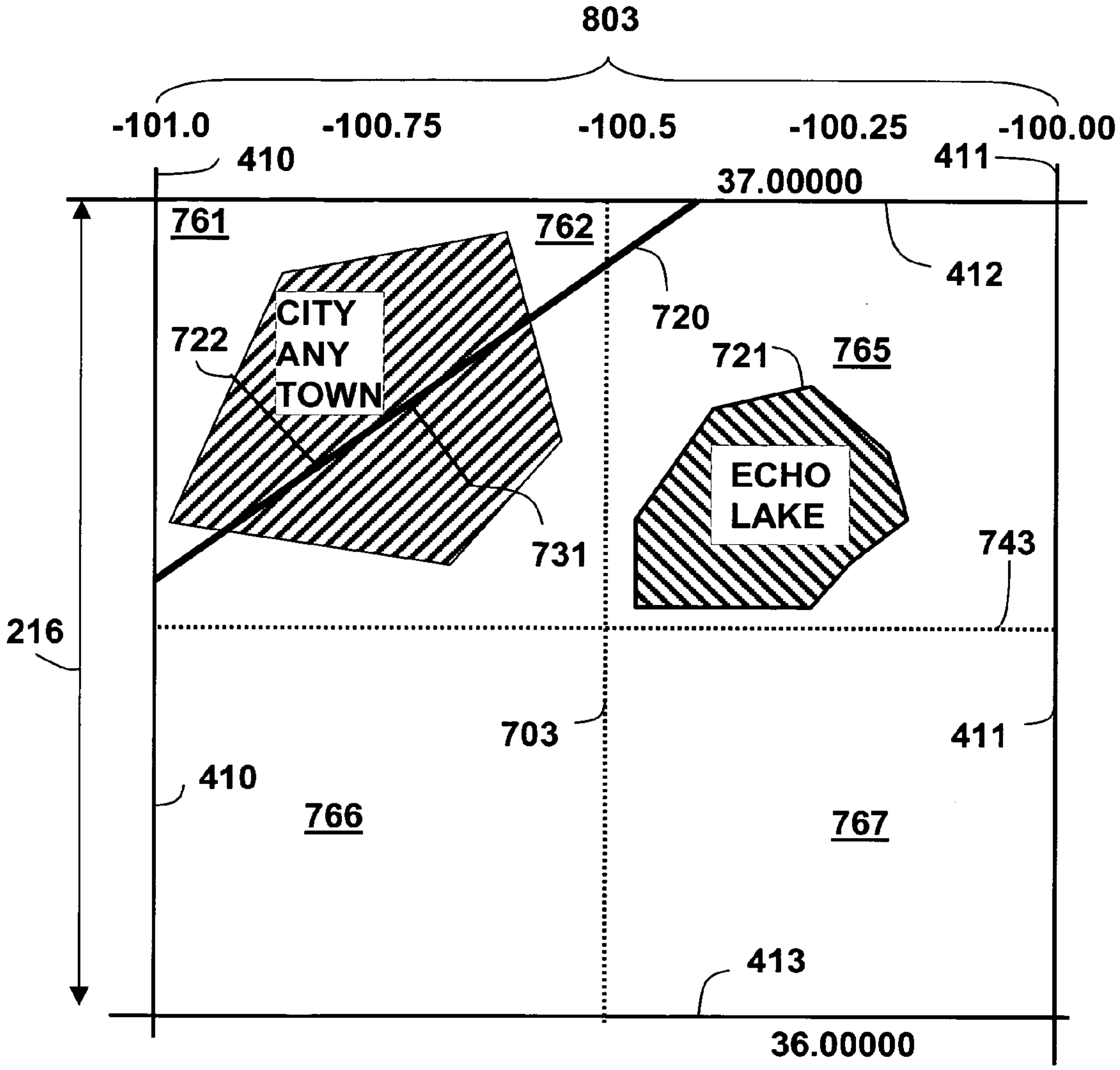
FIG. 7 is an illustration of the division of a map input file into identical sized bounding boxes.

FIG. 7 is an illustration of the division of an input map file 201 into bounding boxes. This operation is a subset of map generator algorithm 300. Operation 308 reads a line of data. Operation 310 then constructs bounding box 761 of a size that is determined from resolution parameter 206. Bounding box 761 consists of left side 410, right side 703, bottom 743, and top 412. Decision 312 tests if the data is located within bounding box 761. Entities 720, 722, and 731 are located within bounding box 761, and are thus associated with this bounding box.

Operation 310 then creates bounding box 765 of a size again determined by resolution parameter 206. Bounding box 765 consists of left side 703, right side 411, bottom 743, and top 412. Decision 312 tests if the data read in operation 308 is located within bounding box 765. Entity 721 is located within bounding box 765, and thus is associated with this bounding box. The process repeats itself until the entire input map file 201 is divided into equal sized bounding boxes and all data read in operation 308 is associated with a bounding box.

FIG. 8 is a schematic diagram of the memory management and display management processes. Final image file 800 (FIG. 2, FIG. 3) is the complete compressed database available for viewing. Arbitrary shaped view window 803, which is established by an user, is typically displayed to a flat panel or CRT display. By way of example and not limitation, view windows 803 and 823 are shown as rectangles. Selection of view window 803 prompts the corresponding generation of superset larger load region 802. Generation of load region 802 in turn prompts corresponding generation of a larger unload region 801. The architecture of the methods taught in FIG. 1 permits multiple view windows 803 and 823 to access a common final image file 800. By way of example and not limitation, a second load region 822, unload region 821, and view window 823 are shown. FIG. 10 is a sample map application GUI screen shot demonstrating multiple view windows.

Entities 720, 721, and 722, which are located within view window 803, are immediately loaded to memory and displayed. By way of example and not limitation, entities within load region 802 are loaded to memory as processor cycles become available. By way of example and not limitation, load region 802 is refreshed every 100 milliseconds. Entities outside of unload region 801 may be unloaded from memory and discarded. By way of example and not limitation, unload region 801 is refreshed at a lower priority of every 3,000 milliseconds. Thus, loading of entities located close to view window 803 is carried on at a higher priority than other tasks. This memory management method results in entities located close to view window 803 being immediately available in the event the view window is moved or resized. Because entities located outside unload region 801 may be unloaded at a relatively low priority, memory resources may be minimized while maintaining rapid screen drawing and refresh rates.

User requested panning movement creates preload vector 805 which results in the creation of new unload region 811, new load region 812, and new view window 813. Entities located within new view window 813 are immediately available for drawing to the screen because they were previously loaded to memory as part of load region 802. Thus, there are no delays associated with loading into memory entities located in new view window 813. At scheduled intervals, entities located within new load region 812 are loaded to memory in the same manner as entities located within load region 802. Entities located outside new unload region 811 may be unloaded from memory in the same manner as entities located outside unload region 801. To further enhance screen drawing and refresh response, entities within load region 802 that are in the direction of preload vector 805 are loaded before other entities within load region 802 are loaded. This predictive or adaptive pre-loading of entities further speeds screen drawing and refresh.

By way of example and not limitation, load region 802 is two times the size of view window 803. By way of example and not limitation, unload region 801 is two times the size of load region 802.

Actual required memory size is dependent on screen size, resolution, desired speed of operation, and available system resources. Faster view window panning may be achieved by increasing the load region size. Load region 802 and unload region 801 sizes may be set to optimize the use of physical memory. Timing of load region 802 and unload region 801 operations may be set to optimize operation. Load region 802 and unload region 801 characteristics may be automatically adjusted based on enabling hardware characteristics.

Figure 9:
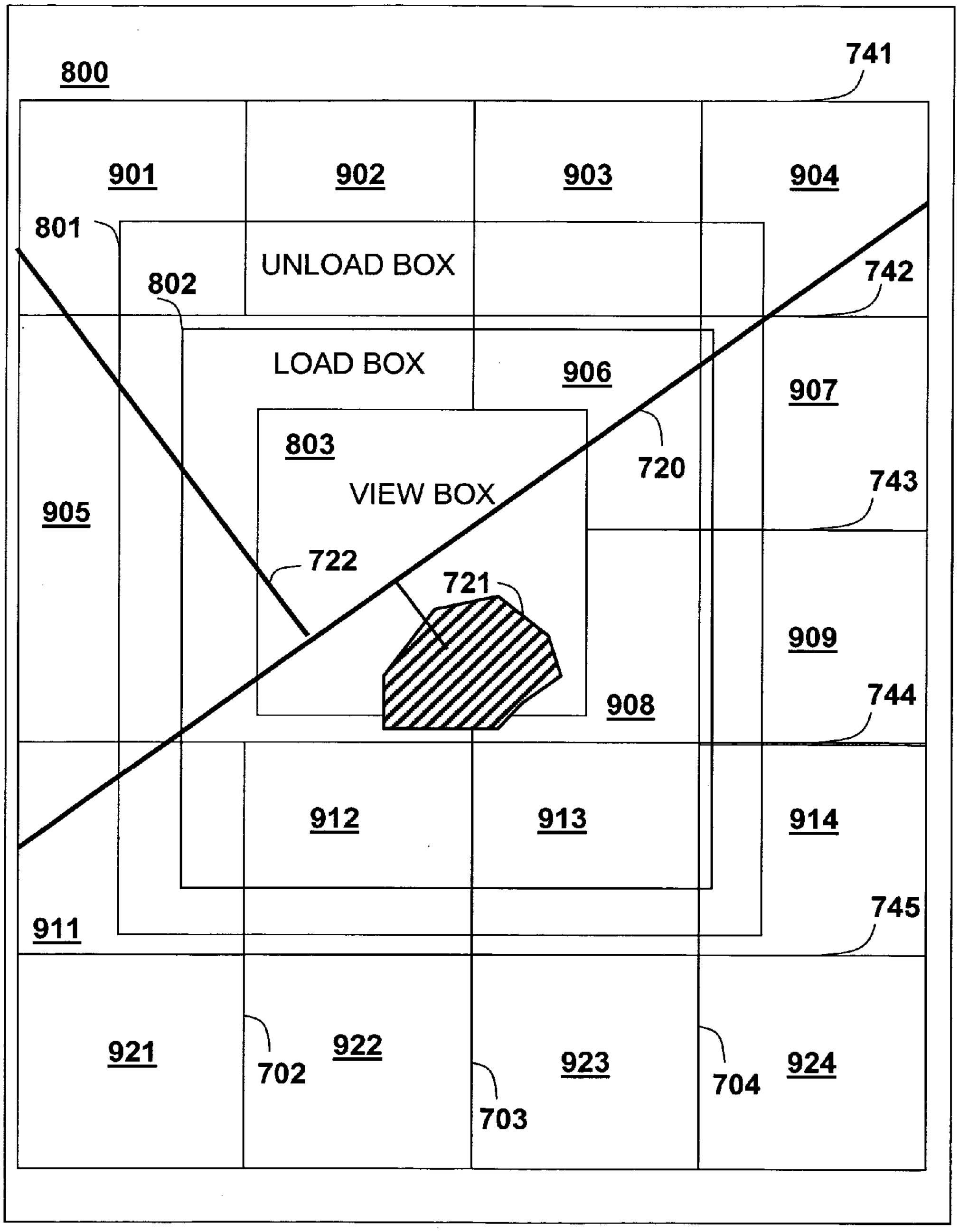
FIG. 9 is a schematic diagram of the memory management and display management processes.

FIG. 9 is a schematic diagram of the memory management and display management processes. Final image file 800 is a complete compressed database available for viewing. Decompression algorithm 200 traverses final image file 800. Arbitrary shaped view window 803, which is established by an user, is typically displayed to a flat panel or CRT display. By way of example and not limitation, view window 803 is shown as a rectangle. Selection of view window 803 prompts the corresponding generation of superset larger load region 802. Generation of load region 802 in turn prompts corresponding generation of a larger unload region 801. The architecture of the methods taught in FIG. 1 permits multiple view windows to access a common final image file 800. FIG. 10 is a sample map application GUI screen shot demonstrating multiple view windows.

Boundaries of load region 802 are compared to the boundaries of bounding boxes 905, 906, 907, 908, 909, 911, 912, 913, and 914. Only data in bounding boxes that intercept load region 802 will be loaded into memory. For example, entities 720, 721 and 722 are within view window 803 and are drawn to the display. Objects outside unload region 801 may be unloaded from memory and discarded. Loading entities only when needed speeds screen refresh rates, minimizes processor resources, and minimizes costly RAM memory.

Unused entities may be automatically unloaded to free up memory resources as a lower priority action than other tasks. Thus, memory and processor resources may be minimized while maintaining rapid screen drawing and refresh rates. This feature is particularly critical to limited resource devices such as cell phones and personal digital assistants.

FIG. 10 is a sample map application GUI screen shot demonstrating multiple view windows. By way of example and not limitation, FIG. 10 shows two view windows 803 and 823, which are derived from common final image file 800. An user may open one to N number of view windows which are derived from common final image file 800. An user may select any region for viewing from final image file 800. Arbitrary shaped view window(s) 803 established by user, by way of example and not limitation, may be displayed on a flat panel or CRT display. By way of example and not limitation, view windows 823 and 803 are shown as rectangles. Selection of view window 803 prompts the corresponding generation of invisible superset larger load region 802. Generation of load region 802 in turn prompts corresponding generation of a larger invisible unload region 801.

Entities 720 and 722 within view box(s) 803 are loaded to memory and displayed immediately. Load box 802 preloads (not visible) objects just outside visible window 803 to memory as a medium priority processor task. By way of example and not limitation, load box 802 is refreshed every 100 milliseconds. Simultaneously, the processor unloads/discards objects outside region 801 from memory as a low priority task. By way of example and not limitation, unload box 801 is refreshed every 3,000 milliseconds. In this way, objects close to view region(s) are loaded at a higher priority thus making them immediately available to view window 803 if it is moved and/or resized. Unused objects are unloaded in a low priority loop to free up memory resources. Thus, memory resources are minimized while maintaining rapid screen refresh rates.

Figure 11:
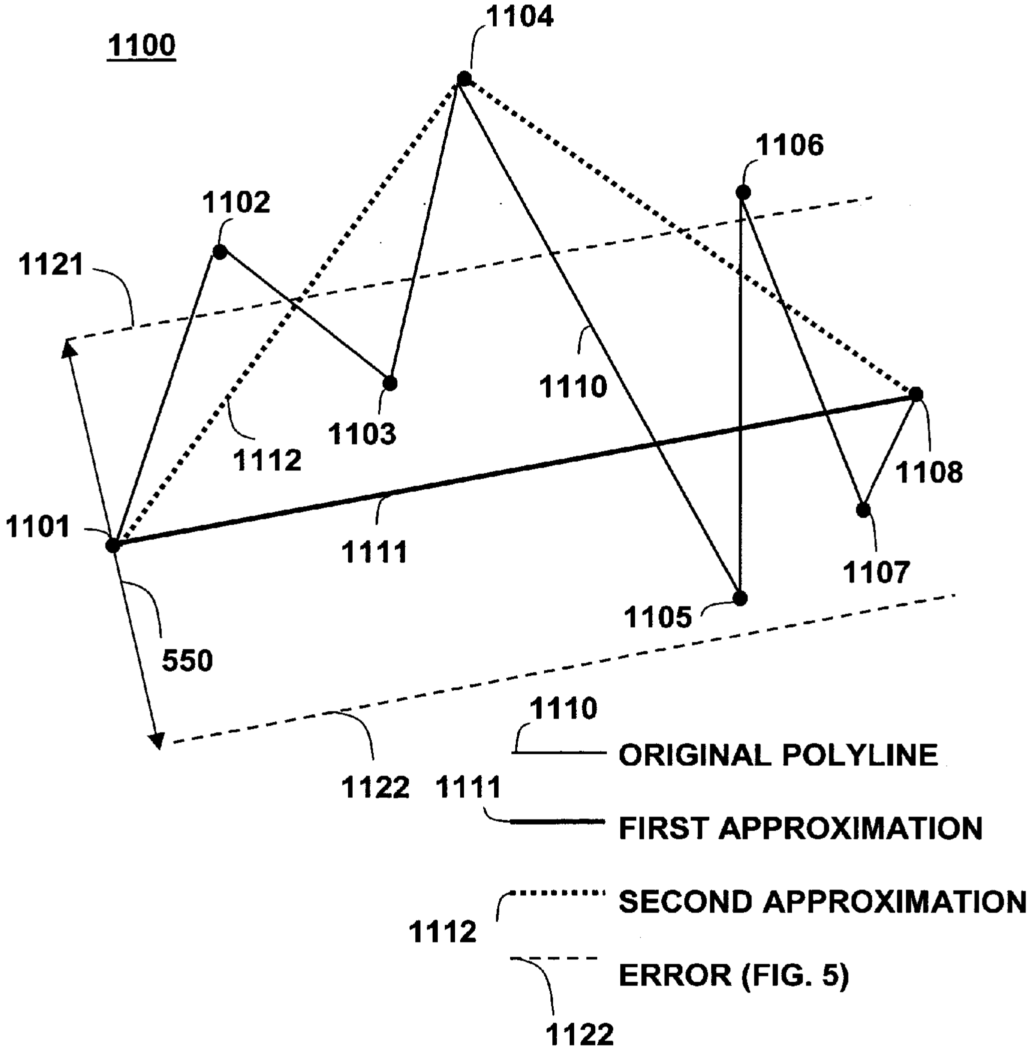
FIG. 11 is an illustration of the operation of a Douglas-Peucker line reduction algorithm.

FIG. 11 is an illustration of the operation of Douglas-Peucker line reduction algorithm 1100. A compression method such as Douglas-Peucker may be used in addition to adaptive absolute to relative coordinate compression algorithm 500 if additional compression is desired. Douglas-Peucker line reduction algorithm 1100 is offered by way of example and not limitation. Douglas-Peucker line reduction algorithm 1100 is taught due to its computational simplicity and ability to achieve a high compression ratio.

The Douglas-Peucker line reduction algorithm 1100 considers the closeness of a vertex to an edge segment. The Douglas-Peucker algorithm tries to preserve directional trends in a line using a predetermined maximum error parameter 550 selected according to the amount of simplification required.

This algorithm works top down by starting with a crude initial guess at simplified polyline 1111, namely the single edge joining first vertex 1101 and last vertex 1108 of polyline 1110. The distances from remaining vertices 1102 through 1107 to polyline 1111 are measured. If the measured distances are greater than predetermined tolerances 1121 or 1122, then an additional vertex must be added. Because vertices 1102, 1104, and 1106 exceed tolerance 1121, vertex 1104 is added. The second approximation consists of polyline 1112. Using recursion, this process continues for each edge of the current approximation until all vertices of the original polyline 1110 are within tolerances 1121 or 1122 of the approximation. In this example, final approximation polyline 1110 eliminates five vertices from the original eight resulting in 63% (5/8*100=63%) compression.

FIG. 12 is a flow chart of text label compression and decompression processes. Large databases often contain duplicate data permitting compression. Unfortunately due to the random distribution of duplicate data typically found in map files, common run length encoding type compressors are of little help. The compression method taught herein is based on the statistical frequency of words occurring in map files. For example, words such as "CITY", "STREET", and "HILL" occur frequently in map files. Compression is achieved by replacing each word in a label with a binary token associated with the word. The lookup table containing the words associated with tokens is contained within dictionary file 1208. The level of compression is dependent on the number of reoccurrences of words found in the map file. Final compressed labels 490 (FIG. 4) are saved as one or more tokens with or without ASCII strings.

Operation 1210 builds a histogram and dictionary of all words found in input map data file 201. Operation 1201 reads a label string assigned to an entity. Operation 1203 parses the string by locating individual words or phrases, typically separated by ASCII spaces, within the string. Operation 1205 test if all words within the string have been located. If true, the operation 1210 terminates. Otherwise, decision 1207 checks if the word is new. If true, the word is added to dictionary file 1208 and the next word is read. Otherwise, operation 1206 increases the word count and reads the next word. Operation 1210 is repeated for each label string. Each entry in dictionary table 1208 is assigned a token. By way of example and not limitation, the token is equal to the address of the word in dictionary file 1208.

Operation 1220 compresses entity labels by replacing individual words contained within them with unique tokens. Operation 1211 reads each label string assigned to the entity. Operation 1212 parses the string locating individual words or phrases, which are typically separated by ASCII spaces. Decision 1213 tests if the word is found in dictionary file 1208. If true, operation 1218 replaces the word with a token. Otherwise, operation 1214 leaves the word unchanged. Decision 1217 tests if all words in the string have been read. If false, operation 1216 reads the next word from the string. Otherwise, operation 1215 writes the word to compressed entity structure 400.

Operation 1230 decompresses compressed labels 490. Operation 1230 scans compressed labels 490 and replaces individual tokens with corresponding strings from dictionary file 1208.

Operation 1231 reads compressed label 490 assigned to an entity. Decision 1232 determines if compressed label contains a token. If true, operation 1238 replaces the token with its corresponding word from dictionary file 1208. Otherwise, operation 1234 leaves the word string unchanged. Decision 1237 checks if all words have been read from compressed label 490. If false, operation 1236 reads the next word. Otherwise, operation 1235 writes the final string.

Decompression operation 1230 taught herein is computationally simple and very fast when implemented with modern processor memory addressing methods. By way of example and not limitation, the following is a sample "C" language code fragment implementing decompression operation 1230:

```
Switch( . . . )
{
        case 0x05:                // Phrase "BLVD"
            m_strRtn += (TCHAR)32; // " "
            m_strRtn += (TCHAR)66; // "B"
            m_strRtn += (TCHAR)76; // "L"
            m_strRtn += (TCHAR)86; // "V"
            m_strRtn += (TCHAR)68; // "D"
            m_strRtn += (TCHAR)46; // "."
            break;
      case 0x07:                                    //
Phrase "City"
            m_strRtn += (TCHAR)67; // "C"
            m_strRtn += (TCHAR)73; // "I"
            m_strRtn += (TCHAR)84; // "T"
            m_strRtn += (TCHAR)89; // "Y"
            break;
      case 0x10:                                    //
Phrase "HILL"
            m_strRtn += (TCHAR)72; // "H"
            m_strRtn += (TCHAR)73; // "I"
            m_strRtn += (TCHAR)76; // "L"
            m_strRtn += (TCHAR)76; // "L"
            break;
. . .
}
```

For example, the word "CITY" is assigned binary token binary value 0x07. Assume the program reads string "Echo" and value 0x07 from compressed label 490. The program then checks a lookup table in dictionary file 1208 and converts 0x07 to the string "CITY". The string "CITY" is concatenated with the string "Echo" forming the full name "Echo City".

If additional space reduction is required, the dictionary file 1208 may be compressed using common run length encoding systems such as such as Lempel Zev Welch (LZW). However, additional processor resources are required to uncompress compressed dictionary file 1208 at run time. The additional space reduction achieved by using a run length encoding system should be balanced with the additional processor resources required to implement it.

Figure 13:
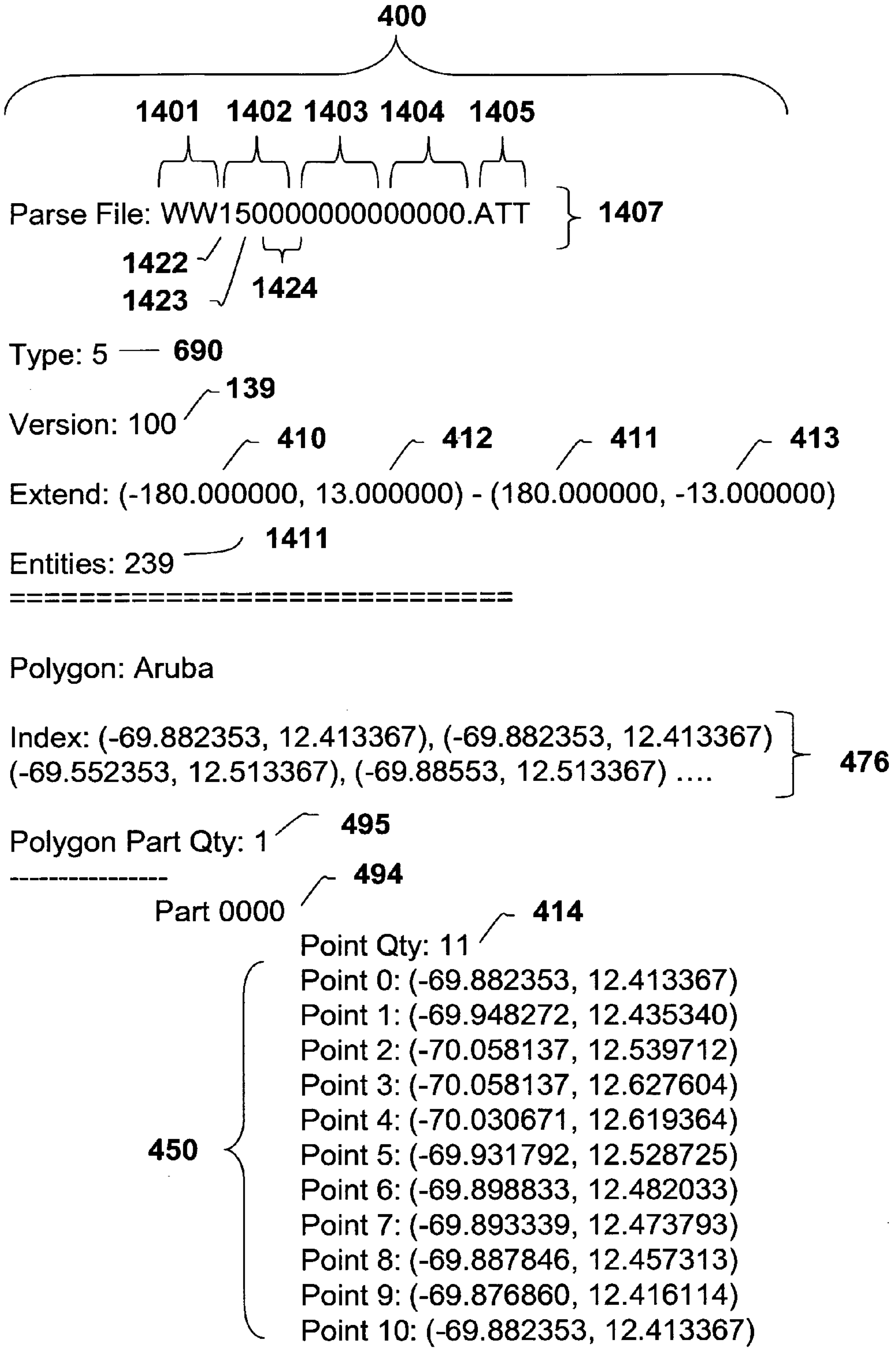
FIG. 13 is a sample of an ASCII polygon map file fragment.

FIG. 13 is a sample of an ASCII polygon map file fragment. The details of this fragment are essentially the same as those taught in FIG. 14 for a sample ASCII polyline map file fragment. Thus, the details of FIG. 13 are taught in FIG. 14.

Figure 14:
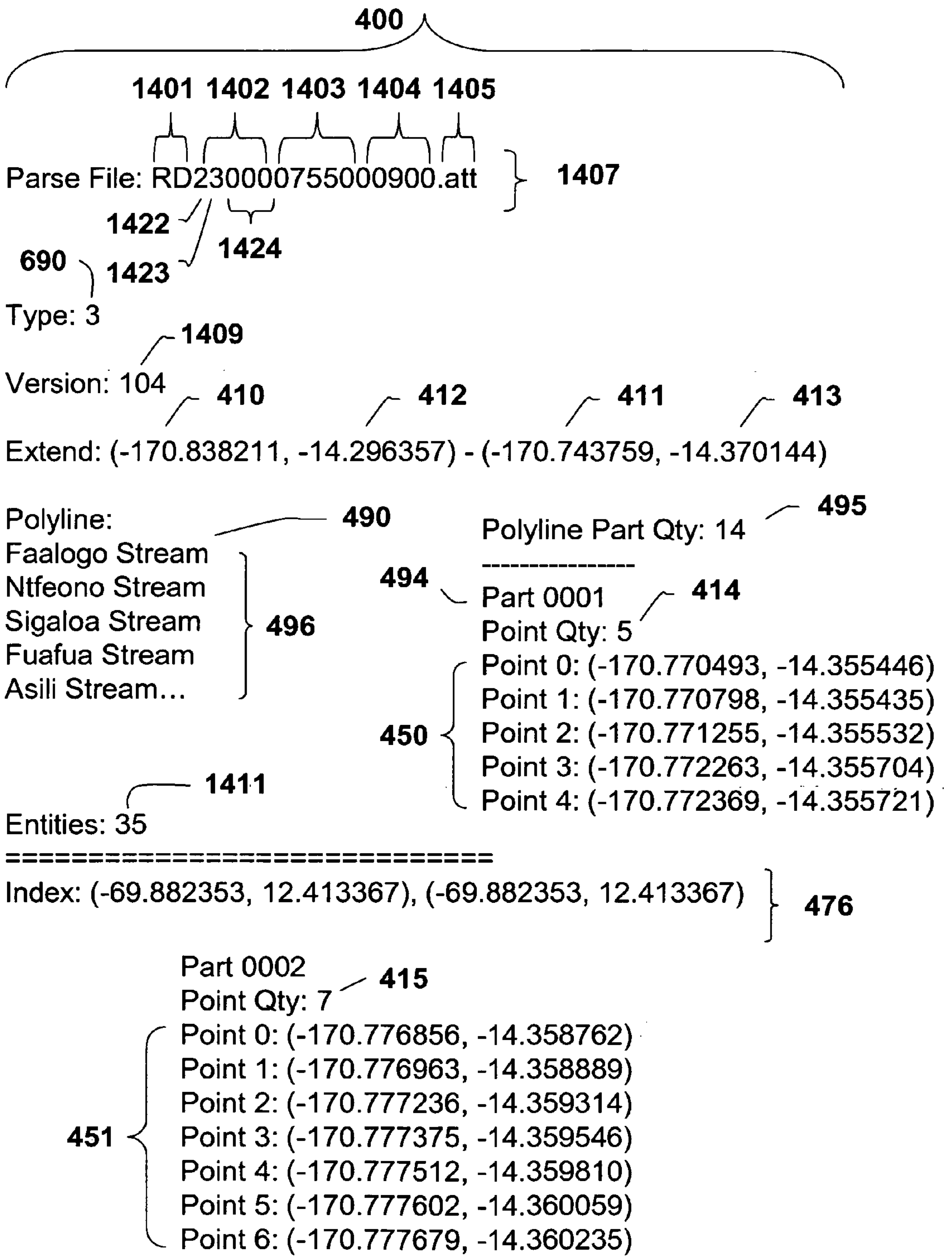
FIG. 14 is a sample of an ASCII polyline map file fragment.

FIG. 14 is a sample of an ASCII polyline map file fragment. To speed data retrieval and screen drawing, final image files 800 can be named with descriptive file name 1407. Embedded within file name 1407 are file type, tolerance, and geographic coverage information. The drawing engine can determine the file type, tolerance, and geographic coverage merely by inspecting the file name. Unlike in prior art, it is not necessary to open final image file 800 to determine file type, tolerance, and geographic coverage.

By way of example and not limitation, file name 1407 consists of industry standard sixteen characters plus a three character extension. The chart below describes each element of the file name.

Elements 1402, 1403, and 1404 may be encoded as ASCII numbers to aid human readability. As an alternative embodiment, elements 1402, 1403, and 1404 may be replaced with alpha characters to enable shorter file names, to save storage space, and/or to specify additional parameters. Because files are indexed via computer, human readability is not required. Additionally, the naming convention taught herein may easily be extended to more than two dimensions. An example of a three dimensional file naming format is "TYPE_XX_YY_ZZ_PARM.abc".

| Element | Parameter | Number Characters |
|---|---|---|
| 1401 | Type parameter | Two |
| 1402 | Tolerance/area parameter | Five |
| 1403 | Latitude tolerance/area parameter | Five |
| 1404 | Longitude parameter | Five |
| 1405 | File extension parameter | three |

Tolerance parameter 1402 is further divided into tolerance 1422, bounding box 1423, and three spare parameters 1424 available for future use.

TOLERANCE TABLE

| 1422 | Tolerance 550 Approx. Meters | Tolerance 550 (FIG. 5) Approx. Feet |
|---|---|---|
| 1 | 7 | 21 |
| 2 | 14 | 42 |
| 3 | 28 | 84 |
| 4 | 56 | 168 |

Tolerance parameter 1422 is translated from the above table to maximum error parameter 550. This parameter is determined when compressed entity structure 400 is generated based on the size of the bounding box used to enclose elements. Maximum error parameter 550 may also be used by optional additional compression methods such as the method taught in FIG. 11.

The desired amount of accuracy determines the bounding box size. The table below shows the relationship between tolerance and bounding box size.

BOUNDING BOX 206 SIZE TABLE

| 1422 | BOUNDING BOX Deg. | Tolerance 206 (FIG. 5) Degrees |
|---|---|---|
| 1 | 1 × 1 | 1 |
| 2 | 4 × 4 | 4 |
| 3 | 0.25 × 0.25 | ¼ |
| 4 | 0.50 × 0.50 | ½ |

Tolerance parameter 1422 is translated from above table to resolution parameter 206. This parameter is determined when compressed entity structure 400 is generated based on the size of the bounding box used to enclose elements. This parameter is also used to determine the area enclosed by compressed entity structure 400.

Latitude tolerance/area parameter 1403 ranges from −90 to +90 degrees. In order to eliminate the sign, the actual latitude is offset by +09000 with implied decimal point (090.00). Example:

412 (FIG. 4)=Top Latitude=1403−9000=07550−9000=−014.50 Deg. South

Longitude tolerance/area parameter 1404 ranges from −180 to +180 degrees. To eliminate the sign, the actual longitude is offset by +18000 with implied decimal point (090.00). Example:

410 (FIG. 4)=Left Longitude=1404−180=00900−18000−171.00 Deg. East

Version parameter 1409 is used internally for version control. Parameter 1411 is a count of the number of poly elements within the file.

Figure 12A:
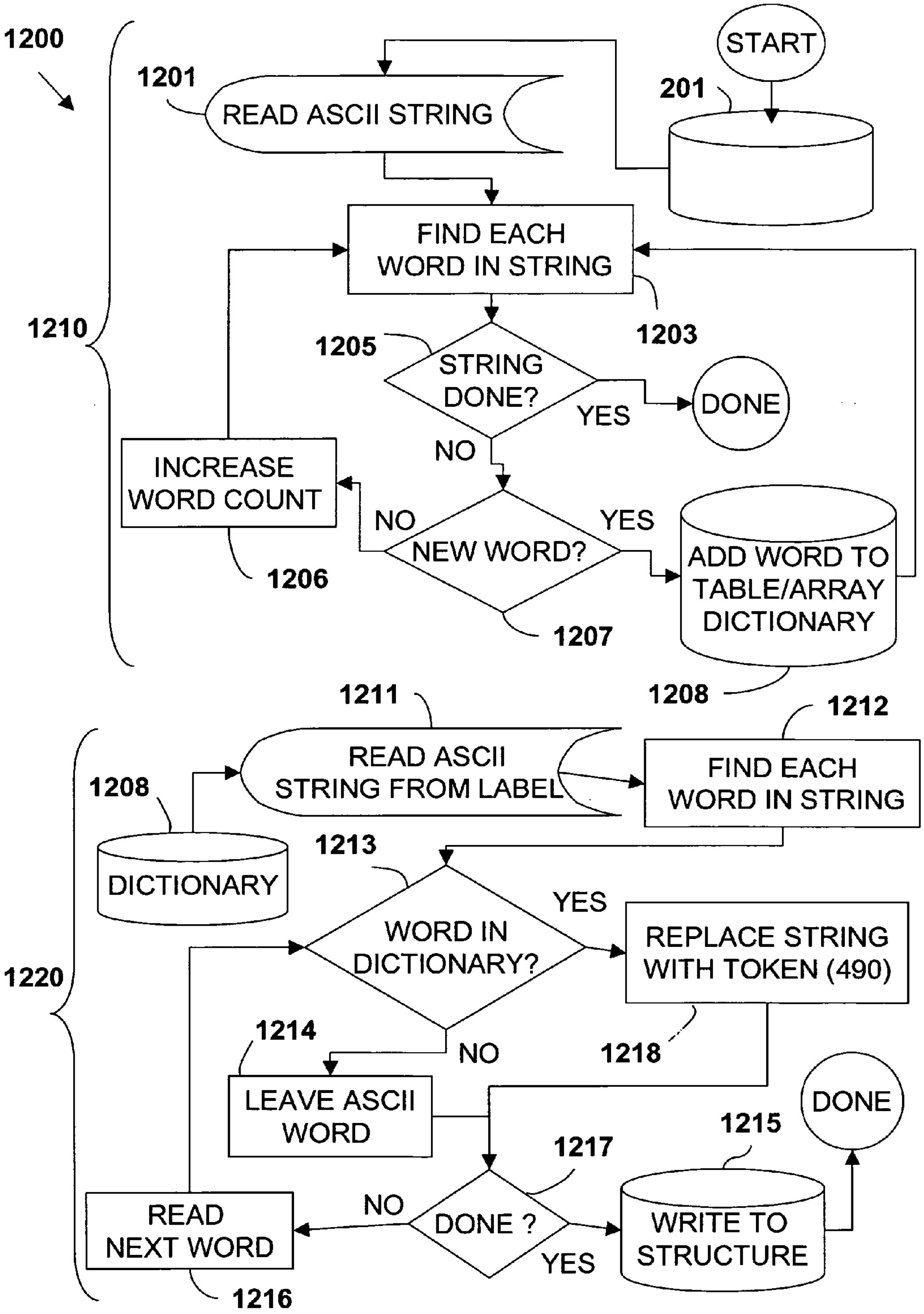
FIGS. 12A, 12B are a flow chart of text label compression and decompression processes.
Figure 12B:
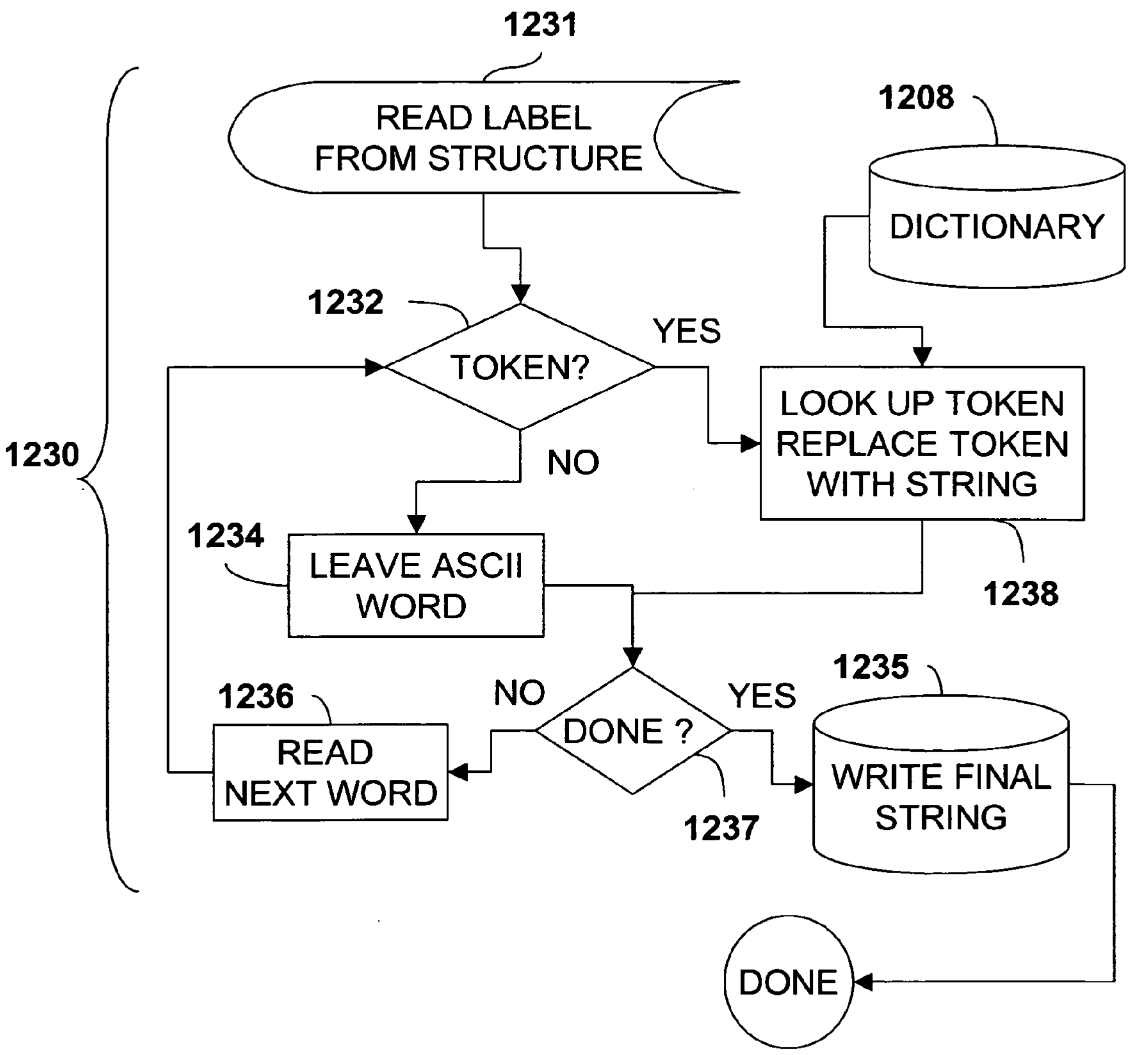

Entity label list 496 is a list of the names associated with the entities. To speed name searches, labels are grouped to speed indexing and text searches. For readability, tokenized table entrees as taught in FIG. 12A are replaced with ASCII strings.

Parameter 414 is a numeric count of the poly element location pairs 450 (FIG. 4). Parameter 476 is an index of entities used to speed entity location within compressed entity structure 400.

Figure 15:
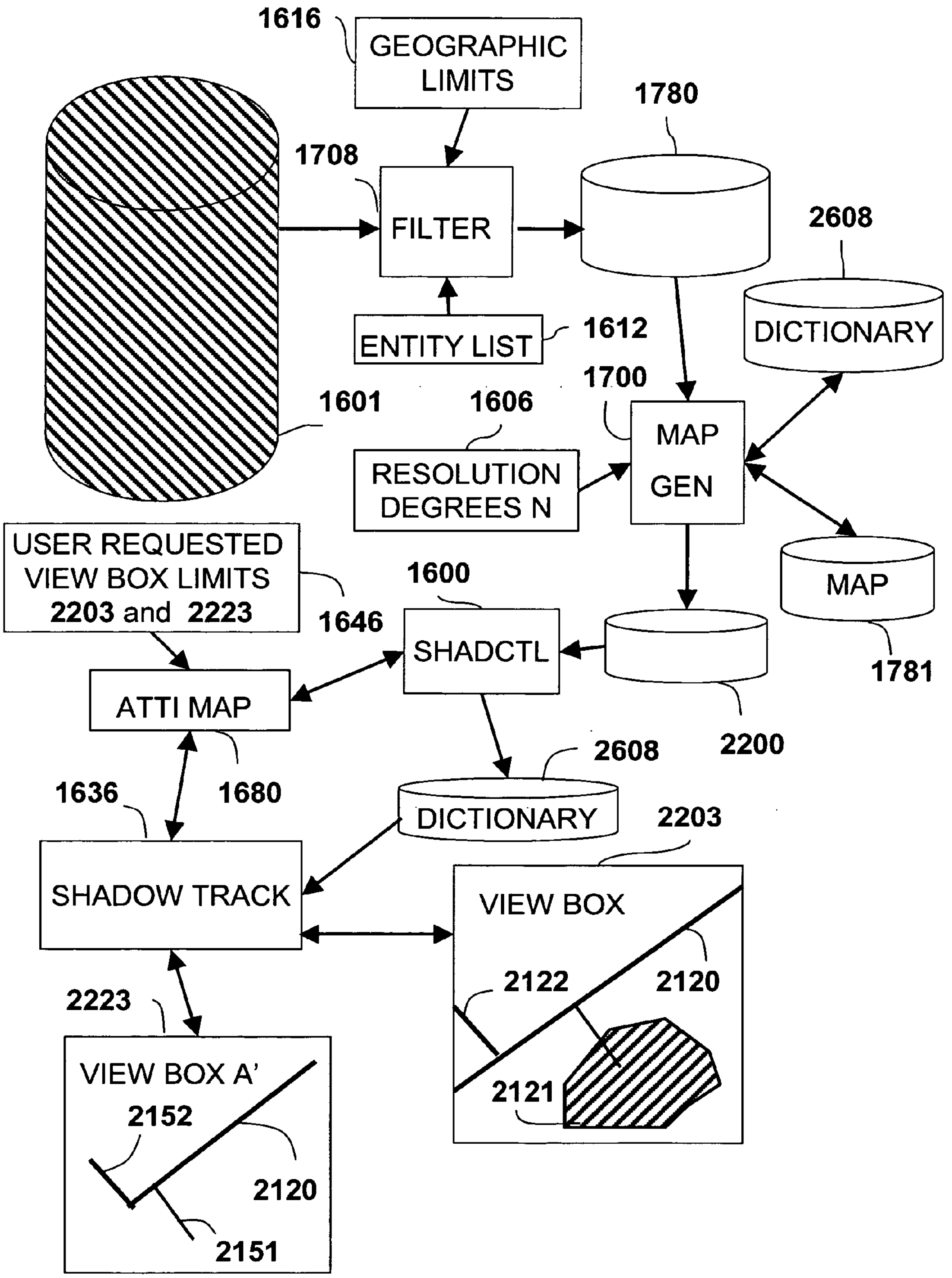
FIG. 15 is a data flow diagram of the map file building process.

FIG. 15 is a data flow diagram of the map generation, compression, decompression, and display process. FIGS. 15 through 28 teach an alternative embodiment to the methods taught in FIGS. 1 through 14. TIGER/Line® map/census files 1601 generated by the U.S. Census Bureau contain a wealth of information regarding landmarks, political boundaries, ZIP code areas, power lines, roads, schools, churches, etc. Approximately sixty percent of a map database contains information not required by typical mapping/navigation applications. For example, a TIGER/Line® database is some 38-Gigabytes—far too large to store on a single CDROM, or economically store in solid-state memory. A TIGER/Line® database is offered by way of example and not limitation.

Specific entities are assigned codes defining the object type. Map specific entities such as political boundaries, roads, towns, cities, landmarks, schools, etc. have unique codes. Specific codes used by TIGER/Line® are defined in the technical documentation specification referenced in the related documentation. Operation 1708 (FIG. 17) filters database 1601 by retaining mapping specific entities defined by entity list 1612 and geographic limits 1616. Entities included in list 1612 are defined by specific requirements at map generation time. Approximately sixty percent compression is achieved and is depicted by intermediate database 1780. Map generator algorithm 1700, as taught in FIG. 17, compresses element labels generating dictionary file 2608. Map generator algorithm 1700 performs low loss map data compression generating intermediate map database 1781. The compression procedure has two major element—a recursive low pass filter or smoothing operation 2500 applied to polyline/polygons as taught in FIG. 25, and a novel adaptive absolute (complete) to relative coordinate compression algorithm 1900 taught in FIG. 19 and FIG. 21. Maximum error parameter 1950 yields virtually loss-less compression with very high compression rates. As compression process 1700 is linear, major operations can be performed in any order with identical results. Operation 1740 (FIG. 17C) performs final label compression merging 1781 and 2608 into final image file 2200. In typical applications, a 92% compression rate is achieved.

User defined limits 1616 define the geographic area of final map file 2200 (FIG. 22) extracted from the database to 1780. Limits in this embodiment are defined as upper and lower latitude with right and left longitude. User defined resolution parameter 1606, by way of example and not limitation, is typically one to four degrees in latitude and longitude and defines a bounding box (BB) region. This bounding box is an important aspect of the compression method taught herein. Bounding box size defines map granularity and maximum accuracy loss as taught in FIG. 19.

Operation 1700 as taught in FIG. 17 performs efficient entity compression to file 2200. Final file 2200, by way of example and not limitation, is typically saved to magnetic disk for distribution on media as CDROM, DV-ROM, or solid-state memory. The novel and efficient compression, decompression, and display methods taught herein permit map data use on small handheld devices, such as PDA's, cell phones, and laptop computers. The architecture of the application permits sharing of database 2200 in a distributed system.

Operation 1600 performs entity decompression, loading, and unloading to local memory. Details of this operation 1600 are taught in FIG. 16. Operation 1600 writes dictionary label file to local memory for rapid retrieval and for display refreshing performed in 1636 (FIG. 16B).

Figure 20:
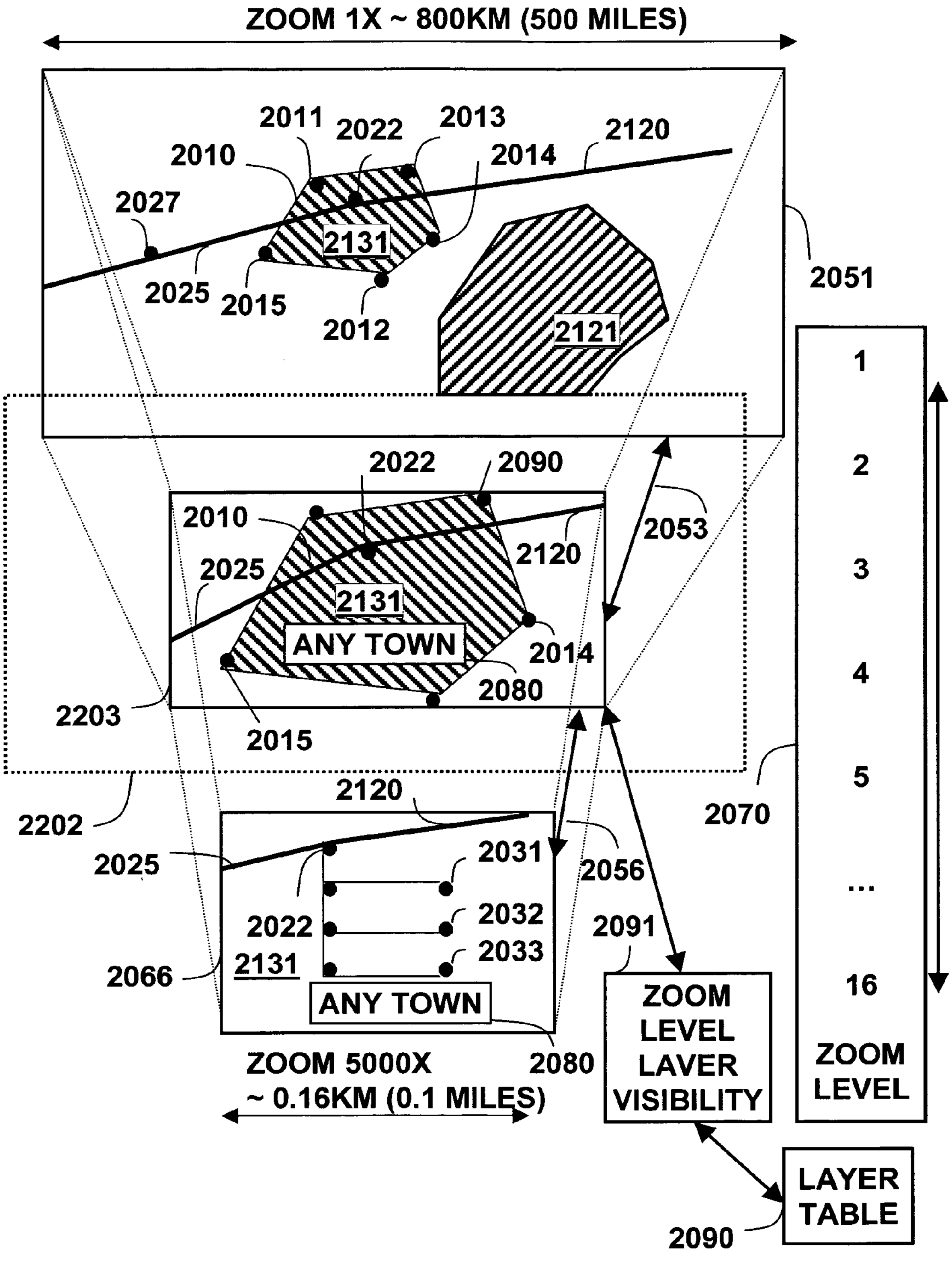
FIG. 20 teaches view zoom filter operation at three levels of zoom.

ATTI MAP operation 1680 (FIG. 16A) reads user requested window view limits 2203 from a GUI. Operation 1680 calculates current zoom level 2070. FIG. 20 teaches the details of display control. Operation 1680 coordinates entity retrieval and preloading from compressed file 2200. Operation 1636 coordinates predictive preloading of elements outside current view regions 2203 and 2223 to local memory for rapid display. SHADOW TRACK operation 1636 performs rapid display refreshing and zooming as taught in FIGS. 16B and 22.

Operation 1677 (FIG. 16A) reads the current view window(s) limits 2203 and the current window zoom level 2070 from a graphical user interface (GUI). A sample screen display is taught in FIG. 24 containing characteristics such as reading location 2203, zoom level 2070 (FIG. 20), panning speed and direction 2205 (FIG. 22), ICON assignment, and layer visibility control 2091. Improvement over prior art in memory management, compression efficiency, and decompression speed permits rapid display of one or more maps with minimal loss of accuracy as taught herein.

As an example, an application includes a truck dispatch/call center. An user can view the current truck location received from GPS coordinates in window 2203 while simultaneously viewing the pickup/delivery location in a second window 2223. An example of another application includes a call center application were the location of an emergency is displayed in window 2203, and emergency equipment location(s) are display in additional window(s) 2223.

The highly compresses database 2200 permits transmission of map data over limited speed data links, permitting sharing of map screen data in real time with remote displays in one or more trucks. Thus, costs associated with maintaining, storing, and updating multiple map files located with each remote display are avoided. The methods taught herein permit a single shared database to be frequently and easily updated via a subscription service thus making current map data instantly available to remote displays and call center terminals.

FIG. 16 is a flow chart that teaches compressed map data 2200 decompression, memory management, and display refresh. Operation 1603 reads compressed map file 2200 generated by map generator 1700 (FIG. 17A). Compressed map file 2200 contains compressed label dictionary 2608 with associated lookup table, and linked list of compressed entity structures 1800 (FIG. 18.) organized in layers.

Figure 22:
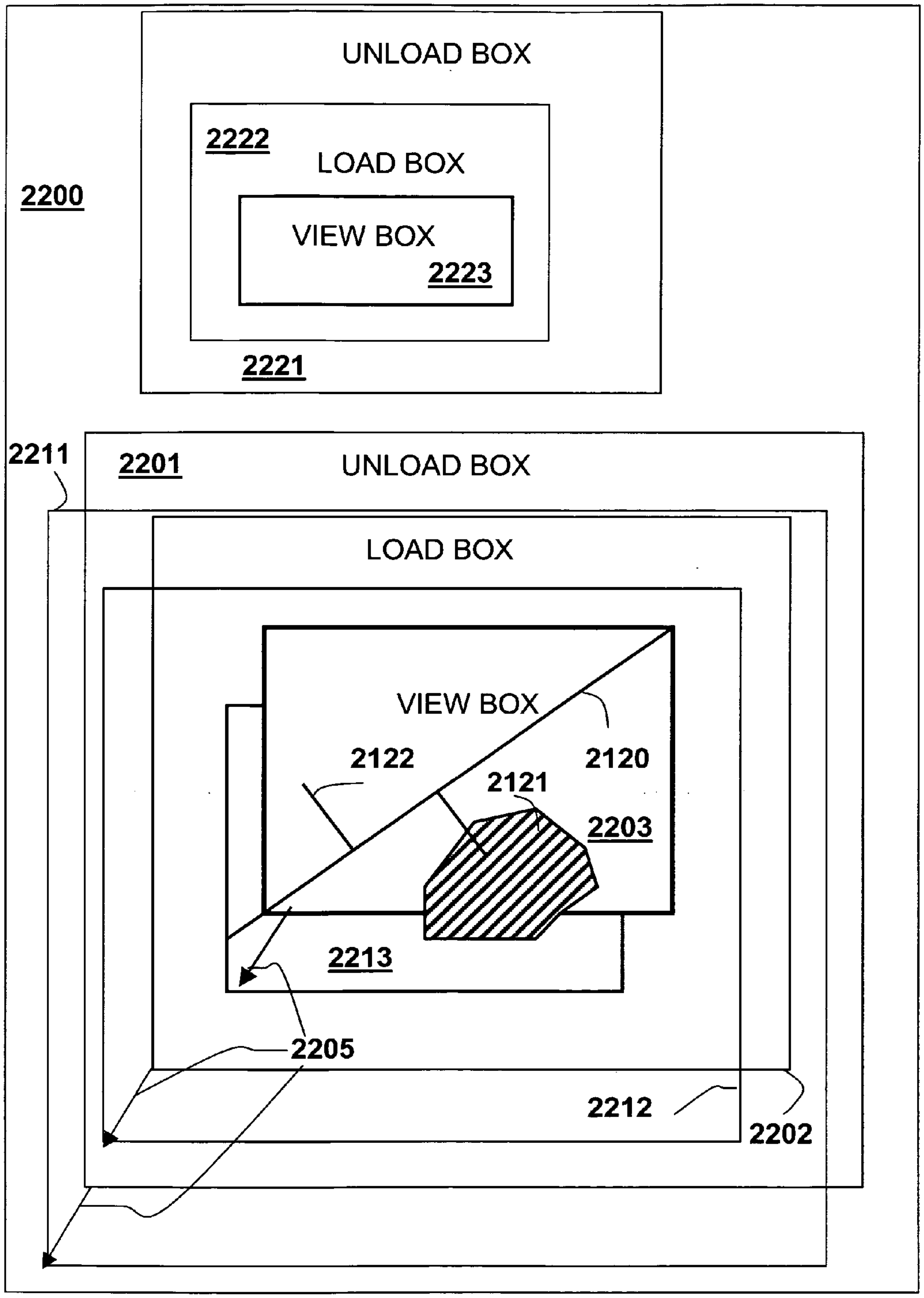
FIG. 22 is a schematic diagram which teaches data memory management and display refreshing.

Operation 1602 performs dictionary decompression using LZW (Lempel, Ziv, and Welch) by way of example and not limitation, and writes dictionary file 2608 to local memory for drawing programs. Operation 1611 reads latitude and longitude limits of active user viewing window(s) 2203, and 2223 (FIGS. 15, 22, and, 24). Decision operation 1610 tests view window(s) 2203 for movement panning or zooming. If moving operations 1607 and 1608 calculate preload vector 2205, a new priority preload region 2223 is created as taught in FIG. 22. If no panning or new view regions/windows have been requested, operation continues to operation 1609.

Operation 1609 determines current view region zoom-level 2070. Operation 1625 reads user defined layers 2093 (FIG. 20) from GUI FIG. 24. Operation 2091 calculates visible layer items such as labels and residential streets from table 2090 as taught in FIG. 20. Operation 2092 logically ANDs user selected layers 2093 with calculated list from operation 2091. Active (visible) layers control the drawing engine when painting view window(s) 2203, automatically controlling level of screen detail and minimizing clutter with requested zoom level.

Operation 1630 reads compressed structures 1800 (FIG. 18) within active view region(s) 2203 and 2213 from 2200. Decision 1631 tests for view window movement, panning, or zooming. If panning, operation 1632 preloads compressed structures found in area 2223 (FIG. 22). Priority preloading of compressed structures to memory occurs in the general direction of panning 2213 (FIG. 22) in anticipation of future use. Thus, elements in region 2212 and 2222 (not visible) are already resident in local memory and available for immediate display. Preloading of data is performed as a lower priority task thereby not interfering with refreshing/drawing of current visible 2203 regions. This novel method results in a net panning speed improvement over prior art as seen as smoother map viewing. Operation 1634 continues loading region 2202 on a lower priority/resource available basis. Current view 2203 (FIGS. 20, 22 and, 24) next larger zoom window(s) 2051 is the same size as preload region(s) 2202. This results in the unique property that zooming is substantially faster than prior art as display data is already in memory.

Figure 19:
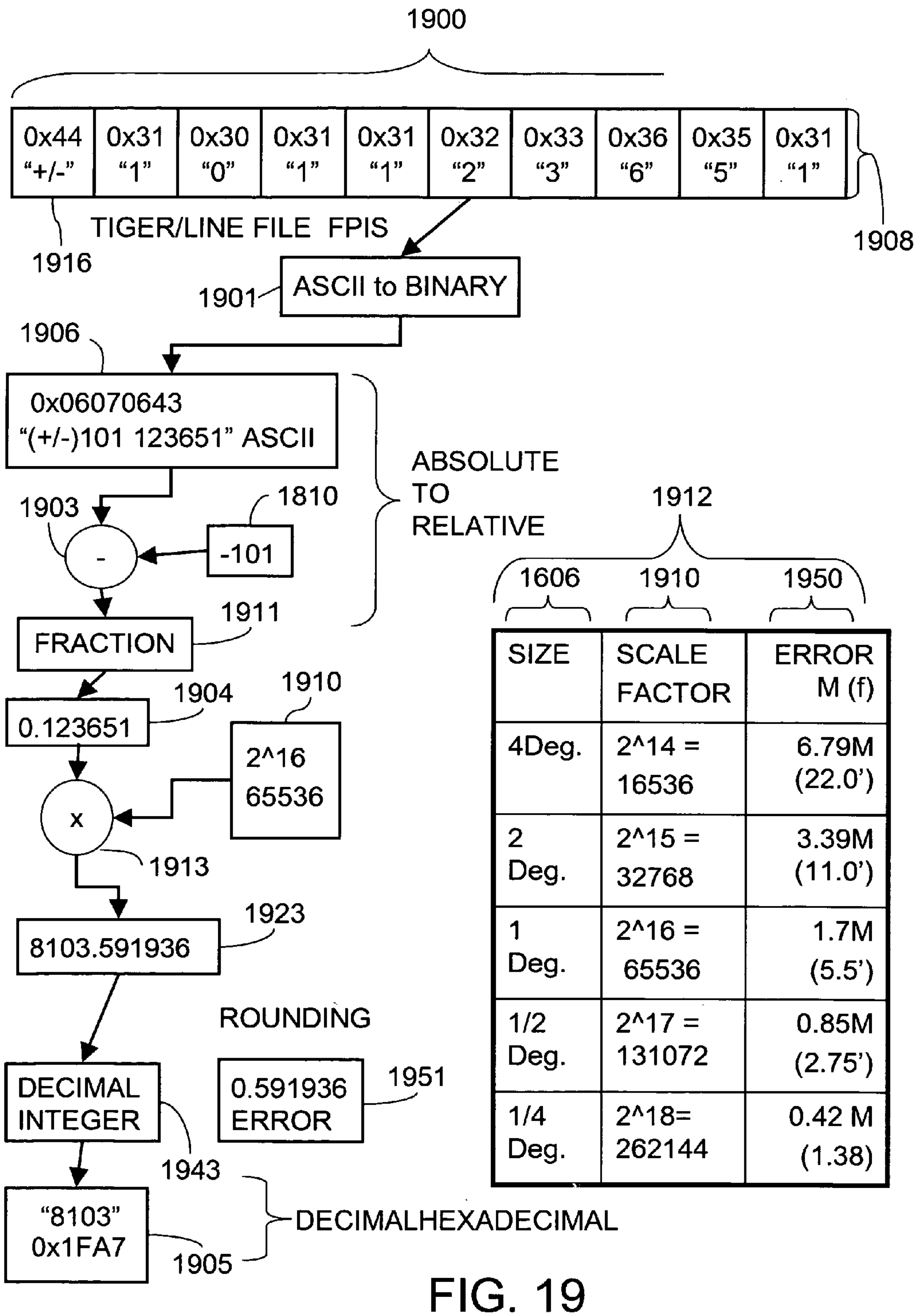
FIG. 19 is a data flow diagram of a coordinate compression algorithm.

Due to unique properties of compressed data as taught in FIG. 19, applications may not require absolute coordinate (latitude, longitude) data. As the raw (uncompressed) data is relative to the upper left corner of the current bound box, such binary data is used directly for screen drawing. Operation 1681 tests if the application requires real time absolute coordinate (latitude longitude) data. If so, compression operation 1660 is executed. A flow chart detailing decompression process 1660 is taught in FIG. 16C. If decompression 1682 is skipped, flow continues to decision 1635 which tests if all entities for current view region are loaded. If false, loading continues in operation 1622. Operation then continues to test 1637 which tests if all entities are loaded for current layer. If so, operation continues to 1692 (FIG. 16D). Else, reading continues with operation 1630 (FIG. 16B) until all visible entities have been loaded. Operation 1636 reads current selected view region(s) 2203 and 2223 and tests for panning, zooming, or changing of the window boundaries, thereby requiring updating the data in the new visible regions.

Figure 26A:
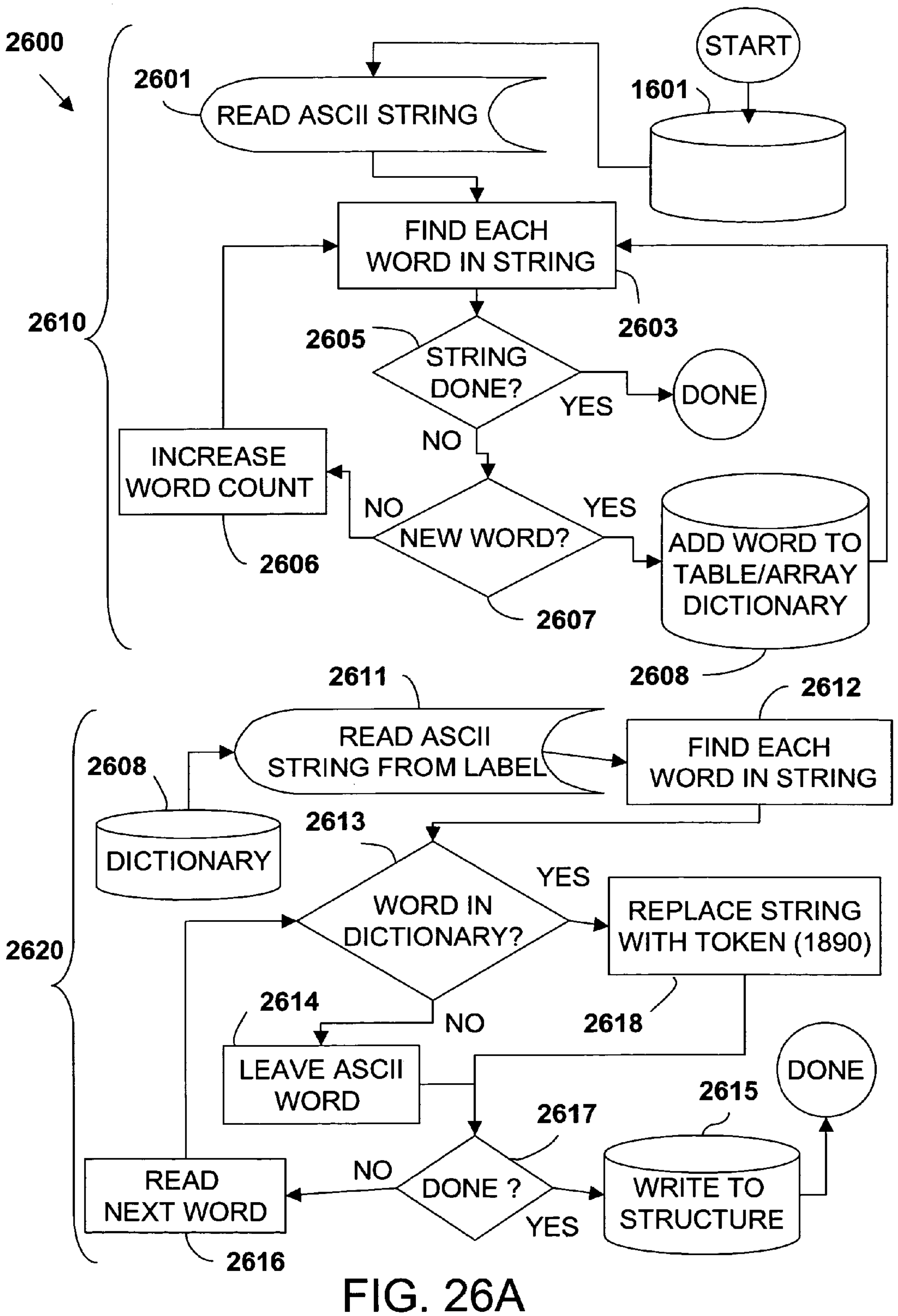
FIGS. 26A, 26B are a text label compression algorithm flow chart.
Figure 26B:
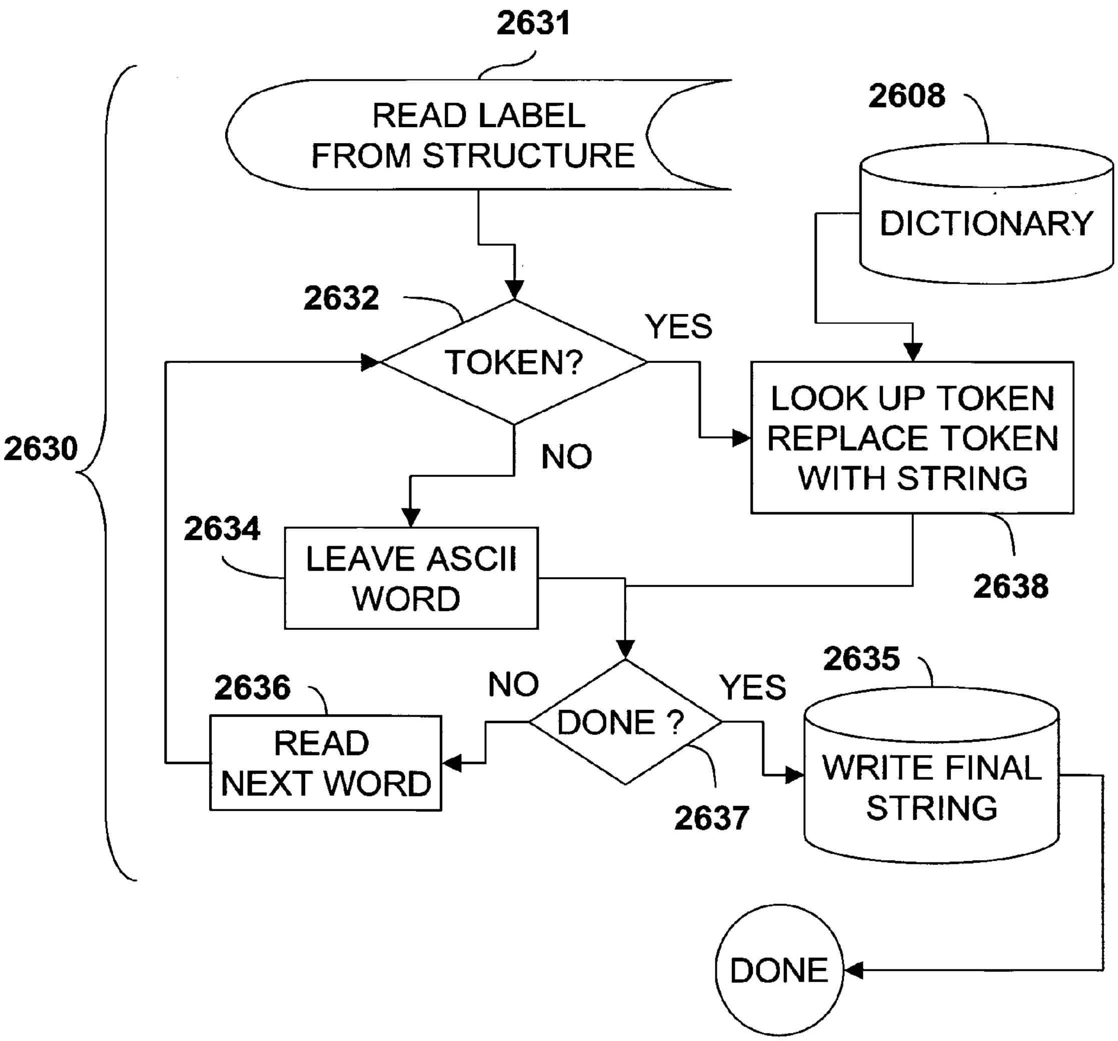

Decompression 1660 consists of two distinct parts—entity label assignment as taught in 2630 FIG. 26B, and optional relative to absolute coordinate mapping.

Figure 18:
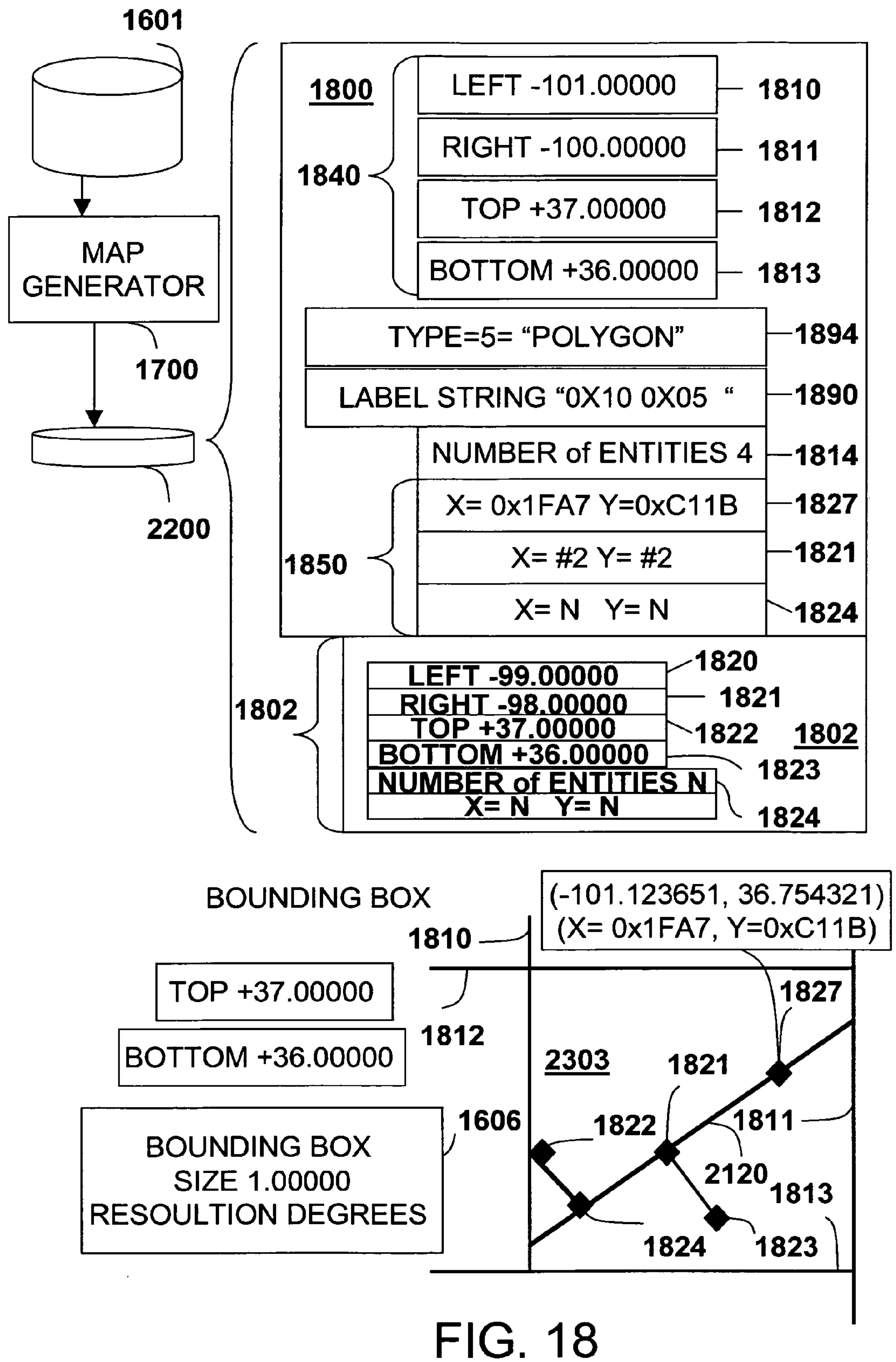
FIG. 18 is a schematic diagram of a compressed database structure.

Operation 1640 reads compressed structure 1800 (FIG. 18) from map file 2200. Operation 2630 (FIG. 26B) performs label string 1890 (FIG. 18) decompression/lookup as taught in FIG. 26B. Operation 1641 reads entity count parameter 1814 (FIG. 18). Decision 1642 tests if the entity count is zero (or done). If zero, decision 1681 tests if absolute output is required. Due to the unique properties of compressed data as taught in FIG. 19, applications not requiring absolute coordinate (latitude, longitude) directly use raw data for screen drawing. As raw (uncompressed) data is relative to the upper left corner of current bound box 1840 (FIG. 18), such binary data is used directly for screen drawing. Display only applications realize substantial processor resource savings by directly using relative/uncompressed poly-point data 1850 (FIG. 18) when refreshing screens as in operation 1659.

Operation 1653 reads poly-point data 1850. Operations 1654 multiplies X-Y data by current scale factor 1606 (FIG. 16, 20). Scale factor 1606 in this disclosed embodiment is a power of two permitting multiplications to be implemented as an equivalent faster shift operation. Output of multiplier(s) is followed by adders 1656. Operation 1656 adds the absolute location of the bounding region lower left corner to the coordinate X-Y pair. Output of adders 1656 are absolute locations of poly-points with maximum error 1950 (FIG. 19), which is associated with current scale factor 1606 from table column 1910. Decompression is efficiently performed as a Multiply Accumulate (MAC) operation which is frequently implemented in modern processors, and common to all digital signal processors (DSP). Operation 1661 decrements entity count 1814; operation then continues until all poly-point 1850 elements are processed. Operation 1667 writes decompressed data stored as absolute coordinate integer pairs with implied decimal point to memory for display and/or to output to other applications.

Decision 1635 tests if all view window 2203 entities have been loaded. If so, operation 1636 performs view window(s) 2203 refresh. Decision 1637 tests if all load window(s) 2202 entities have been loaded; if not, operation continues in 1630. Decision 1692 tests if all layers set in 2091 were processed. Operation 1636 indexes to the next visible layer; changes in zoom level 2070 (FIG. 20) may change the visible list. Entities on other visible layers are processed in the same way.

Figure 16A:
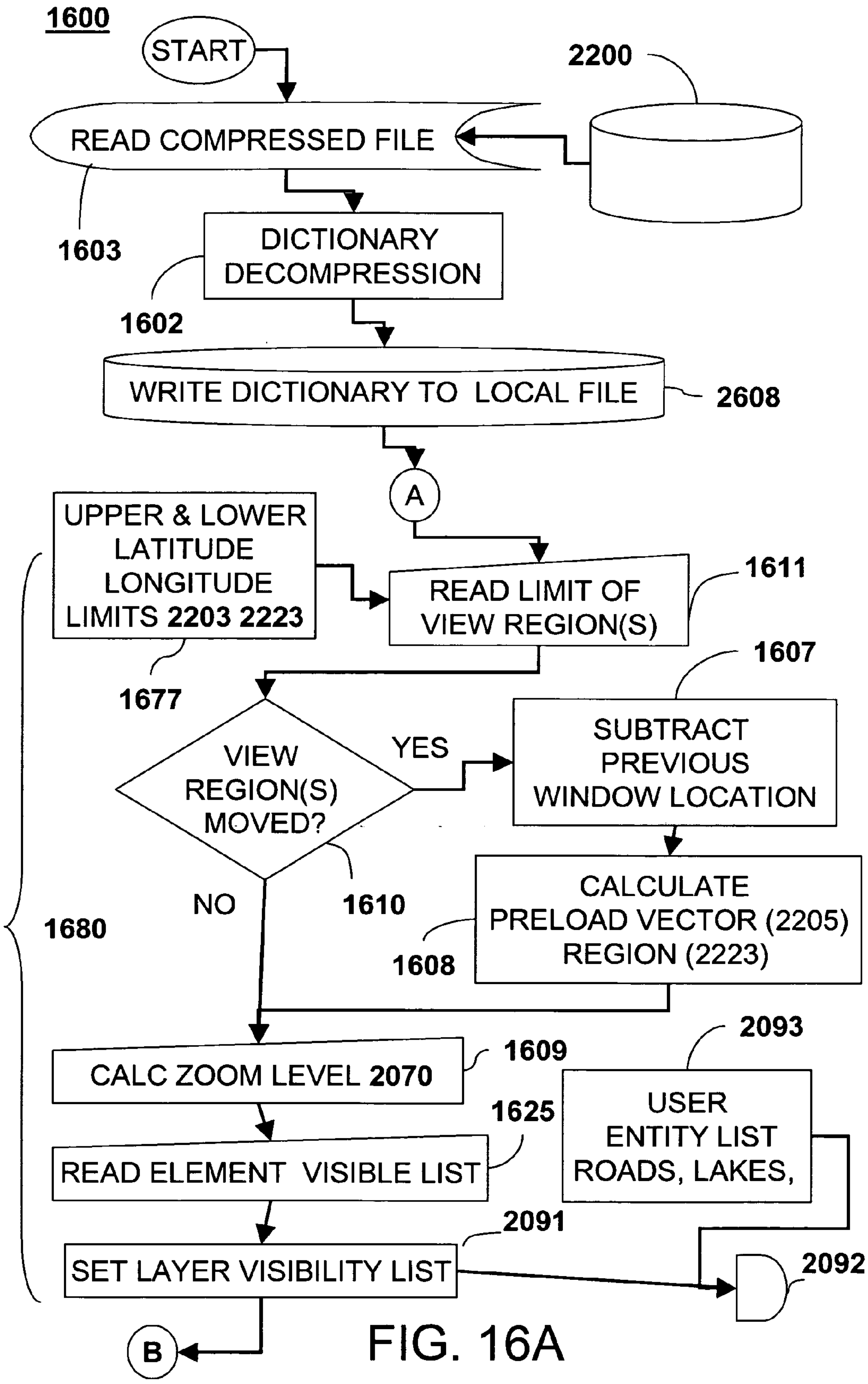
FIGS. 16A, 16B, 16C, 16D, are a flow chart of map data decompression, display, and memory management.
Figure 16B:
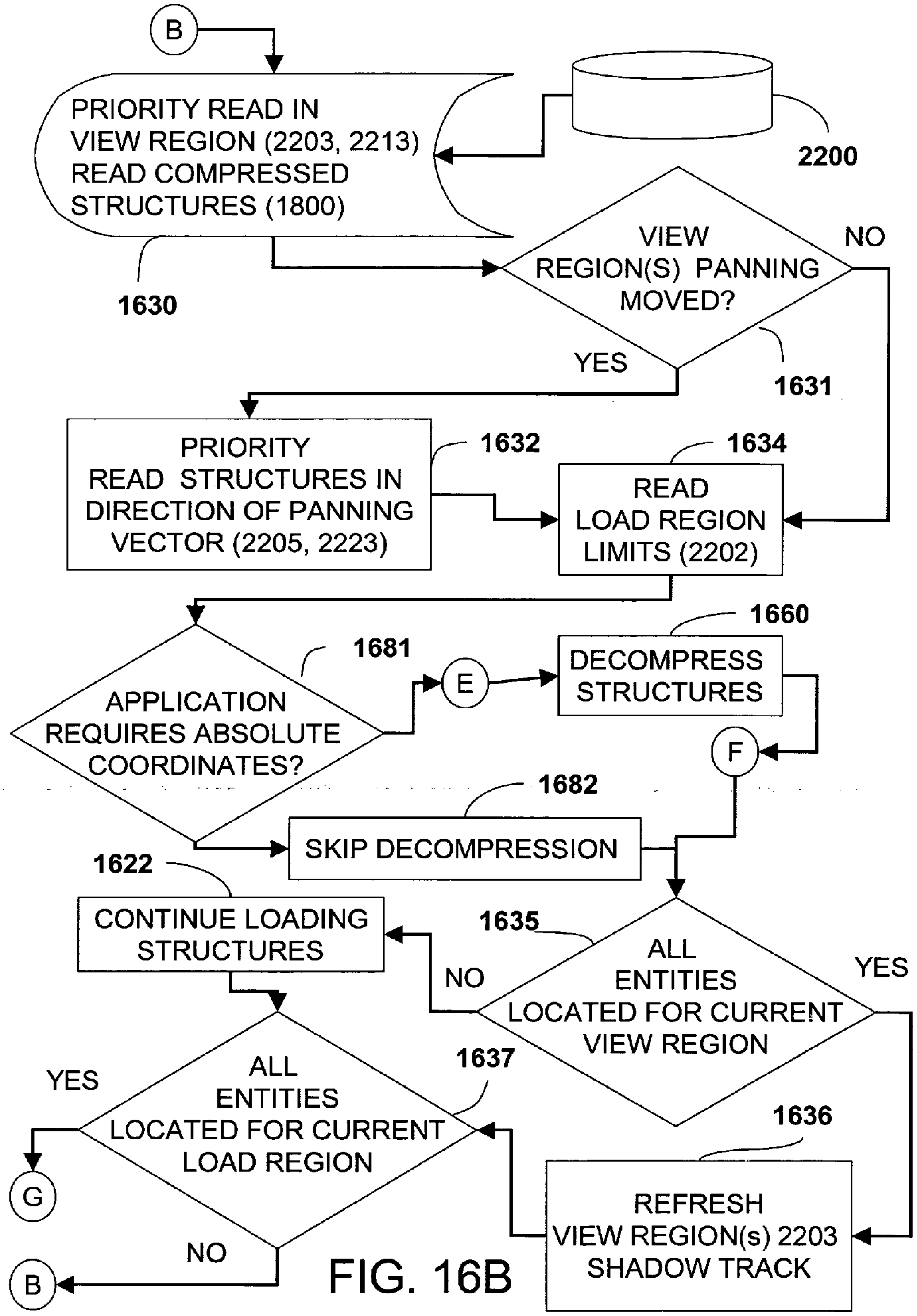
Figure 17A:
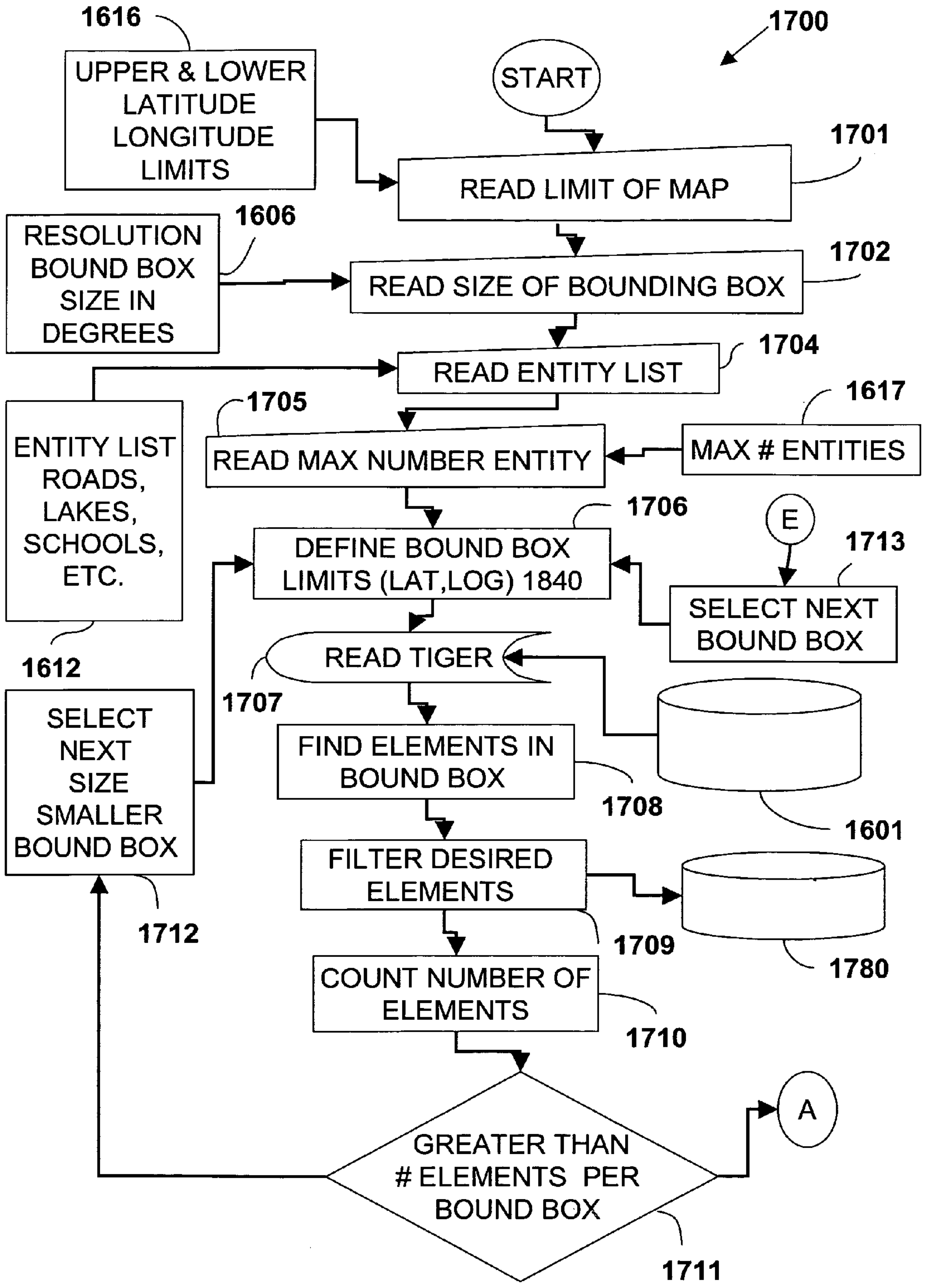
FIGS. 17A, 17B, 17C are a flow chart of a map data generator algorithm.

Decision 1627 tests if loaded layers are now invisible due to changes in zoom or because the layers are disabled by an user via 2093 (FIG. 16A). If layers are no longer needed, operation 1639 unloads them from memory. Decision 1628 tests if entities are located inside unload region 2201. If found operation, 1694 unloads them from memory. Thus, memory resources are automatically freed for loading new map data. The disclosed invention quickly loads data to memory for rapid display and for smooth zooming and panning. Novel load box 2202 preloads entities adjacent to current viewing region 2203 for immediate display when panning. Similarly, region 2213 (FIG. 22) is priority preloaded in the direction of the current and/or last panning direction/vector 2205, further enhancing panning. Unload region(s) 2201 perform automatic purging of unused data minimizing system RAM memory requirements. Efficient novel compression algorithm 1900 (FIG. 19) achieves virtually loss-less compression while maintaining high compression rates. Novel label compression (FIG. 26A) and token assignment saves memory and speeds display refreshing. Adaptive variable bounding regions (FIG. 21) limit maximum compression loss in low-density regions while reducing error in areas of interest with minimal size penalty. The methods taught in this embodiment permits larger maps at greater accuracy than prior art solutions. Display only applications realize substantial processor resource savings by using uncompressed poly-point data 1850 (FIG. 18), directly refreshing screens in operation 1659.

FIG. 17 is a flow chart of the data compression process. The purpose of map generator application 1700 is to split and transform Tiger/Line files 1601 into more useful files. The US Census Bureau provides Map Data in an ASCII character based database where different layers or features are grouped in terms of geo-political entities. The information inside these files represents different map features, grouped in a convenient way to be displayed easily and quickly. Tiger/Line map data 1601 is completed with a data dictionary providing a description of different chains and ranges of data records and identifiers. The main idea is to group different MAP Layers or categories (Roads, Lakes, etc.) together, locating them in specific geographical rectangles with defined starting ending latitudes and longitudes 1616. Each geographical region 1606 has one or more coverage areas. In the current embodiment, squares usually of 1×1 or 4×4 degrees, or alternately of other dimensions, are programmatically selected. The process taught herein of re-structuring source data into specific files 2200 reorganizes geo-political record structures into region based structures.

During the process of relocation and integration of mapping data, the following basic parameters are exposed to the user: a hierarchical list of primary features, having 2 or 3 levels of details; feature names conforming to the US Census Bureau terminology; coverage area (or area size)—e.g. 1×1, 4×4, or 0.25×0.25; accuracy tolerance in meters; starting and ending longitude [−180 to +180]; starting and ending latitude [−90 to +90]; source folder where Tiger/Line files are located; target folder where new files will be located; shape types—point, line, polygon, etc.; additional chains of point, line and area combinations for landmark or water areas; specific parameters for lower and higher CFCC range; and specific file prefix used to identify created map files.

The process of data transformation works in the following order. An user creates RunSet(s) 2200 using map generator application 1700. Each RunSet is unique definition of a specific geo-region 1616 and includes the above parameters. Different RunSets 2200 are independent definitions representing map regions according to specific application requirements such as consumer navigation or delivery business needs.

RunSets 2200 can be processed independent of each other. The processing of each RunSet 2200 results in creation of groups of layer files, describing the selected region in terms of drawing objects—points, lines, polygons, etc. An example of displayable drawing elements is shown in view window 2203 (FIG. 20, 22, 24).

While creating a RunSet 2200, the application 1700 reads all parameters 1616, 1606, and 1612, and processes Tiger/Line files 1601. First it creates list of existing files existing on the source path, both within the main folder and all subfolders. Next it creates a main cycle for processing each longitude and latitude in 4 degrees steps called MapExtents. During the above mentioned cycle, all elements' definitions in each file from the file list are compared to the size of the Current MapExtent, and this file (file name) is marked for further processing. Once each file is marked for further processing, it is analyzed for shape types including points, lines, polygons, etc. During the file processing, map definitions matching the specified user input parameters are extracted and stored into the buffer, which contains future records of the new integral file.

At the end of above mentioned process, all new prepared files are saved to a new location. The file names have a specific format, suggesting which map region they represent. The file name structure is prefixed with 2 characters, provided by the user, called the prefix parameter. The next 3 characters of the file name are simply 3 digits, equal to represented initial latitude plus 90. The next 3 characters in the file name are 3 digits equal to represented initial longitude plus 180. All files have 8 character long names. By way of example and not limitation, the default file extension is ATT.

It is up to the user to copy and group created ATTI Map files according to the prefix, longitudes/latitudes, or any other characteristic. These files are required by other ATTI applications which display interactive maps for different business purposes. The methods described above are repeated for all points in the current part, then for all parts in the current polygon, and finally for all polygons in the selection. Flow chart 1700 teaches the summarized process in more detail.

Operation 1701 reads the geographic limits of the map file 1616. Operation 1702 reads maximum error 1950 (FIG. 19) and size of bounding region 1606. Operation 1704 reads the entity list permitting exclusion of specific layers such as lakes, and fire/police from the data set. Operation 1705 reads the maximum entities 1617 per bounding region 1606 which is used by the adaptive compression process.

Operation 1706 defines initial bounding box 1606 limit 1840 (FIG. 18), which is typically the upper left corner of the region defined by limits 1616. Operation 1707 begins reading lines from source file 1601. Operation 1708 locates elements located within the current bounding region 1840. Operation 1709 filters entities against include list 1612, writing the result to temporary storage 1780. Operation 1710 counts the number of poly-points saved and decision 1711 compares the count to user defined limit 1617.

If the comparison is greater than, the next size smaller bounding region is selected 1712, typically one half. The above operations are repeated for the new bounding region. Else, operation continues to decision 1720 where a test is done for less than limit 1617. If less, operation selects the next larger bounding region, which is typically twice the current size. Decision 1723 tests the current bounding region against maximum user defined parameter 1606. If greater, the initial maximum size 1606 is retained to limit maximum error. Addition detail on the operation of the adaptive resolution is taught in FIG. 19.

Once the optimal number of poly-elements are grouped within a bounding region, decision 1726 tests if the data type is a line, polygon or point. If it is a point such as a police/fire emergency office, operation continues to secondary compression 1900. If it is a line or polygon, operation 2500 performs a low pass filter or smoothing operation on the data as taught in FIG. 25. Compression is achieved by removing points not required to represent the line or polygon to the desired accuracy. Temporary storage files 1781 are modified as required by 2500.

Operation 1900 achieves substantial compression with defined maximum error 1950 as taught in FIG. 19. The compression is achieved by grouping data for the generated bound box (BB) in a collection/structure. If the (road) element originates in the "BB" and extents out of the Right or Top side of the "BB", then that element is removed. All other elements are examined for a new "BB" limit that is to be written into the file. If the new Top 1812 (FIG. 18) or Right 1811 is not less than or equal to the "BB" original limit, an error has occurred. Otherwise, we set a new Right and Top 1713 to the original values. Absolute points are translated and compressed with algorithm 1900 as taught in FIG. 19. The type of structure 1894 (FIG. 18), (example 5=polygon) is written. Next, we write a version number as a 'word' value. BB limits 1840 are written as float values. Number of entities 1814 (FIG. 18) in this structure file is saved as an unsigned double word (unsigned Long).

Operation 2610 locates strings assigned to entities located within bound box (BB), as taught in FIG. 26A, adding the strings to dictionary 2608. Final Compression is achieved replacing strings with binary tokens 1890 (FIG. 18) in operation 2620 (FIG. 26A).

Operation 1731 tests if all the entities have been located for the current bounding region, if not, file processing continues in 1733. Operation 1713 indexes to the next bounding region as taught in FIG. 21. Processing continues until the entire region has been processed.

Operation 1734 creates structure 1800 (FIG. 18); operation 1736 writes to temporary file 1780. Operation 1737 tests if all layers have been processed, if not, the next layer is selected in operation 1738. Processing continues until the entire region 1616 for the specific layer has been processed.

For a polygon, we write a feature string (i.e. the name of the entity), and the count of parts of the polygon as an unsigned Long. Now for each part of the polygon, we write out the count of points as an unsigned Long. Finally, we write out each point as an X and Y relative value based on the 'BB' values of this file.

FIG. 18 is a schematic diagram of the compressed database structure. Map generator compression algorithm 1700 parses, filters, and compresses input file 1601 into a linked structured database 2200.

At time of database generation, an user defines and enters geographic limits 1616 (FIG. 16), desired maximum error 1950 (FIG. 19), or corresponding granularity/resolution bounding region size in degrees 1606, and maximum entities per bounding region 1617 parameters. Map generator compression algorithm 1700 (FIG. 17A) reads input file 1601 grouping entities into variable length structures 1800 by entities located within limits of current bounding box 1840. By way of example and not limitation, left longitude limit 1810, right limit 1811, latitude limit top 1812, and bottom 1813 define the limits of the data structure. By way of example, one-degree 1616 bounding regions (FIG. 21) are used in the example taught herein.

Two levels of compression are applied to raw poly-line data. First, a line low pass filter 2500, as taught in FIG. 25, performs line smoothing. Second, remaining Poly-point data points (after smoothing) are compressed with algorithm 1900 as taught in FIG. 19. Resulting binary X-Y pairs 1827 and 1821 are written to structure list 1850, with number of entrees as parameter 1814. X-Y pairs are relative to the absolutes coordinates of the bottom left corner defined by 1810 and 1813.

Each entity has an ASCII string label assigned which is typically its name. Algorithm 2610 (FIG. 26A) builds a dictionary/table 2608 for the strings found within the file. Compression algorithm 2620 (FIG. 26A) assigns a binary token 1890 for each word found in the dictionary. The resulting tokenized string is written to the structure as parameter 1890. Data structures are organized by layers. Parameter 1894 identifies the layer type school, road, lake, etc.

Compression algorithm 1700 begins compression with the maximum size bounding box counting the number of entities 1814 found with in bounding box 1840. As counted by operation 1710 (FIG. 17), if the count is greater than maximum number of entities per region parameter 1617 (FIG. 17), operation 1712 computes a smaller bounding region 1606. Position error due to rounding/truncation from operation 1943 (FIG. 19) is reduced by ½ for each reduction in granularity 1606. Bounding parameters 1840 are calculated for the new size and updated as the program traverses the map file as taught in FIG. 21. Thereby, high-density areas such as towns and cities 2131 (FIG. 21) are saved at significantly greater accuracy with typically a fraction of a percent increase in the final database size. Thus, substantially larger area maps may be generated while maintaining greater accuracy in regions such as cities and towns with little size penalty. Actual size penalty is dependent on the number of high-density regions (such as towns) located within the region. Once out of high-density regions, BB size operation 1722 (FIG. 17) increases BB size as required. The above steps repeated for each bounding box 2165-2167 (FIG. 21) for required map region 1616, and all map object layers 2090 (FIG. 20).

Figure 16C:
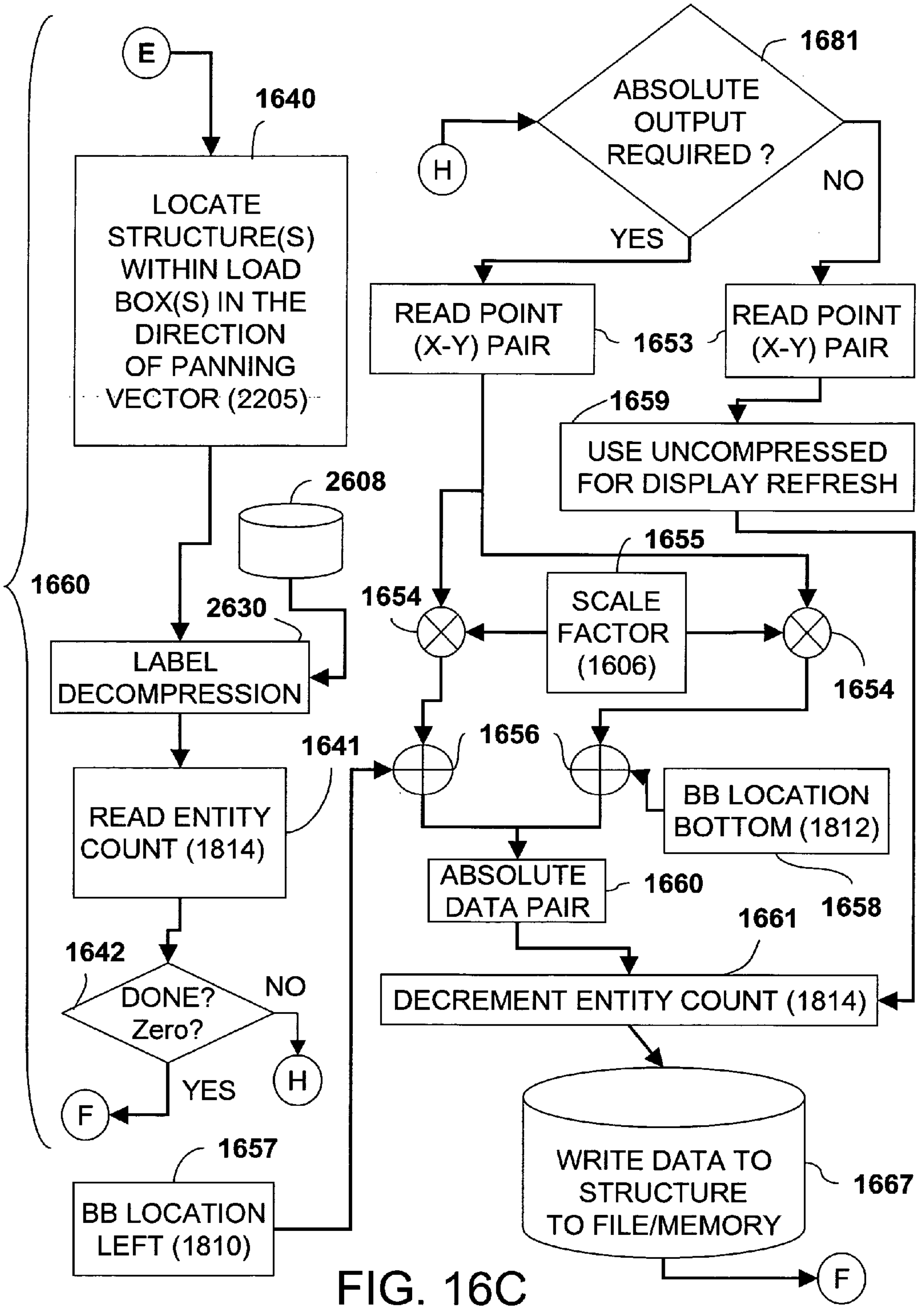
Figure 16D:
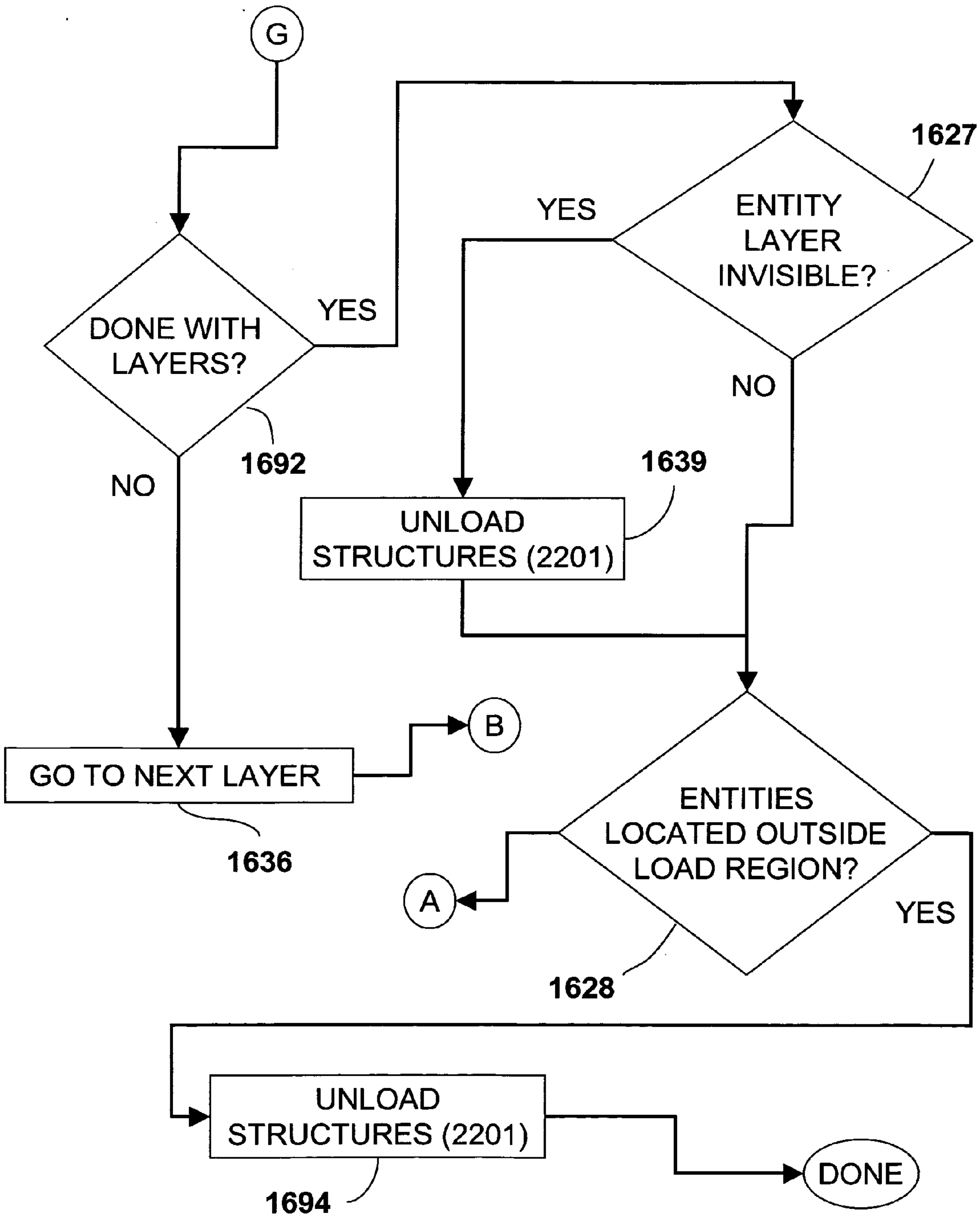

Reading entities from a structure simply entails reversing operation 1900 (FIG. 19) as taught in FIG. 16C (operation 1660). A point is multiplied by scale factor 1910 and added to the bottom left absolute location. Resulting values are saved to local memory to be used by screen writing routine 1636 or other applications. An alternate embodiment is that data is used directly as relative coordinates (without uncompressing) in display intensive applications. This further speeds screen refresh and reduces memory requirements. Entity string labels are decompressed in 2630 as taught in FIG. 26B.

FIG. 19 is a data flow diagram of the coordinate compression algorithm. Map generator program 1700 (FIG. 17A) parses and filters poly-points and poly-elements (polyline and polygons) from input file 1601 into structured database 2200 (FIG. 15). Bounding size 1606 (FIG. 15), set by user at map file generation time, sets maximum error 1950. This maximum error 1950 is used to filter/compress polyline and polygons as taught in FIG. 25. Absolute coordinate data received from Douglas-Peucker (DP) algorithm 2500 (FIG. 25) is further compressed by the novel method taught herein. As an example and not a limitation, two-dimensional X-Y coordinate pairs of latitude and longitude are read as ASCII strings 1908. This method would apply to N-dimensional data sets with identical performance. Operation 1901 converts an ASCII (string) number, in this example a longitude, to an interim decimal float or integer with an implied decimal point 1906. Operation 1903 subtracts current left BB boundary 1810 (FIG. 18) for longitude and/or bottom latitude 1813 (FIG. 18), leaving a positive fractional remainder 1904, or an integer with an implied decimal point. This embodiment's algorithm uses integer arithmetic for faster execution with common processors. Operation 1913 multiplies the fraction by a suitable scaling factor 1910. The scale factor is proportional to the granularity or size of the defined bounding boxes (BB). In this embodiment, scaling factors consisting of multiple powers of two are used in order to permit computationally faster binary shift operations to be used in place of slower multiply operations. This unique property is very significant when processing very large map files. Novel algorithm 1900 is easily adapted to custom dedicated hardware engines due to the simple data flow and use of binary arithmetic. Data is loaded and unloaded via extremely fast direct memory access (DMA) with little or no processor intervention. This is particularly useful when processing multi-dimensional terabyte map files. The Table below lists common BB sizes, associated scale factors 1910, and associated maximum 1950 error. By way of example and not limitation, 2^16 (65,536) is used for a 1-degree bounding box.

Scale Factor Table

| BB Size 1606 (Deg.) | SCALE FACTOR 1910 | *Error (Feet) 1950 (FIG. 5) | *Error(Meter) 1950 (FIG. 5) |
|---|---|---|---|
| ¼ Deg | 2^18 = 262144 | 1.38 | 0.42 |
| ½ Deg. | 2^17 = 131072 | 2.75 | 0.85 |
| 1 Deg. | 2^16 = 65536 | 5.50 | 1.70 |
| 2 Deg. | 2^15 = 32768 | 11.00 | 3.39 |
| 4 Deg. | 2^14 = 16384 | 22.01 | 6.79 |

*1950 maximum error at equator.

Operation 1943 rounds scaled result 1923 by preferred slower rounding up or down to the nearest integer. Alternately, integer truncation, which is faster but is slightly less accurate, may be used. Rounding error 1951 is often smaller or of the same size as the error/uncertainly of current public and private GPS databases making the compression virtually loss-less. Operation 1905 converts the final decimal integer to a binary integer for storage.

Maximum error or accuracy loss from compression truncation is shown in the example below. For most consumer or non-critical commercial applications, a one degree bounding box (BB) yields a virtually loss less compression, because most map data is in error by 20 M (60 feet) or more, and low cost GPS receivers typically provide +/−20-meter accuracy.

Figure 21:
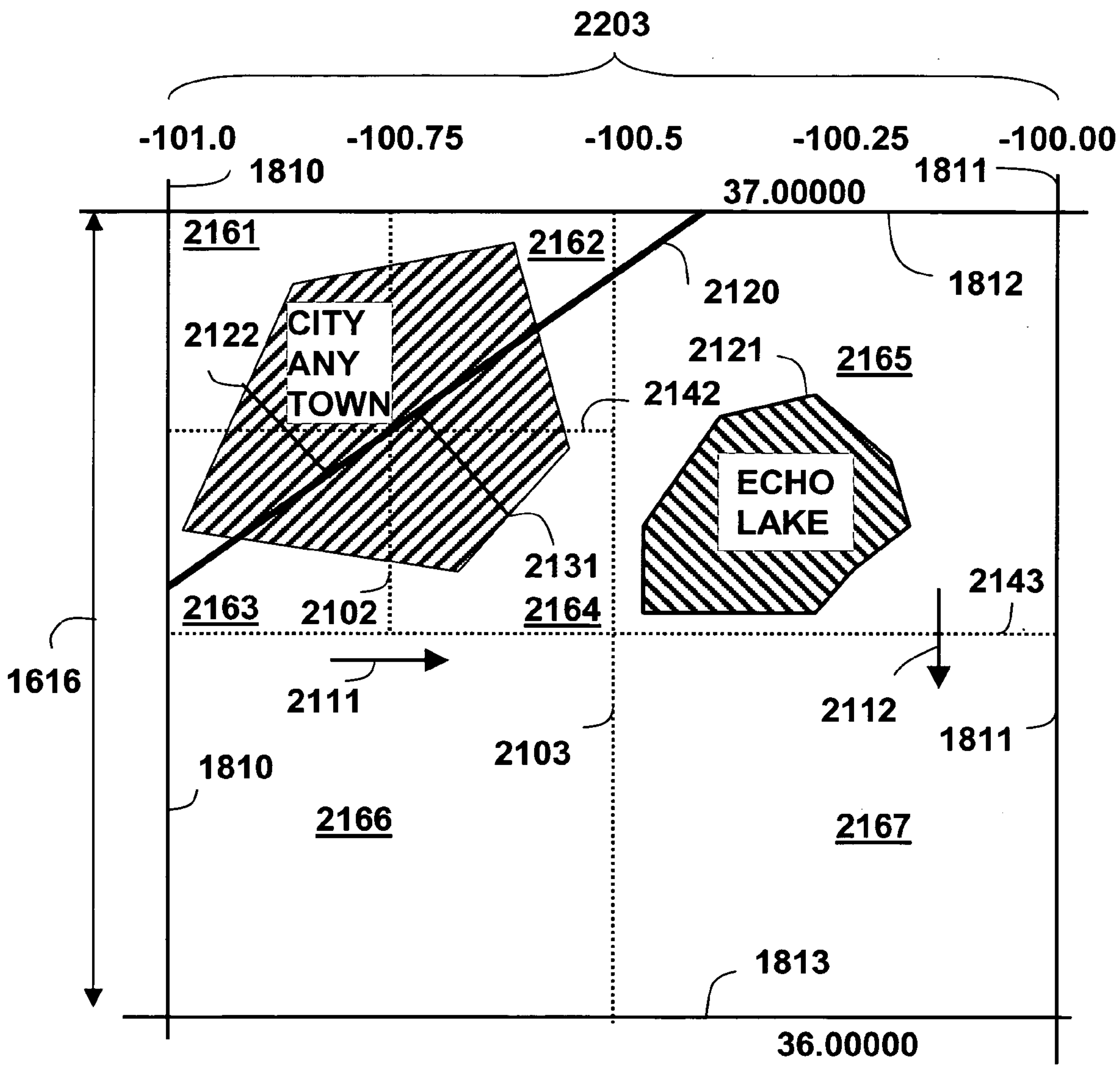
FIG. 21 graphically teaches the operation of a dynamic adaptive compression algorithm.

A benefit of the adaptive Bounding Box as taught in FIG. 21 is that high-density regions, typically areas of greater interest such as cities, are stored at higher accuracies (smaller BB). The adaptive algorithm automatically selects a smaller, more precise BB resulting in less compression loss and smaller error.

Figure 25:
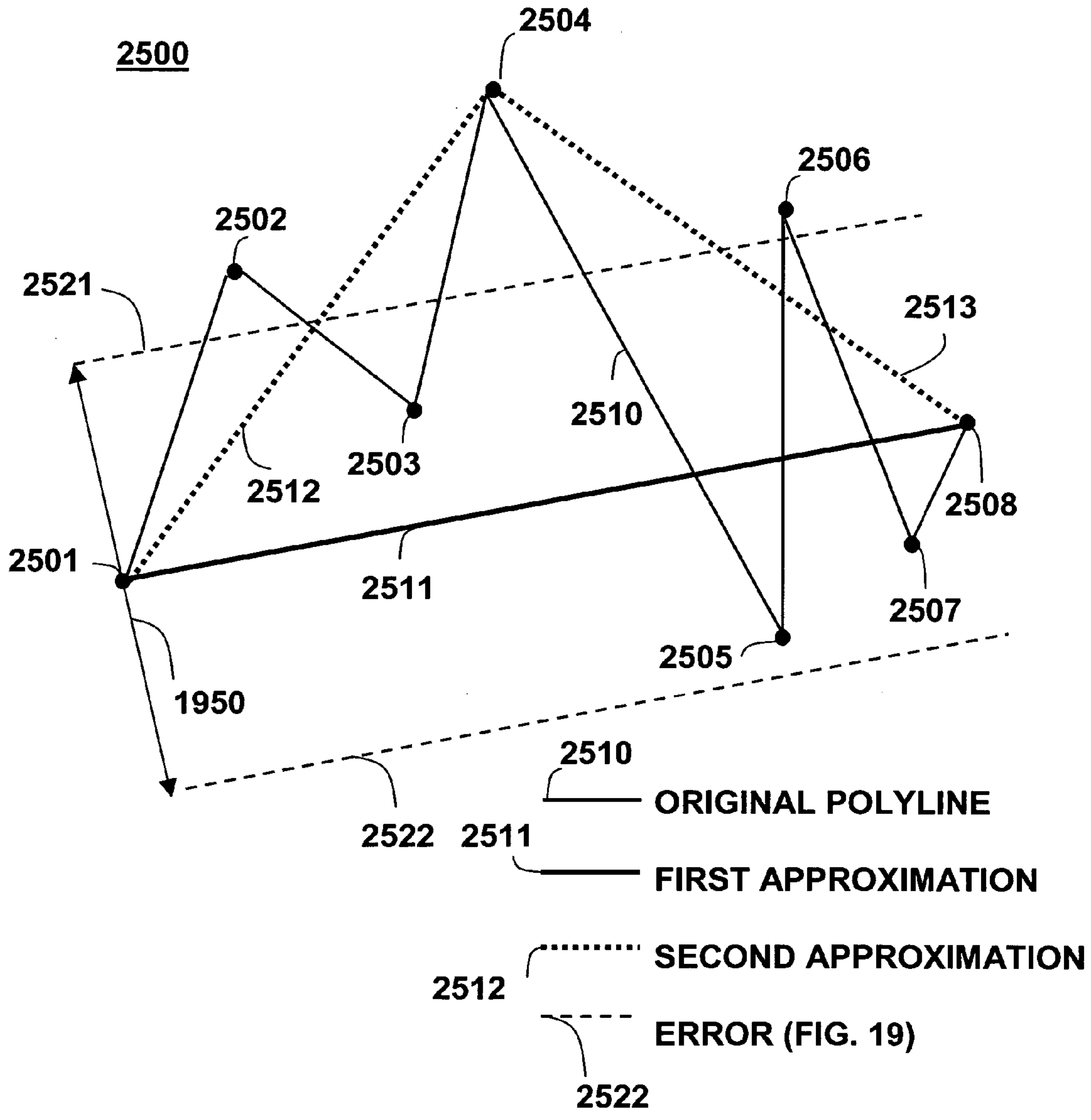
FIG. 25 is a graphic which teaches the operation of the Douglas-Peucker line reduction algorithm.

After polyline reduction/compression 2500 as taught in FIG. 25 is applied, the remaining points are compressed with an offset compression algorithm as taught in FIG. 19. Entity X-Y (longitude-latitude) relative location pair(s) 1820-1823, generated by offset compression algorithm 1900 (FIG. 17A, 19), are added to structure 1800 (FIG. 18) forming list 1850. An entity location is relative to the absolutes coordinates of the bottom left corner, as defined by 1810 and 1812 (FIG. 18), is saved as an unsigned binary integer pair. The following is a sample calculation:

Assume 1 Degree BB (maximum error 1.7 M) Longitude

X=(BB left(Longitude)−right(1827))*Scale Factor(1910)

X=(BB left(1810)−right( )*65,536 (2^16)

X=(−101.000000−(−101.123651))*65,536

X=8103.592

X=8103(decimal) 0x1FA7 (hexadecimal)

Error~=(0.592/65,536) Deg.*60 Deg/nat-mile*6040(ft)/nat-mile=3.25 feet~1 M

Latitude

Y=(BB BOTTOM(Latitude)−bottom(1827))*Scale Factor (1910)

Y=(BOTTOM(1813)−bottom(1827))*65,536 (2^16)

Y=(36.000000−(36.754321))*65,536

Y=49,435.18

Y=49,435 (decimal)=0xC11B (hexadecimal)

Program 1680 as taught in FIG. 16B reads entities located within load region(s) 2222 and 2202 (FIG. 22) from structure 1800. Conversion to absolute coordinates simply involves reversing algorithm 1900. First, the relative location is multiplied by scale factor 1910 as taught in 1660 FIG. 16B. Next, current left boundary 1810 for longitude or bottom latitude is added. The resulting coordinate pairs and associated labels are written to local memory for use by screen writing routines or other applications. For screen/display only applications, X-Y data is used directly as raw/uncompressed data 1827 (FIG. 18) relative to the current BB 1840. This permits faster screen refreshing for time or memory critical applications such as small systems with limited memory including cell phones and PDAs.

The novel algorithm offers fast, efficient compression with minimal or no perceived loss of accuracy. Adaptive resolution further minimizes error in areas of high interest, such as urban areas, which also often have the most accurate data. Screen writing uses compressed or raw/uncompressed data which enhances screen-refreshing speed. When applications need absolute data, uncompressing is extremely fast and efficient, requiring only a binary shift (multiply by power of two) and addition operation. Shift/multiply and addition MAC operations are easily performed in one or two DSP cycles and/or by simple dedicated hardware to provide additional speed to an already fast decompression process.

FIG. 20 shows display engine view and zoom and detail filter operation. Because database 2200 (FIGS. 16, 17, and 22) typically covers hundreds of square KM, multiple zoom levels are provided to facilitate viewing. In this embodiment, sixteen levels of zoom 2070 offered by way of example and not limitation.

Entity types such as highways 2120 (FIGS. 21 and 24), police/fire 2022, parks, small cities 2031, and state highways are stored on individual layers. A sample listing of entity layers, offered by way of example and not limitation, is defined in table 2090 below:

Layer Table 2090

| LAYER Entity |
|---|
| 1. Basemap |
| 2. USBasemap |
| 3. WorldLakes |
| 4. USLakes |
| 5. WorldRivers |
| 6. States |
| 7. US States, Shoreline & Counties |
| 8. Perennial Shoreline |
| 9. US Basic Inter |
| 10. Perennial stream |
| 11. Intermittent stream |
| 12. Braided stream |
| 13. Lake Excavation |
| 14. Lake Inland |
| 15. Lake Inland Perennial |
| 16. Lake Man Made Reservoir |
| 17. Lake Man Made Perennial |

-continued

| LAYER Entity |
|---|
| 18. Lake Man Made Intermittent |
| 19. RailRoad Tram |
| 20. RailRoad Main |
| 21. RailRoad Other |
| 22. RailRoad Tunnel |
| 23. RailRoad Yard |
| 24. RailRoad Spur |
| 25. RailRoad Under |
| 26. Alleys |
| 27. Driveways |
| 28. Preliminary Streets |
| 29. Provisional 0.125 × 0.125 14 M |
| 30. Trail 0.125 × 0.125 14 M |
| 31. Other Streets 0.125 × 0.125 14 M |
| 32. Streets Unsep 0.125 × 01.25 14 M |
| 33. Road Sep 0.125 × 0.125 14 M |
| 34. USHighways 0.25 × 0.25 7 M |
| 35. State Hwy 0.125 × 0.125 14 M |
| 36. Interstates 0.25 × 0.25 7 M |
| 37. Interstates 4 × 4 7 M |
| 38. Major Cities |
| 39. Medium Cities |
| 40. Small Cities |
| 41. Gov Police/Fire |
| 42. Landmark Parks |
| 43. Gov Office |
| 44. Health |

By way of example and not limitation, three zoom levels are shown. Zoom in level-1 2051, which covers approximately 640,000 Square Km (25,0000 miles), major highways 2120, lakes 2121, and cities 2131 are shown. Fine detail such as police/fire 2022 and residential streets 2031-2033 entities are hidden from view at this level.

As zoom level increases, additional detail is automatically added as shown in 2203 and 2066. Entity labels 2080 are made visible. At the highest zoom level-15 2066, all layers in table 2090 are visible. Via Graphical User Interface (GUI) 2400 (FIG. 24), an user may modify filter table 2093 masking unwanted layers. Masking operation 2092, shown as an "AND" gate, is also taught in FIG. 16A.

Summary of Layer States:

1. The data of the layer one is loaded at the 21000 KM level per table 2090.

2. The data of this layer is unloaded at the 0 KM level. (0 means always in memory at runtime. For other layers, it can be non-zero values. For example, USBaseMap is unloaded at the 8000 KM level.)

3. This layer is visible in the range of 8001 KM to 500 KM.

4. The labels (the names of the states) are visible in the range 8001 KM to 500 KM. (For other layers, it could be a smaller range compared to the range in number. An example is streets.)

| VISIBILITY TABLE 2090 |
|---|
| 8001 KMs zoom level-1<br>Visible Items: BaseMap.<br>Loaded at 21000 KM |

-continued

| VISIBILITY TABLE 2090 |
|---|
| Not Unloaded.<br>Displayed from 21000 KM to 0 KM<br>Label: invisible<br>2 KMs zoom level-5<br>Visible Items: USBaseMap, USHighways,<br>State Hwy. Interstates,<br>Loaded at 21000 KM<br>Unloaded at 8000 KM<br>Displayed from 21000 KM to 8000 KM<br>Label Displayed from 21000 KM to 8000 KM<br>0.1 KMs zoom level-16<br>Visible Items: All items<br>Loaded at 21000 KM<br>Unloaded at 8000 KM<br>Displayed from 21000 KM to 8000 KM<br>Label Displayed from 21000 KM to 8000 KM |

Pseudo-Code fragment below teaches label/text visibility control 2091 verses zoom level 2070. In most cases, labels are enabled (made visible) at zoom level-four and above, with exceptions consisting of states and streets.

1. States: At low zoom levels, one to four showing only labels abbreviations. At high zoom levels, full names displayed.

2. Streets:

```
    If zoom in to the level (scale) < 2-KM then show all
the labels.
    Else
    {
    Show label only when number of the road parts >
(Current Scale / 2)
    }
```

Figure 23:
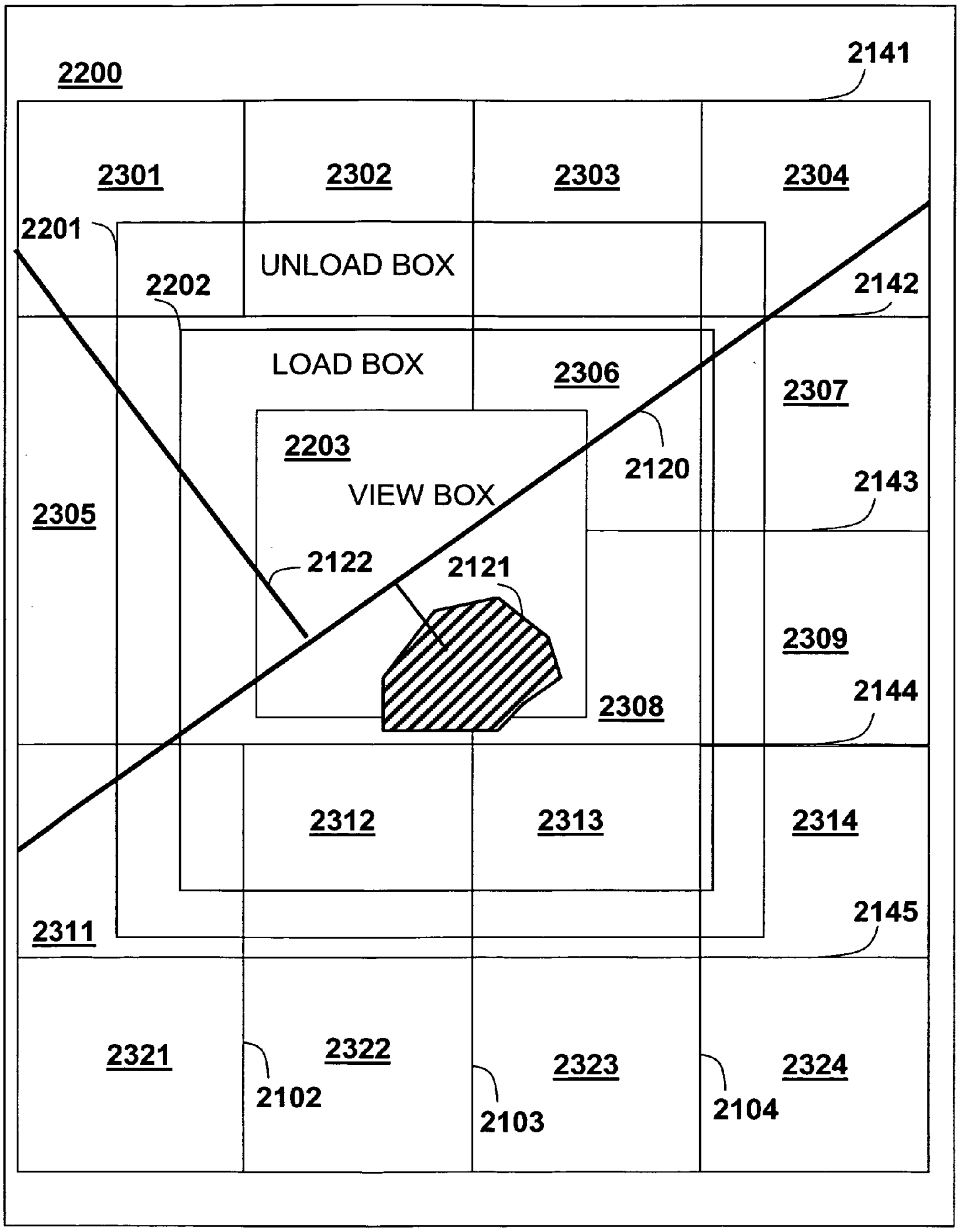
FIG. 23 is a schematic diagram which teaches data memory management and display refreshing.

Load/unload program as taught in FIGS. 23 and 22 and label uncompression program 2630 (FIG. 26) decodes entity label strings to dictionary 2608. Entity label 2080 token(s) 1890 (FIG. 18), mapped to dictionary/table 2608, are translated to strings for display. FIG. 26A teaches dictionary compression, decompression, and mapping to strings for use by drawing routines and external applications.

Screen view preload feature as taught in FIG. 22 speeds screen refreshing when zooming by automatically loading the next lower zoom area to memory. Thus, when zooming out, entities are already loaded to memory and thereby are available for immediate display. Operation of the zoom detail filter 2091 further speeds screen refreshing by reducing the number of entities sent to the screen. Additionally, the automatic zoom level detail filter enhances user perception by reducing screen clutter. When zooming in, entities now located outside unload box(s) 2201 (FIG. 22) that are no longer needed are discarded from memory.

FIG. 21 graphically teaches the operation of the dynamic adaptive compression algorithm. Map generator program 1700, as taught in FIG. 17A, parses, filters/compresses polyelements (polyline and polygons) from input file 1601 into structured database 2200. Bounding box (BB) size parameter 1606, which is set by an user, determines maximum position rounding error 1950 as taught in FIG. 19. Maximum error 1950 parameter (in table 1912 below) is used to filter/compress polyline and polygons as taught in FIG. 25. Absolute coordinate data received from Douglas-Peucker (DP) algorithm 2500 (FIG. 25) is further compressed by the novel method taught herein.

Table 1912

| BB Size 1606 (Deg.) | SCALE FACTOR 1910 | *Error(Feet) 1950 (FIG. 19) | *Error(Meter) 1950 (FIG. 19) |
|---|---|---|---|
| ¼ Deg | 2^18 = 262144 | 1.38 | 0.42 |
| ½ Deg. | 2^17 = 131072 | 2.75 | 0.85 |
| 1 Deg. | 2^16 = 65536 | 5.50 | 1.70 |
| 2 Deg. | 2^15 = 32768 | 11.00 | 3.39 |
| 4 Deg. | 2^14 = 16384 | 22.01 | 6.79 |

*maximum error at equator.

A fixed BB forces a one size fits all approach, overlaying a fixed grid/BB to the entire input file 1601. Map files of large regions often contain a mix of sparse regions such as forest, lakes 2121, rural areas, towns 2131, as well as busy cities. Density is measured by entity element count per BB 2203. The density parameter is used to detect high-density areas such as towns and cities 2131. This permits compression at significantly greater accuracy (lower loss) with minor increase in file 2200 size. Data from high density areas is typically newer and frequently updated. Newer data generated with the latest GPS equipment is significantly more accurate.

Operation 1710 (FIG. 17) counts the number of entities found with in BB 2203. Limits of BB 2203 are defined by left 1810, right 1811, top 1812 and bottom 1813 (FIG. 18). Initial BB size 1606 is by way of example and not limitation set to 1-degree operation 1702.

Figure 17B:
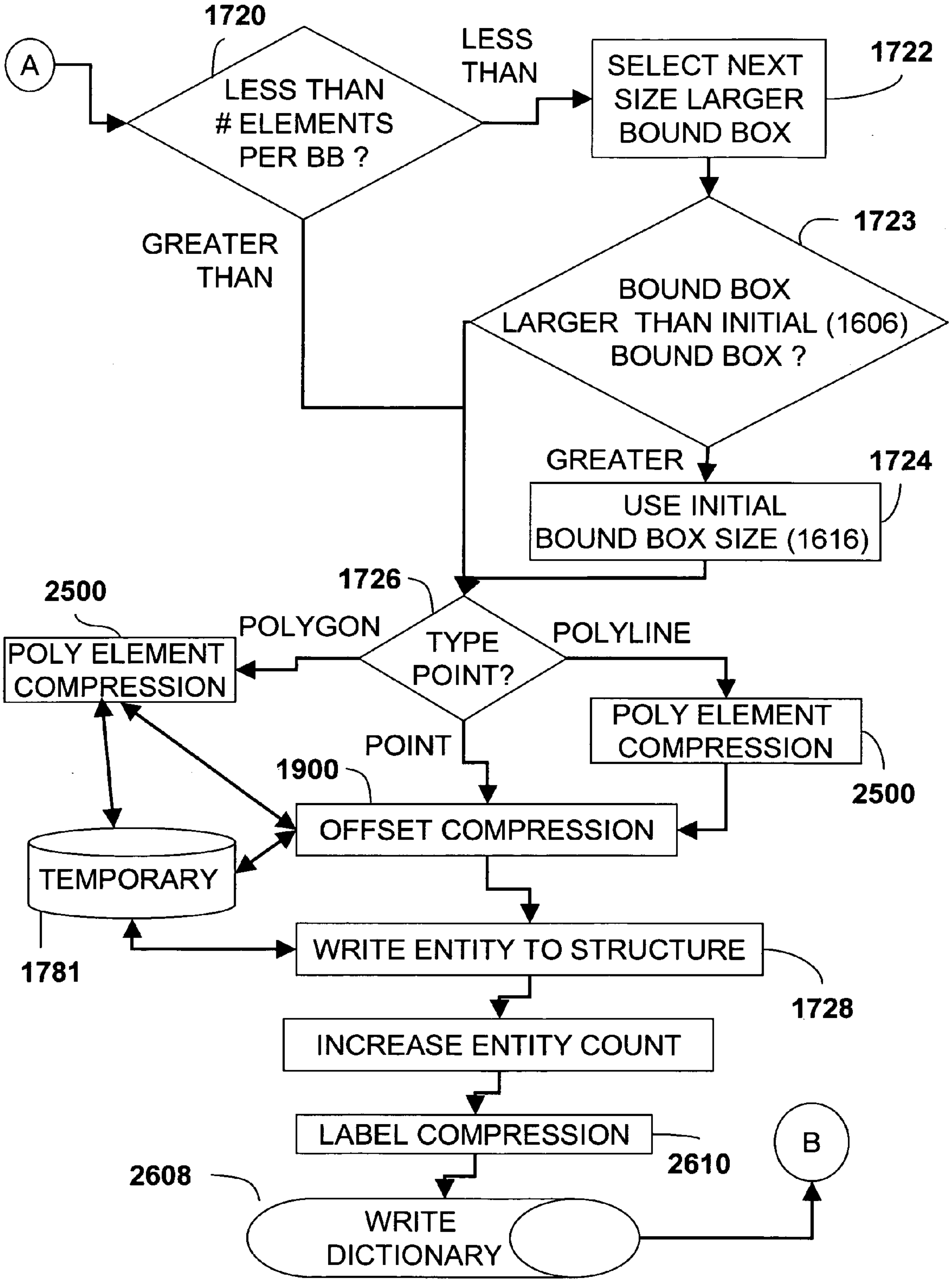
Figure 17C:
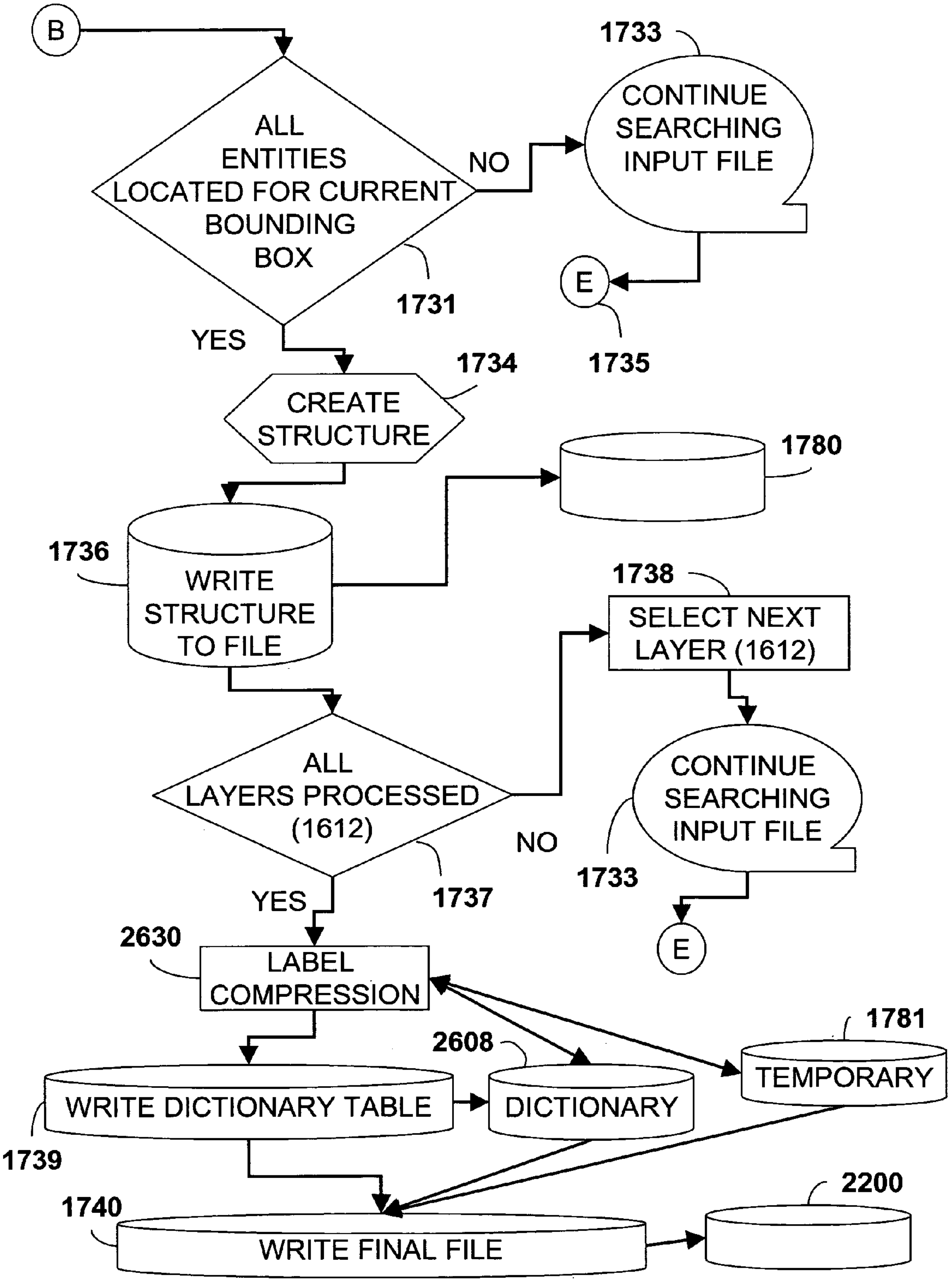

Comparison 1711 (FIG. 17) tests count 1710 with a preset limit. If the maximum count is exceeded, the next smaller BB 2164 is selected in operation 1712 (FIG. 17). New smaller BB limits are defined by left 1810, right 2103, top 1812 and bottom 2143. The count is repeated. Comparison 1711 tests the count with a preset limit. If it finds the maximum count is exceeded, the next smaller BB 2161 is selected and so on. A new BB is now defined by new smaller limits defined by left 1810, right 2102, top 1812, and bottom 2142. Count for region 2161 is tested 1720 (FIG. 17). Because it is greater than the preset limit, no additional reduction is required, operation continues to 1726, and remaining compression is performed as taught in FIG. 17B.

Compression 1700 (FIG. 17A) operation continues for regions 2162, 2163, and 2164. Progress proceeds to low-density region 2165 and operation 1706 (FIG. 17) selects the next larger BB selected from table 1912 (FIG. 19). Operation continues from left 2111 down to 2112 until remaining regions 2166 and 2167 are processed.

High-density areas such as town and cities 2131 (FIG. 21) are saved at significantly greater accuracy with typically a fraction of a percent increase in final database 2200 size. Thus, substantially larger area maps are generated while maintaining greater accuracy in regions such as cities and towns with little size penalty.

The variable BB has a number of benefits including the following:

First, a smaller BB defines a proportionally smaller error 1950 (FIG. 19, 25) parameter which is used by polyline filter/compression algorithm 2500 (FIG. 25). Thus, finer detail in high-density regions is preserved.

Second, high-density regions often contain newer, higher accuracy entity location information. Benefits of newer, higher accuracy source data, which is typically found in urban areas, are preserved with only a small increase in final file size.

Third, measure of density is performed as a simple count and comparison operation.

Fourth, smaller BB regions structures load more quickly to memory speeding viewing as taught in FIG. 22.

Fifth, scale factors based on powers of two speed both compression and decompression as taught in FIG. 19.

Sixth, the process is adaptive by automatically changing the BB size/granularity as map file 1601 is traversed.

Seventh, error from imposed rounding/truncation operation 1943 (FIG. 19) is reduced by ½ for each reduction in granularity/BB size 1606.

Eighth, higher compression is applied to sparse areas which typically contain less accurate source data. Rounding error 1951 is approximately equal to or less than the source inaccuracy.

Ninth, lower compression is applied to dense areas, which typically contain more accurate source data, resulting in a smaller rounding error 1951 which is approximately equal to or less than the source inaccuracy.

Tenth, with rounding errors on average smaller or of similar size to original source error, compression is virtually lossless.

Figure 24:
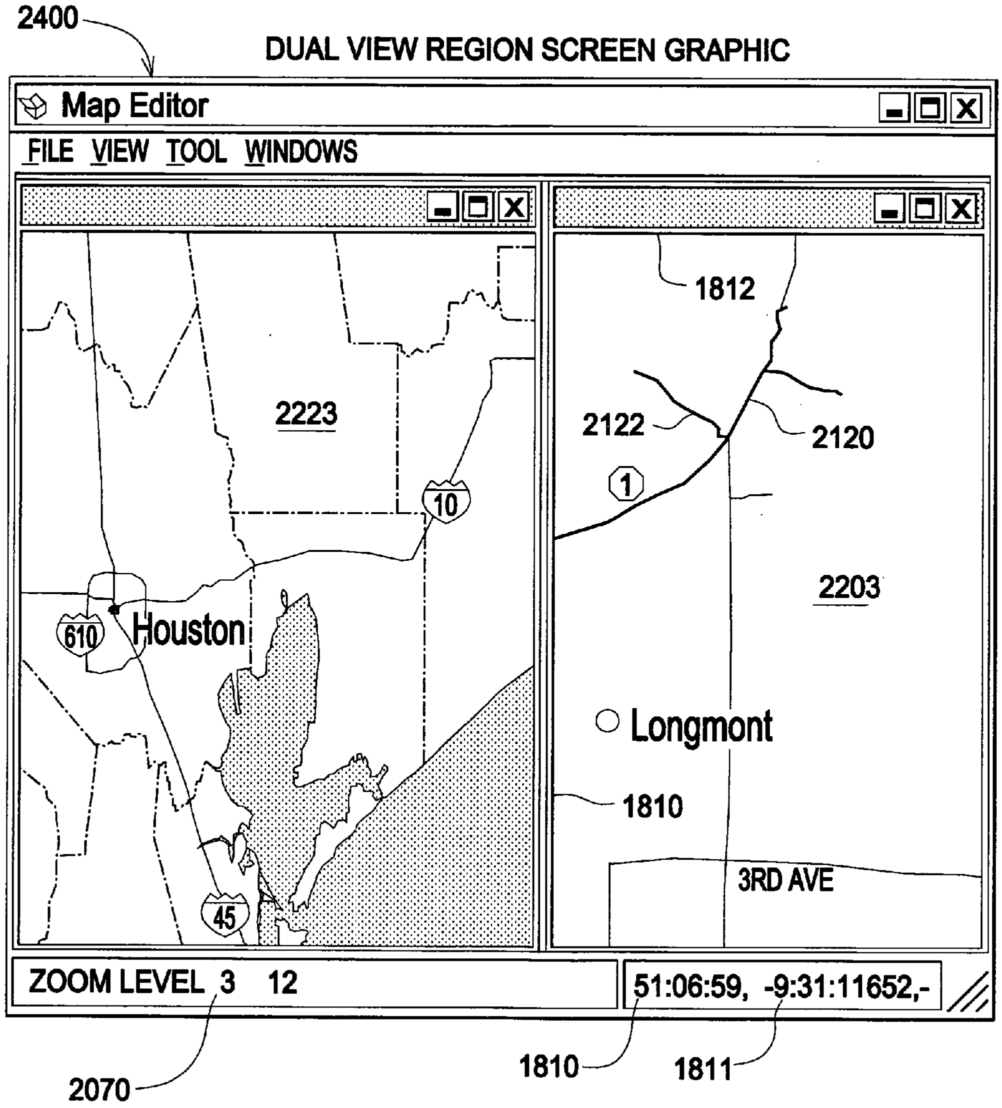
FIG. 24 is a sample map application GUI screen shot demonstrating multiple view windows.

FIG. 22 is a schematic diagram teaching data memory management and display refreshing. Area 2200 (FIG. 16, 17) is the complete compressed database available for viewing. Arbitrary shaped view box 2203, established by an user, is typically displayed to a flat panel or CRT display. By way of example and not limitation, view regions 2223 and 2203 are shown as rectangles. Selection of view box 2203 prompts the corresponding generation of a superset larger load region/box 2202. This in turn prompts corresponding generation of a larger unload region/box 2201. System architecture permits viewing of multiple regions 2203 and 2223 to a common and/or remote display(s). By way of example and not limitation, a second load box 2222, unload box 2221, and view box 2223 are shown. FIG. 24 is a sample map application GUI screen shot demonstrating multiple view regions.

Entities 2120, 2121, and 2122 within view box(s) 2203 are loaded to memory and displayed immediately. Enclosing load box 2202 loads objects to memory as processor cycles become available. By way of example and not limitation, the load box is refreshed every 100 milliseconds. Enclosing load box 2202, unload region 2201 unloads objects outside region 2201 from RAM memory and discards them. By way of example and not limitation, unload box 2201 is refreshed at lower priority every 3,000 milliseconds. In this manner, objects close to view region(s) have a higher priority and thus are made immediately available to the view window if it is moved or resized. Unused objects are unloaded in a lower priority loop freeing up memory resources. Thus, memory resources are minimized while maintaining rapid screen refresh rates and while reducing delays.

User requested panning movement 2205 relocates unload box 2211, load box 2212, and view box 2213. New viewing region 2213 requested by an user is immediately updated from data previously loaded to load box region 2202. Thus, an user's screen is refreshed immediately, eliminating delays normally encountered in reading slower bulk memory. At scheduled intervals, objects within Region 2212 are loaded to memory and unused objects outside region 2211 are then unloaded from memory. To further enhance screened/display response, load region 2202 algorithm "looks" in direction of panning 2205 first. Thereby, objects are available sooner to the view region. This predictive or adaptive pre-loading of objects further enables shorter screen refresh intervals thus making the screen panning response crisp.

By way of example and not limitation, load box 2202 is two times the size of view box 2203. By way of example and not limitation, unload box 2201 is two times the size of load box 2202. Actual memory size is dependent on screen size, resolution, and available system resources. Faster view box panning is achieved by increasing the load box memory/size. The load box is parameterized to optimize the use of physical memory when it is used with multiple view windows. To improved perception, actual target system screen redraw rate is detected on the target hardware and is used to modify the load and unload event timers.

The instant invention teaches a plurality of viewing regions with corresponding pre-loaded regions to enhance system response. Prioritizing pre-loading of objects in load region insurers crisp panning and zooming while minimizing memory usage. Unused objects are automatically unloaded from memory with variable load and unload timers. This offers an improvement over prior art screen refresh that often appears sluggish.

FIG. 23 is a schematic diagram teaching data memory management and display refreshing. Area 2200 is the complete compressed database available for viewing. Compression algorithm 1600, as taught in FIG. 16A, traverses tighter database at N degree steps 1606 as taught in FIGS. 16 and 21.

Arbitrary shaped view box(s) 2203 (FIGS. 22 and 24) are established by an user for display. Such display, by way of example and not limitation, is typically a flat panel or CRT display. View box 2203 in turn generates enclosing load region/box 2202, and larger unload region/box 2201 as taught in FIG. 22. System architecture permits viewing of multiple regions 2203 and 2223 (FIG. 22) to common and/or remote display(s).

Boundaries of load box 2202 are compared to bounding box borders 2102, 2103, 2104, 2141, 2142, and 2143 (FIG. 23). Only data in the bounding blocks that intercept load box 2202 will be loaded into memory. For example, entities 2120, 2121, and 2122 within view box 2203 are drawn to the display. Objects outside region 2201 are unloaded from RAM memory and discarded. All "C++" methods use the "bound box" to determine if the entity is needed in the painted/view region 2203. Loading entities only as needed for immediate use speeds screen refresh rates, and minimizes processor resources and costly RAM memory.

Unused entities are automatically unloaded in a lower priority loop freeing up memory resources. Thus, memory and processor resources are minimized while maintaining rapid screen refresh rates and while reducing delays. This is particularly critical in limited resource devices such as cell phones and PDA type devices.

The instant embodiment teaches a plurality of viewing regions with corresponding pre-loaded regions to enhance system response. Entities close to view region(s) 2203 within 2202 are preloaded to memory thus making them immediately available to view window 2203 for panning and/or zooming. Pre-loading entities near the active viewing region achieves crisp panning and zooming while minimizing memory usage. Unused objects are automatically unloaded from memory with variable load and unload timers. This offers an improvement over prior art screen refresh that often appears sluggish.

FIG. 24 is a sample dual view region screen graphic. To help visualize multiple view box principles taught in FIG. 22, screen graphic 2400 is offered by way of example and not limitation. An user opens one to N view window(s). By way of example and not limitation, two view windows 2203 and 2223 are offered. An user may select any region from compressed database 2200 (FIGS. 16 and 17) for viewing. Arbitrary shaped view box(s) 2203 established by an user are typically displayed on a flat panel or CRT display. By way of example and not limitation, view regions 2223 and 2203 are shown as rectangles. Selection of view box 2203 prompts the corresponding generation of invisible load region/box 2202 (FIG. 22) enclosing view region 2203. This in turn prompts corresponding generation of a larger unload region/box 2201 (FIG. 22) enclosing 2202. System architecture permits viewing of multiple regions 2203 and 2223 to common and/or remote display(s). By way of example and not limitation, a second load box 2222, unload box 2221, and view box 2223 (FIG. 22) are offered.

Entities 2120 and 2122 within view box(s) 2203 are loaded to memory and displayed immediately. Load box 2202 preloads (not visible) objects just outside visible window 2203 to memory as a medium priority processor task. By way of example and not limitation, the load box 2202 is refreshed every 100 milliseconds. Simultaneously, a processor unloads/discards objects outside region 2201 from memory as a low priority task. By way of example and not limitation, unload box 2201 is refreshed every 3,000 milliseconds. In this manner, objects close to view region(s) are loaded at a higher priority thus making them immediately available to view window 2203 if it is moved and/or resized. Unused objects are unloaded in a low priority loop freeing up memory resources. Thus, memory resources are minimized while maintaining rapid screen refresh rates and while reducing delays.

An user via a GUI selects the zoom level or magnification 2070 (FIG. 20). The user also controls via the GUI the level of detail and desired layers such as services, fire, police, etc. An user may also place custom icons, which are not shown, to screens to mark specific references such as home, fishing locations, etc. As taught in FIG. 20, the view engine controls the level of visible detail such as visibility of street names. Detail control is performed automatically as an user zooms in and out. Thus screen clutter is controlled and user readability and usability is enhanced. Zooming speed is enhanced by use of preloading enclosing load box 2202 as taught in FIG. 22 and below.

User requested panning movement 2205 (FIG. 22) relocates unload box 2211, load box 2212, and view box 2213. New viewing region 2213 requested by an user is immediately updated from data previously loaded (already in memory) from region 2202. Thus, the user's screen is refreshed immediately eliminating delays normally encountered in reading slower bulk memory common in prior art. At scheduled intervals, objects within region 2212 are loaded to memory and unused objects outside region 2211 are unloaded from memory. To further enhance screened/display response, load region 2202 algorithm "looks" in direction of panning 2205 first; thereby objects are available sooner to the view region. This predictive or adaptive pre-loading of objects further enables shorter screen refresh intervals, making the screen panning response crisp.

By way of example and not limitation, load box 2202 is two times the size of view box 2203. By way of example and not limitation, unload box 2201 is two times the size of load box 2202. Actual memory size is dependent on screen size, resolution, and available system resources. Faster view box panning is achieved by increasing the load box memory/size. The load box is parameterized to optimize the use of physical memory when used with multiple view windows. To improved perception, actual target system screen redraw rate is detected on the target hardware and used to modify load and unload event timers.

The instant invention teaches a plurality of viewing regions with corresponding preloaded regions to enhance system response. Unused objects are automatically unloaded from memory with variable load and unload timers. Prioritizing of pre-loading objects immediately adjacent to the current visible window provides crisp panning and zooming while minimizing memory usage. The net effect is improvement over prior art's screen refreshes that often appear lethargic or jerky.

FIG. 25 is a drawing showing the operation of the Douglas-Peucker (DP) algorithm. Douglas-Peucker (DP) algorithm 2500 uses the closeness of a vertex to an edge segment. The DP algorithm tries to preserve directional trends in a line using a tolerance error/factor selected according to the amount of simplification required. The Douglas-Peucker algorithm is offered by way of example and not limitation. The Douglas-Peucker algorithm is selected for its computational simplicity and the high compression ratios realized.

The algorithm works top down by starting with a crude initial guess at simplified polyline 2511, namely the single edge joining the first 2501 and last vertices 2508 of polyline 2510. Then remaining vertices 2502 through 2507 are tested for distance to edge 2511. If there are vertices further than a specified tolerance 2521 or 2522 away from the edge, then vertex 2504 is added to the simplification. This creates a guess for the simplified polyline 2512. Using recursion, this process continues for each edge of the current guess until all vertices of the original polyline are within tolerance 2501 of the simplification.

More specifically, in the DP algorithm, the two extreme endpoints of a polyline are connected with straight line 2511 as the initial rough approximation of the polyline. Then, how well it approximates the whole polyline is determined by a computing the distances from all intermediate polyline vertices to that line segment. If all of these distances are less than the specified tolerance line 2522 or magnitude 1950 (FIG. 19), then the approximation is good, endpoints are retained, and other vertices are eliminated. However, if any of these distances exceed tolerance 1950, then the approximation is not good enough. In this case, we choose the point (2504) that is furthest away as a new vertex subdividing the original polyline into two shorter polylines 2512 and 2513 as shown.

This procedure is repeated recursively on the two new shorter polylines 2512 and 2513. If at any time, all of the intermediate distances are less than error 1950, all intermediate points are then eliminated. In sample polyline 2510, final approximation lines 2512 and 2513 eliminate 5 points from the original 8 realizing 62% (5/8*100=62%) compression. The identical process is used with polygons, effectively performing a low pass filter or smoothing operation. Remaining points (in absolute coordinates) are further compressed by offset algorithm 1900 as taught in FIG. 19. The action of the Douglas-Peucker algorithm with the offset algorithm results in substantial compression while maintaining the predetermined level of accuracy.

FIG. 26 is a text label compression algorithm flow chart. Large databases often contain duplicate data permitting compression. Unfortunately, due to the random distribution of duplicate data typically found in map file labels, common run length encoding (RLE) type compressors are of little help. The compression method taught herein is based on statistical usage frequency of words occurring in map files. For example, words such as "CITY", "STREET", and "HILL" occur frequently. A histogram of words is constructed by statistically measuring frequency of words. Each word is assigned a binary token or value and is added to a table/array. The level of compression is controlled by the threshold or number of occurrences found to qualify for addition to the table. Final compressed labels 1890 (FIG. 18) are saved as one or more tokens with or without ASCII strings.

Operation 2610 builds a histogram and dictionary of all words found in the input file 1601. Operation 2601 reads each label string assigned to the entity. Operation 2603 parses the string locating individual words or phrases typically separated by ASCII spaces. Operation 2605 tests if all words have been located; if null "", the string program exits. Operation passes to decision 2607; if the word is new it is added to dictionary 2608. If the word exists in the dictionary, the count is incremented, and operation passes back to 2603 to process the next word. Operation repeats until all words are processed. Each array entry is assigned a token value. By way of example and not limitation, the token is the address of the entry. The final dictionary is saved to map file 2200 for use by uncompression operation 2630.

Operation 2620 scans ASCII label/name strings assigned to entities, replacing individual words with unique tokens. The dictionary is constructed in operation 2610 from all words found in file 1601. Operation 2611 reads each label string assigned to the entity. Operation 2612 parses the string locating individual words or phrases typically separated by ASCII spaces. Comparison 2613 tests if the word is found in dictionary 2608; if true, the word is replaced with a token in 2618. Else, the word is unchanged 2614, and operation passes to decision 2617. A comparison tests if done; if true, the structure is updated with the compressed string/token 1890 (FIG. 18). Otherwise, operation 2616 reads the next word, returning to operation 2613 to process the next word. Operation repeats until all strings are processed. The method taught herein is computationally simple and relatively fast. Speed is not an issue when generating file 2200 as this is typically done once to generate the static file. However, the reverse uncompressing process 2630 is extremely fast using an efficient lookup table. Dictionary 2608 is saved as part of file 2200 for use by uncompressing process 2630.

Operation 2630 scans tokenized label/name strings assigned to entities and replaces individual tokens with corresponding strings from dictionary 2608. A dictionary is constructed in operation 2610 from all words found in file 1601. Operation 2631 reads the tokenized label/name assigned to the entity. Operation 2632 tests for strings and tokens. If a token, operation 2638 looks up the word from dictionary 2608 and replaces the token with text. Else, the word string is unchanged 2634 and operation passes to decision 2637. Comparison 2637 tests if done; if so, the uncompressed string is returned. Otherwise, operation 2636 reads the next word or token, and operation returns to 2632 to process the next word or token. Operation is repeated until the string is processed. The method taught herein is computationally simple and very fast with modern processor memory addressing methods. The sample code fragment below is offered by way of example and not limitation:

In this embodiment, lookup decompression is implemented as a case switch in the "C" language. The following is a sample code fragment:

```
Switch( . . . )
{
    case 0x05:          //    Phrase "BLVD"
      m__strRtn += (TCHAR)32; // " "
      m__strRtn += (TCHAR)66; // "B"
```

-continued

```
          m__strRtn += (TCHAR)76; // "L"
          m__strRtn += (TCHAR)86; // "V"
          m__strRtn += (TCHAR)68; // "D"
          m__strRtn += (TCHAR)46; // "."
          break;
      case 0x07:                              //
Phrase "City"
          m__strRtn += (TCHAR)67; // "C"
          m__strRtn += (TCHAR)73; // "I"
          m__strRtn += (TCHAR)84; // "T"
          m__strRtn += (TCHAR)89; // "Y"
          break;
      case 0x10:                              //
Phrase "HILL"
          m__strRtn += (TCHAR)72; // "H"
          m__strRtn += (TCHAR)73; // "I"
          m__strRtn += (TCHAR)76; // "L"
          m__strRtn += (TCHAR)76; // "L"
          break;
    . . .
}
```

For example, "CITY" is assigned the token binary value of 0x07. At runtime, the lookup table file is loaded to memory and the program reads string "Echo" and value 0x07. The program then checks the internal lookup table and converts 0x07 to the string "CITY", concatenating "Echo" with "City", and forming the full name "Echo City". The disclosed method offers high compression while offering rapid decoding due the fast operation of the lookup table.

If additional space reduction is required, the final table 2608 may be compressed using common run length encoding systems such as Lempel Zev Welch (LZW) which is well known to the art. This requires additional processor resources, often a balance of available memory and CPU speed, to perform the uncompressing at run time. Assigning tokens to label words achieves high compression rates without loss. Decompression is implemented as a fast lookup table and may be performed quickly with modern processors with advanced indirect addressing modes.

FIG. 27 is a sample of an ASCII polygon map file fragment. The details of this fragment are essentially the same as those taught in FIG. 28 for a sample ASCII polyline map file fragment. Thus, the details of FIG. 27 are taught in FIG. 28.

Figure 28:
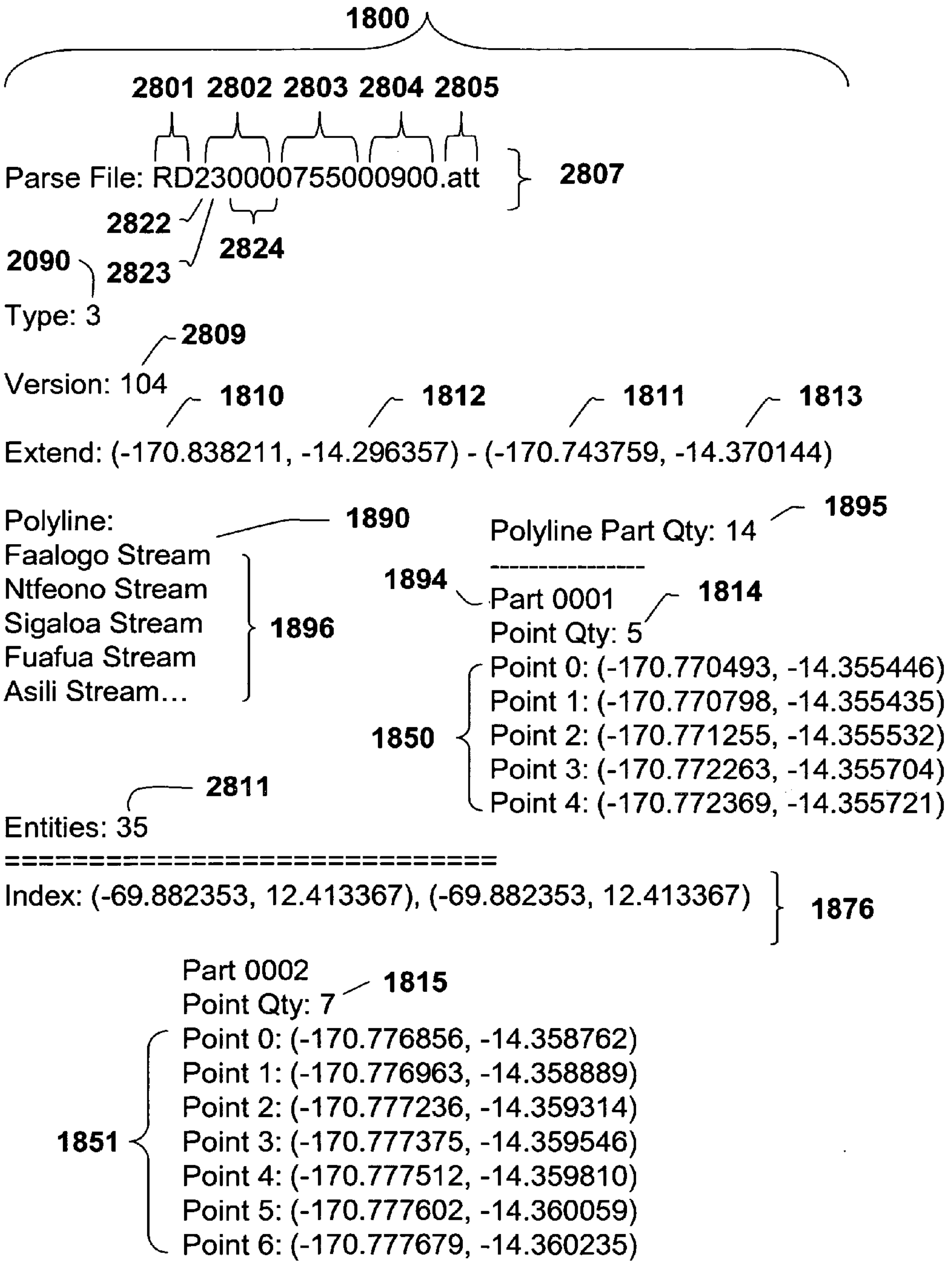
FIG. 28 is a sample ASCII polyline map file fragment.

FIG. 28 is a sample ASCII polyline map file fragment. To speed data retrieval and screen drawing, a descriptive file name 2807 is utilized with additional file structure features taught herein. File name 2807 has embedded file type and geographic extent information. This is an important aspect of the instant invention in that the drawing engine can determine if file area is within active view box 2203 and/or load box 2202 without opening the file. A simple inspection of file name 2807 reveals the type 2801, location 2803-2804, and area enclosed 2802 by the file. This greatly speeds data retrieval and screen drawing, as the area enclosed is determined by inspecting the file name 2807. The parameter list taught herein is offered by way of example and not limitation. Only as an aid for human readability, parameters 2802, 2803, and 2804 are encoded as ASCII numbers by way of example and not limitation. In another embodiment, numbers are replaced with alpha characters to enable shorter file names thereby saving storage space and/or permitting the inclusion of additional parameters. Similarly, the naming convention easily extended to N-dimensional files. An example is "TYPE_XX_YY_ZZ_PARM.abc". As files are indexed via computer, human readability is not required.

The methods taught herein vary from prior art where the files must be sequentially opened, read, and inspected for contents. File I/O is typically a very slow operation.

File name 2807 uses industry standard sixteen plus three file name format. By way of example and not limitation, a file name has the following minimum elements:

| Element | Parameter | Number Characters |
|---|---|---|
| 2801 | Type parameter | Two |
| 2802 | Tolerance/area parameter | Five |
| 2803 | Latitude tolerance/area parameter | Five |
| 2804 | Longitude parameter | Five |
| 2805 | File extension parameter | three |

Tolerance parameter 2803 is further divided into a tolerance 2822, bounding box 1606, and three spare parameters 2824 for future use.

TOLERANCE TABLE

| 2822 | Tolerance 1950 Approx. Meters | Tolerance 1950 (FIG. 19) Approx. Feet |
|---|---|---|
| 1 | 7 | 21 |
| 2 | 14 | 42 |
| 3 | 28 | 84 |
| 4 | 56 | 168 |

Tolerance parameter 2822 is translated from the above table to relative error parameter 1950. This parameter is determined when file 1800 is generated based on the size of the bounding box 1606 used to enclose elements as taught in FIGS. 16, 19, and 21. The error parameter is also used by polyline filter algorithm 2500 as taught in FIG. 25. Customer desired level of accuracy/tolerance 1950 determines maximum BB size 1606, compression losses, and database size.

BOUNDING BOX 1606 SIZE TABLE

| 2822 | BOUNDING BOX Deg. | Tolerance 1606 (FIG. 5) Degrees |
|---|---|---|
| 1 | 1 × 1 | 1 |
| 2 | 4 × 4 | 4 |
| 3 | 0.25 × 0.25 | ¼ |
| 4 | 0.50 × 0.50 | ½ |

Bounding box size parameter 2822 is translated from the above table to BB parameter 1606. This parameter is determined when file 1800 is generated and is based on the size of the computed bounding box 1606 used to enclose the elements as taught in FIGS. 16, 19, and 21. This parameter is also used to determine the area enclosed by file 1800 and by polyline filter algorithm 2500 as taught in FIG. 25. The location is defined by latitude 2803 and longitude 2804 of the upper left corner and area in degrees.

Latitude tolerance/area parameter 2803 ranges from −90 to +90 degrees. To eliminate the sign, actual latitude is offset by +09000 with implied decimal point (090.00). The following calculation is offered as an example and not a limitation:

1812 (FIG. 18)=Top Latitude=2803−9000=07550−9000=−014.50 Deg. South

Longitude tolerance/area parameter 2803 ranges from −180 to +180 degrees. To eliminate the sign, actual latitude offset by +18000 with implied decimal point (090.00). The following calculation is offered as an example and not a limitation:

1810 (FIG. 18)=Left Longitude=2804−180=00900−18000=171.00 Deg. East

By way of example and not limitation, version parameter 2809 is used internally for version control. By way of example and not limitation, parameter 2811 is a count of the number of poly elements in the file.

Entity Label list 1896 is a list of the names associated with the entities. To speed name searches, labels are grouped to speed indexing and text searches. For readability, tokenized table entrees as taught in FIG. 26A are replaced with ASCII strings.

Parameter 1814 is a numeric count of the poly element location pairs 1850 (FIG. 18). Parameter 1876 is an index of entities used to speed entity locating within file 1800.

Although the present invention has been described with reference to preferred embodiments, numerous modifications and variations can be made and still the result will come within the scope of the invention. No limitation with respect to the specific embodiments disclosed herein is intended or should be inferred. Each apparatus embodiment described herein has numerous equivalents.

We claim:

1. A method to compress a geographic database and retrieve the compressed geographic data, the method comprising the steps of:

selecting at least one layer of detailed descriptive data to be compressed from an original geographic database;

partitioning the layer into a chosen number of discrete geographic bounding boxes;

selecting a reference coordinate in at least one geographic bounding box to be used as a reference coordinate for all other coordinates in the respective bounding box;

converting a selected number of absolute coordinates in the bounding box to a new relative coordinate with respect to the reference coordinate;

wherein at least one new relative coordinate in the bounding box comprises fewer digits than its absolute coordinate; and thereby forming a new compressed geographic database having fewer stored digits than the original geographic database.

2. The method of claim 1 further comprising the step of selecting a reference coordinate in each discrete geographic bounding box, wherein each bounding box is of a predetermined identical size.

3. The method of claim 1 further comprising the step of selecting a reference coordinate in each discrete geographic bounding box, and varying the size of each bounding box such that each bounding box contains the same predetermined number of map entities.

4. The method of claim 3, wherein the number of entities per bounding box is determined in a manner such that an error rate associated with a data compression method remains within an acceptable error rate.

5. The method of claim 3, wherein the bounding box size determinations are performed by density calculations comprising count and comparison operations.

6. The method of claim 1, wherein a horizontal absolute coordinate is converted to a horizontal relative coordinate by a method comprising the steps of:

determining the bounding box width by subtracting the horizontal coordinate of the bounding box left side from the horizontal coordinate of the bounding box right side;

subtracting the horizontal coordinate of the bounding box left side from the horizontal relative map coordinate;

dividing the difference by the bounding box width; and multiplying the quotient by a scaling factor.

7. The method of claim 6, wherein the scaling factor is a power of two whereby rapid compression and decompression are facilitated.

8. The method of claim 1, wherein a vertical absolute coordinate is converted to a vertical relative coordinate by a method comprising the steps of:

determining the bounding box height by subtracting the vertical coordinate of the bounding box bottom side from the vertical coordinate of the bounding box top side;

subtracting the vertical component of the bounding box bottom side from the vertical absolute map coordinate;

dividing the difference by the bounding box height; and multiplying the quotient by a scaling factor.

9. The method of claim 8, wherein the scaling factor is a power of two whereby rapid compression and decompression are facilitated.

10. The method of claim 1 further including compressing absolute coordinate data by use of a line simplification process before converting the absolute coordinate data to relative coordinate data.

11. The method of claim 1 further including constructing a data structure comprising the steps of:

saving one or more relative coordinate points to a data structure;

including a data structure length code within the data structure; and including the bounding box size characteristics within the data structure.

12. The method of claim 1 further including a method to compress map label data comprising the steps of:

reading a word contained in the map label data string;

replacing the word in the map label data string with a token from a dictionary file;

repeating the above steps for each word in the map label data string; and whereby the aggregate map label data string length is reduced.

13. The method of claim 12 further including the creation of a dictionary file comprising the steps of:

reading a map label data string from the original geographic database;

finding a word within the map label data string;

searching the dictionary file to see if the word already exists in the dictionary file;

adding the word to the dictionary file if it does not already exist in the dictionary file;

repeating the above steps until each word in each in each map label data string in the original geographic database has been read; and associating a token with each word in the dictionary file.

14. The method of claim 1 further including forming a customized lookup table comprising selected common elements from the new compressed database.

15. The method of claim 1 further including converting a horizontal relative coordinate to a horizontal absolute coordinate comprising the steps of:

determining the bounding box width by subtracting the horizontal coordinate of the bounding box left side from the horizontal coordinate of the bounding box right side;

multiplying the horizontal relative coordinate by the bounding box width;

dividing the product by a scaling factor; and adding to the quotient the horizontal coordinate of the bounding box left side.

16. The method of claim 1 further including converting a vertical relative coordinate to a vertical absolute coordinate comprising the steps of:

determining the bounding box height by subtracting the vertical coordinate of the bounding box bottom side from the vertical coordinate of the bounding box top side;

multiplying the vertical relative coordinate by the bounding box height;

dividing the product by a scaling factor; and adding to the quotient the vertical coordinate of bounding box bottom side.

17. The method of claim 1 further including a method of naming a compressed geographic database file, the method comprising the steps of:

determining the geographic area represented by the geographic database file;

determining the type of data contained within the geographic database file;

determining the accuracy of the data contained within the geographic database file; and naming the geographic database file such that the geographic area represented by the geographic database file, the type of data contained within the geographic database file, and the accuracy of the data contained within the geographic database can be determined merely by inspecting the geographic database file name.

18. The method of claim 1 further comprising the step of retrieving selected segments of the new compressed geographic database by forming view windows each having an adjacent projected area to be viewed which is pre-decompressed before an actual retrieval thereof.

19. The method of claim 18, wherein one or more relative coordinate points are displayed without being converted to absolute coordinate points.

20. The method of claim 18, wherein one or more relative coordinate points are displayed after being converted to absolute coordinate points.

21. The method of claim 18 further including a method of map data memory management comprising the steps of:

creating a load region around the view window;

preloading into map data memory map entities located within the load region; and whereby the map entities adjacent to the view window are already resident in map data memory and are available for immediate display when panning or zooming.

22. The method of claim 21 further including entity preloading at a lower priority level than other system tasks.

23. The method of claim 18 further including a method of map data memory management comprising the steps of:

identifying view window movement, panning, or zooming;

preloading into map data memory map entities located in the direction of the view window movement, panning, or zooming; and whereby the map entities in the direction of view window movement, panning, or zooming are already resident in map data memory and are available for immediate display.

24. The method of claim 23 further including entity preloading at a lower priority level than other system tasks.

25. The method of claim 18 further including a method of map data memory management comprising the steps of:

identifying view window movement, panning, or zooming;

unloading from map data memory map entities located in the opposite direction of the view window movement, panning, or zooming; and whereby the map data memory is freed of the map entities.

26. The method of claim 25 further including entity preloading at a lower priority level than other system tasks.

27. The method of claim 18 further including a method of map data memory management comprising the steps of:

identifying a next lower zoom level;

preloading into map data memory map entities located within the next lower zoom level; and whereby the map entities located within the next lower zoom level are already resident in map data memory and are available for immediate display when zooming out.

28. The method of claim 27 further including entity preloading at a lower priority level than other system tasks.

29. The method of claim 18 further including a method of map data memory management comprising the steps of:

creating an unload region around a view window;

unloading from map data memory map entities located outside the unload region; and whereby the map data memory is freed of the map entities.

30. The method of claim 29 further including entity preloading at a lower priority level than other system tasks.

31. A method of naming a compressed geographic database file, the method comprising the steps of:

determining the geographic area represented by the geographic database file;

determining the type of data contained within the geographic database file;

determining the accuracy of the data contained within the geographic database file; and naming the geographic database file such that the geographic area represented by the geographic database file, the type of data contained within the geographic database file, and the accuracy of the data contained within the geographic database can be determined merely by inspecting the geographic database file name.

32. A system for compressing a geographic database and retrieving the compressed geographic data, the system comprising:

a means for selecting at least one layer of detailed descriptive data to be compressed from an original geographic database functioning to allow an user to choose one or more entity types of interest;

a means for partitioning the selected layer into a chosen number of discrete geographic bounding boxes functioning to provide a reference grid for data compression;

a means for selecting a reference coordinate in at least one geographic bounding box functioning to provide a reference coordinate for all other coordinates in the respective bounding box;

a means for converting a selected number of absolute coordinates in the bounding box to a new relative coordinate with respect to the reference coordinate functioning to reduce the number of digits of the coordinates; and a means for forming a new compressed geographic database functioning to provide a compact map data source for mapping applications.

* * * * *